(12) United States Patent
Dugat et al.

(10) Patent No.: US 11,981,023 B2
(45) Date of Patent: May 14, 2024

(54) TOTE HANDLING SYSTEM WITH INTEGRATED HAND AND METHOD OF USING SAME

(71) Applicant: Robotica, Inc., Cypress, TX (US)

(72) Inventors: Jay Mark Dugat, Cypress, TX (US); Mark Eugene Ganninger, Leander, TX (US)

(73) Assignee: Robotica, Inc., Cypress, TX (US)

( * ) Notice: Subject to any disclaimer, the term of this patent is extended or adjusted under 35 U.S.C. 154(b) by 121 days.

(21) Appl. No.: 17/578,301

(22) Filed: Jan. 18, 2022

(65) Prior Publication Data

US 2022/0134578 A1 May 5, 2022

Related U.S. Application Data

(63) Continuation-in-part of application No. 17/151,567, filed on Jan. 18, 2021, and a continuation-in-part of application No. 17/151,633, filed on Jan. 18, 2021.

(60) Provisional application No. 63/138,773, filed on Jan. 18, 2021, provisional application No. 63/034,105, filed on Jun. 3, 2020, provisional application No. 62/962,721, filed on Jan. 17, 2020.

(51) Int. Cl.
*B25J 15/00* (2006.01)
*B25J 15/10* (2006.01)
*B25J 19/02* (2006.01)

(52) U.S. Cl.
CPC ......... *B25J 15/106* (2013.01); *B25J 15/0019* (2013.01); *B25J 15/0033* (2013.01); *B25J 19/023* (2013.01)

(58) Field of Classification Search
CPC .. B25J 15/106; B25J 15/0019; B25J 15/0033; B25J 19/023; B25J 15/10
USPC .......................................................... 294/207
See application file for complete search history.

(56) References Cited

U.S. PATENT DOCUMENTS

| 1,603,633 | A | 10/1926 | Nelson |
| 1,737,762 | A | 12/1929 | Howe |
| 2,590,359 | A | 3/1952 | Oscar |

(Continued)

FOREIGN PATENT DOCUMENTS

| CN | 102079407 B | 2/2014 |
| DE | 20314281 | 12/1971 |

(Continued)

*Primary Examiner* — Paul T Chin
(74) *Attorney, Agent, or Firm* — Victor H. Segura

(57) ABSTRACT

An integrated hand and method for manipulating items received in a shipping container. The integrated hand is carried by a tote handler and includes a base with a slotted plate, fingers, and flat plates. The fingers are extendable from and slidably movable along slots in the slotted plate. The flat plates are extendable from the base. The fingers and flat plates are selectively extendable about the base to define a grip space shaped to receivingly grip the items whereby the items are secured in position. The method includes receiving items in an original orientation from the shipping container by: selectively extending fingers and plates of an integrated hand to define an item space shaped to support and grippingly receiving the items; and inserting the items into a tote while maintaining the items in the original orientation by selectively rotating the integrated hand and inserting the integrated hand into the tote.

28 Claims, 43 Drawing Sheets

(56) References Cited

U.S. PATENT DOCUMENTS

| | | | |
|---|---|---|---|
| 2,993,583 A | 7/1961 | Sykes | |
| 3,104,004 A | 9/1963 | Poel et al. | |
| 3,135,049 A | 6/1964 | Daugherty et al. | |
| 3,137,068 A | 6/1964 | Quigley | |
| 3,232,409 A | 2/1966 | Pierson et al. | |
| 3,347,587 A * | 10/1967 | Frost | A01D 46/24 |
| | | | 294/98.1 |
| 3,485,339 A | 12/1969 | Miller et al. | |
| 3,559,371 A * | 2/1971 | Borrowman | B65B 23/02 |
| | | | 294/81.52 |
| 3,606,058 A | 9/1971 | Davis | |
| 3,668,821 A | 6/1972 | Benson et al. | |
| 3,757,973 A | 9/1973 | Lambert et al. | |
| 3,922,778 A | 12/1975 | Aalpoel | |
| 3,944,054 A | 3/1976 | Ensinger | |
| 4,014,428 A | 3/1977 | Ossbahr | |
| 4,187,755 A | 2/1980 | Shirai | |
| 4,192,496 A | 3/1980 | Baselice et al. | |
| 4,200,178 A * | 4/1980 | Gunti | B65G 47/54 |
| | | | 198/370.1 |
| 4,256,213 A | 3/1981 | Shaw et al. | |
| 4,269,302 A | 5/1981 | Garvey | |
| 4,290,617 A | 9/1981 | Yoshida | |
| 4,291,518 A | 9/1981 | Johnson | |
| 4,514,963 A | 5/1985 | Bruno | |
| 4,610,596 A | 9/1986 | Bouldin et al. | |
| 4,629,302 A | 12/1986 | Willcox | |
| 4,653,961 A | 3/1987 | Hashimoto | |
| 4,715,488 A | 12/1987 | Hewitt et al. | |
| 4,730,718 A | 3/1988 | Fazio et al. | |
| 4,804,081 A | 2/1989 | Lenhardt | |
| 4,835,836 A | 6/1989 | van Uitert | |
| 4,962,841 A | 10/1990 | Kloosterhouse | |
| 5,011,467 A | 4/1991 | Traegaardh | |
| 5,028,181 A | 7/1991 | Jenkins et al. | |
| 5,031,498 A | 7/1991 | Koppel | |
| 5,033,348 A | 7/1991 | Walsh | |
| 5,048,267 A | 9/1991 | Kudo et al. | |
| 5,059,082 A | 10/1991 | Tanttu et al. | |
| 5,101,703 A | 4/1992 | Tanaka et al. | |
| 5,144,789 A | 9/1992 | Focke et al. | |
| 5,150,781 A | 9/1992 | Deisenroth et al. | |
| 5,165,516 A | 11/1992 | Reed et al. | |
| 5,172,804 A | 12/1992 | Chersin | |
| 5,217,110 A | 6/1993 | Spangler et al. | |
| 5,351,809 A | 10/1994 | Gilmore et al. | |
| 5,360,161 A | 11/1994 | Schaller et al. | |
| 5,400,895 A | 3/1995 | Hollingsworth et al. | |
| 5,454,683 A | 10/1995 | Marom et al. | |
| 5,456,348 A | 10/1995 | Whetsel et al. | |
| 5,471,738 A * | 12/1995 | Burcham | B25J 15/0052 |
| | | | 294/94 |
| 5,568,857 A | 10/1996 | Chen et al. | |
| 5,649,801 A | 7/1997 | White | |
| 5,699,892 A | 12/1997 | Shyr et al. | |
| 5,718,325 A | 2/1998 | Doster et al. | |
| 5,725,349 A | 3/1998 | Garvey et al. | |
| 5,758,362 A | 6/1998 | Focke et al. | |
| 5,854,460 A | 12/1998 | Graf et al. | |
| 5,862,907 A | 1/1999 | Taylor | |
| 5,911,300 A | 6/1999 | Mraz | |
| 5,931,071 A | 8/1999 | Mori | |
| 5,971,132 A * | 10/1999 | Bonnet | B65G 47/54 |
| | | | 198/370.07 |
| 5,984,078 A * | 11/1999 | Bonnet | B65G 47/53 |
| | | | 198/370.1 |
| 6,005,211 A | 12/1999 | Huang et al. | |
| 6,068,111 A | 5/2000 | Smith et al. | |
| 6,073,747 A | 6/2000 | Takino et al. | |
| 6,082,080 A * | 7/2000 | Holter | B25J 15/0273 |
| | | | 414/789.5 |
| 6,189,298 B1 | 2/2001 | Kuji et al. | |
| 6,220,421 B1 | 4/2001 | Hugon et al. | |
| 6,227,377 B1 * | 5/2001 | Bonnet | B65G 21/12 |
| | | | 209/941 |
| 6,264,042 B1 | 7/2001 | Cossey, Jr. et al. | |
| 6,302,408 B1 | 10/2001 | Zierpka | |
| 6,325,393 B1 | 12/2001 | Chen et al. | |
| 6,457,916 B2 | 10/2002 | Wienhold | |
| 6,471,031 B1 | 10/2002 | Duncalf | |
| 6,516,937 B1 | 2/2003 | Deer | |
| 6,533,096 B2 | 3/2003 | Gilmore et al. | |
| 6,536,580 B1 | 3/2003 | Fritzsche | |
| 6,595,349 B2 | 7/2003 | Macswan | |
| 6,629,018 B2 | 9/2003 | Mondie et al. | |
| 6,629,593 B2 | 10/2003 | Zeitler | |
| 6,694,852 B1 | 2/2004 | Ours et al. | |
| 6,719,119 B1 | 4/2004 | Hendzel et al. | |
| 6,725,631 B2 | 4/2004 | Skrak et al. | |
| 6,725,752 B1 | 4/2004 | Torrazza | |
| 6,782,993 B2 | 8/2004 | Bernard et al. | |
| 6,843,365 B2 | 1/2005 | Baker | |
| 6,907,978 B2 | 6/2005 | Evans et al. | |
| 6,953,188 B2 * | 10/2005 | Siegel | B25B 1/2421 |
| | | | 269/254 CS |
| 6,957,736 B2 | 10/2005 | Bonifer et al. | |
| 6,982,731 B2 | 1/2006 | Hall et al. | |
| 7,147,097 B2 | 12/2006 | Lemm | |
| 7,150,383 B2 | 12/2006 | Talken | |
| 7,174,695 B2 | 2/2007 | Porter et al. | |
| 7,182,007 B2 | 2/2007 | Berge et al. | |
| 7,261,198 B2 | 8/2007 | Tatar et al. | |
| 7,638,729 B2 | 12/2009 | Park et al. | |
| 7,641,043 B2 | 1/2010 | Vestergaard et al. | |
| 7,654,788 B2 * | 2/2010 | Rogalla | B60C 25/0515 |
| | | | 901/31 |
| 7,690,497 B2 | 4/2010 | Radwallner et al. | |
| 7,720,567 B2 | 5/2010 | Doke et al. | |
| 7,726,932 B2 * | 6/2010 | Leblanc | B65G 59/105 |
| | | | 414/798.2 |
| 7,909,153 B2 | 3/2011 | Pogue | |
| 7,963,086 B2 | 6/2011 | Porter et al. | |
| 8,161,854 B2 | 4/2012 | Fourney | |
| 8,463,428 B2 | 6/2013 | Doke et al. | |
| 8,561,790 B2 | 10/2013 | Brayman et al. | |
| 8,661,645 B2 * | 3/2014 | Lemser | G01M 17/021 |
| | | | 73/146 |
| 8,684,169 B2 | 4/2014 | Itoh et al. | |
| 8,827,623 B2 | 9/2014 | Stelter et al. | |
| 9,110,773 B2 | 8/2015 | Roush | |
| 9,205,567 B2 * | 12/2015 | Rose | B25J 19/005 |
| 9,216,862 B2 | 12/2015 | Wallace | |
| 9,334,111 B2 * | 5/2016 | Hoynash | B65G 1/04 |
| 9,475,653 B2 | 10/2016 | Dugat et al. | |
| 9,514,593 B2 * | 12/2016 | Dopfer | B65H 1/02 |
| 9,701,490 B2 * | 7/2017 | Morency | B25J 11/00 |
| 9,881,439 B2 * | 1/2018 | Demmeler | B65H 31/3045 |
| 9,926,094 B2 | 3/2018 | Dugat et al. | |
| 9,981,810 B2 | 5/2018 | Dugat et al. | |
| 9,988,218 B2 | 6/2018 | Dugat et al. | |
| 10,232,409 B2 | 3/2019 | Dugat et al. | |
| 10,336,542 B2 * | 7/2019 | Garrett | B65G 47/52 |
| 10,766,141 B1 * | 9/2020 | Diankov | B25J 9/1682 |
| 10,821,611 B1 * | 11/2020 | DeFant | B25J 15/0625 |
| 10,835,928 B2 | 11/2020 | Bellar et al. | |
| 10,843,876 B2 | 11/2020 | Dugat | |
| 10,953,553 B2 * | 3/2021 | Nakagawa | B25J 15/10 |
| 11,186,399 B2 | 11/2021 | Dugat et al. | |
| 11,420,339 B2 * | 8/2022 | Fujihara | B25J 15/0052 |
| 11,661,274 B1 * | 5/2023 | Patel | B25J 9/0096 |
| | | | 414/278 |
| 11,836,672 B2 | 12/2023 | Lert, Jr. et al. | |
| 11,845,610 B2 | 12/2023 | Lert, Jr. et al. | |
| 2001/0003939 A1 | 6/2001 | Liu et al. | |
| 2001/0001516 A1 | 8/2001 | Hardgrove et al. | |
| 2002/0134209 A1 | 9/2002 | Burman et al. | |
| 2002/0162302 A1 | 11/2002 | Thomson et al. | |
| 2003/0081228 A1 | 5/2003 | Spaulding et al. | |
| 2003/0150695 A1 | 8/2003 | Cotter et al. | |
| 2004/0194428 A1 | 10/2004 | Close et al. | |
| 2004/0211651 A1 | 10/2004 | Hall | |
| 2004/0226803 A1 | 11/2004 | Brixius et al. | |

(56) References Cited

U.S. PATENT DOCUMENTS

| | | |
|---|---|---|
| 2004/0250670 A1 | 12/2004 | Porter et al. |
| 2006/0074525 A1 | 4/2006 | Close et al. |
| 2006/0206233 A1 | 9/2006 | Carpenter et al. |
| 2006/0260451 A1 | 11/2006 | Capodieci |
| 2007/0051585 A1 | 3/2007 | Scott et al. |
| 2007/0025512 A1 | 6/2007 | Gertsenshteyn et al. |
| 2007/0125209 A1 | 6/2007 | Hilgendorf |
| 2007/0125211 A1 | 6/2007 | Hilgendorf |
| 2007/0125212 A1 | 6/2007 | Hilgendorf |
| 2007/0162174 A1 | 7/2007 | Doke et al. |
| 2007/0163099 A1 | 7/2007 | Townsend et al. |
| 2007/0221471 A1 | 10/2007 | Fourney et al. |
| 2008/0169171 A1 | 7/2008 | Itoh et al. |
| 2009/0065327 A1 | 3/2009 | Evangelista et al. |
| 2009/0113853 A1 | 5/2009 | Porter et al. |
| 2010/0272961 A1 | 10/2010 | Costin, Jr. |
| 2011/0268548 A1* | 11/2011 | Doll ............ B25J 15/00 414/688 |
| 2014/0041989 A1 | 2/2014 | Wallace |
| 2014/0290827 A1 | 10/2014 | Heeman et al. |
| 2014/0346008 A1 | 11/2014 | Hoynash |
| 2015/0203304 A1* | 7/2015 | Morency ............ B65G 61/00 414/797 |
| 2019/0202070 A1* | 7/2019 | Nakagawa ............ B25J 9/1612 |
| 2019/0381656 A1* | 12/2019 | Lee .................... B25J 9/1612 |
| 2021/0380338 A1 | 12/2021 | Dugat |
| 2021/0380341 A1 | 12/2021 | Dugat |

FOREIGN PATENT DOCUMENTS

| | | |
|---|---|---|
| DE | 2259273 C2 | 8/1984 |
| DE | 19724040 C2 | 7/1999 |
| EP | 1329388 B1 | 6/2006 |
| JP | 2000343486 A | 12/2000 |
| JP | 2002002636 A | 1/2002 |
| JP | 2003081228 A | 3/2003 |
| WO | 2006025868 A1 | 3/2006 |

\* cited by examiner

Requires 180 Degree Flip

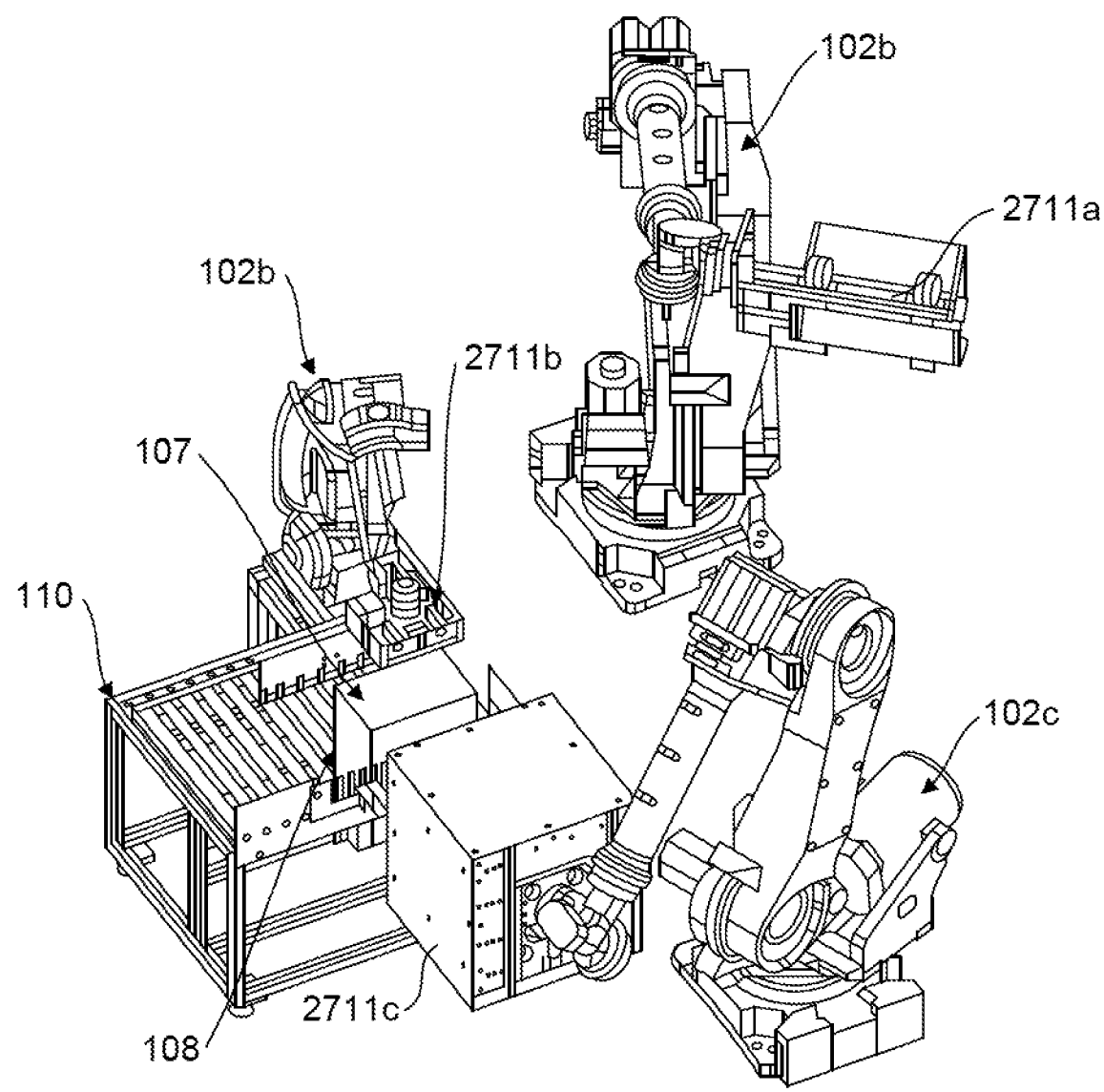
FIG. 27A1

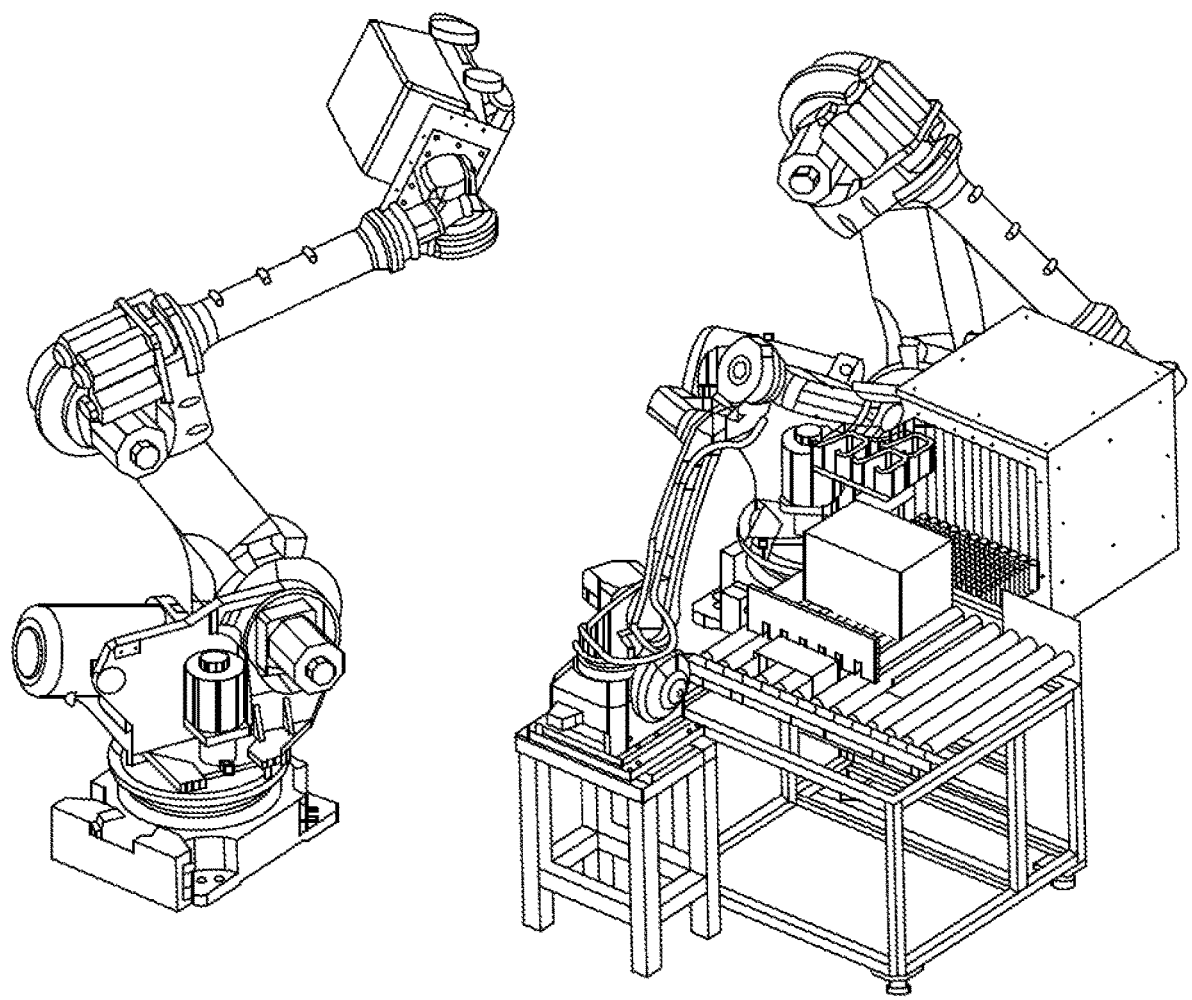
FIG. 27A2

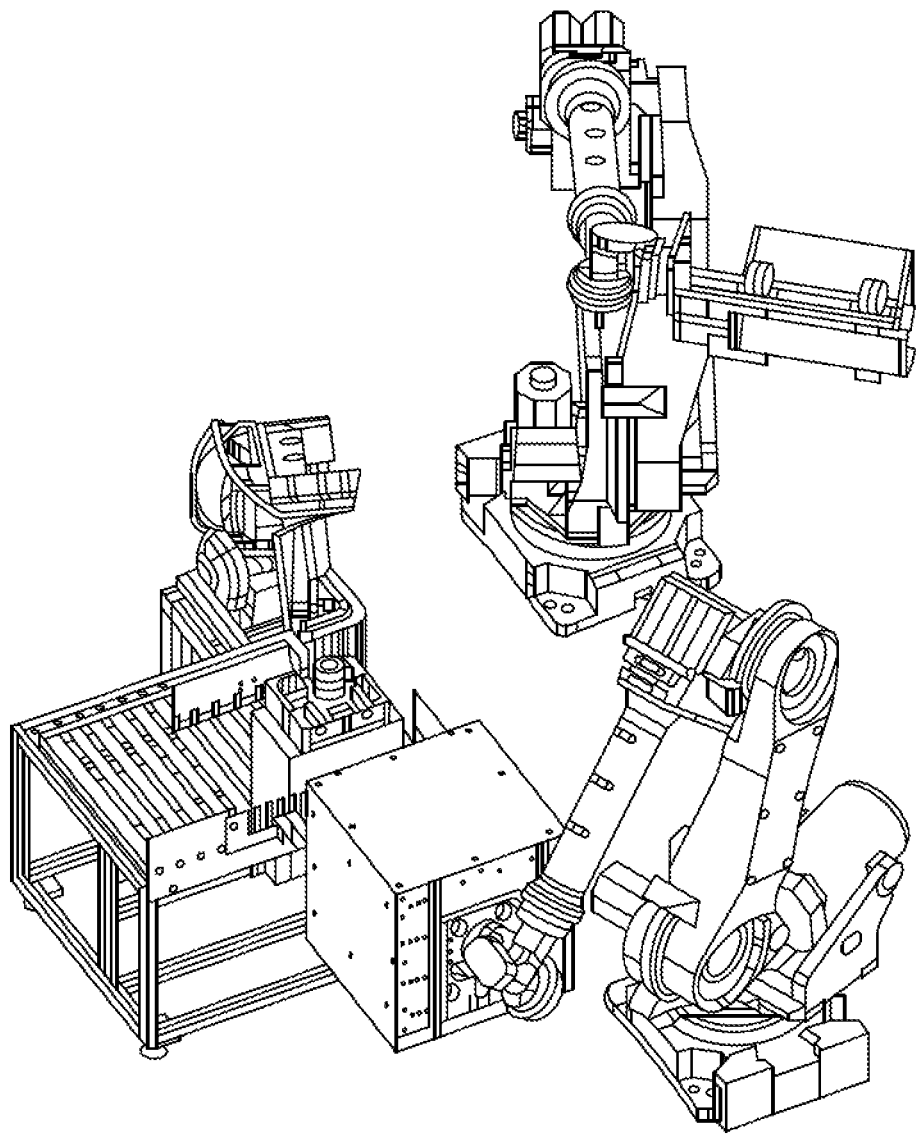
FIG. 27B1

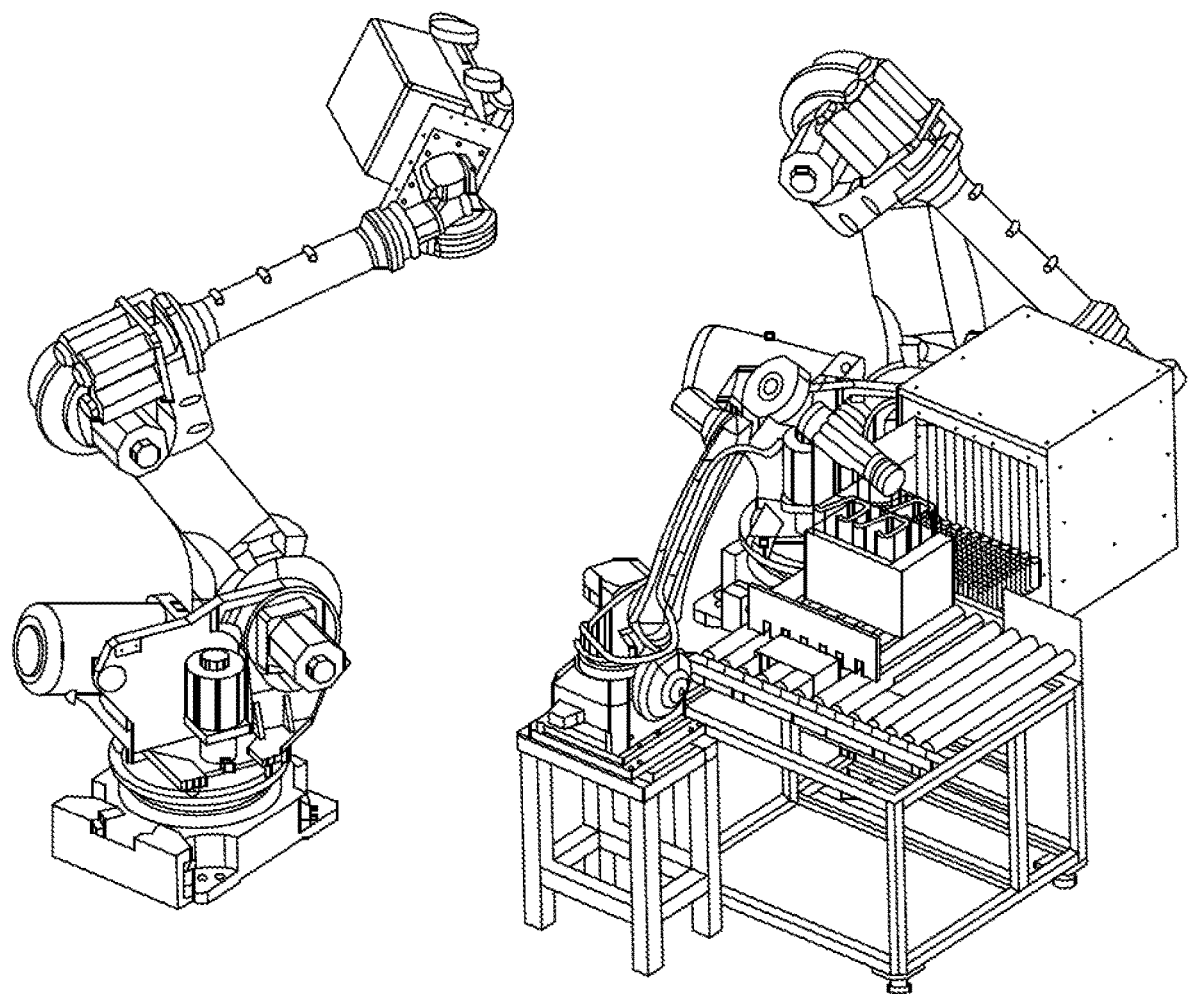
FIG. 27B2

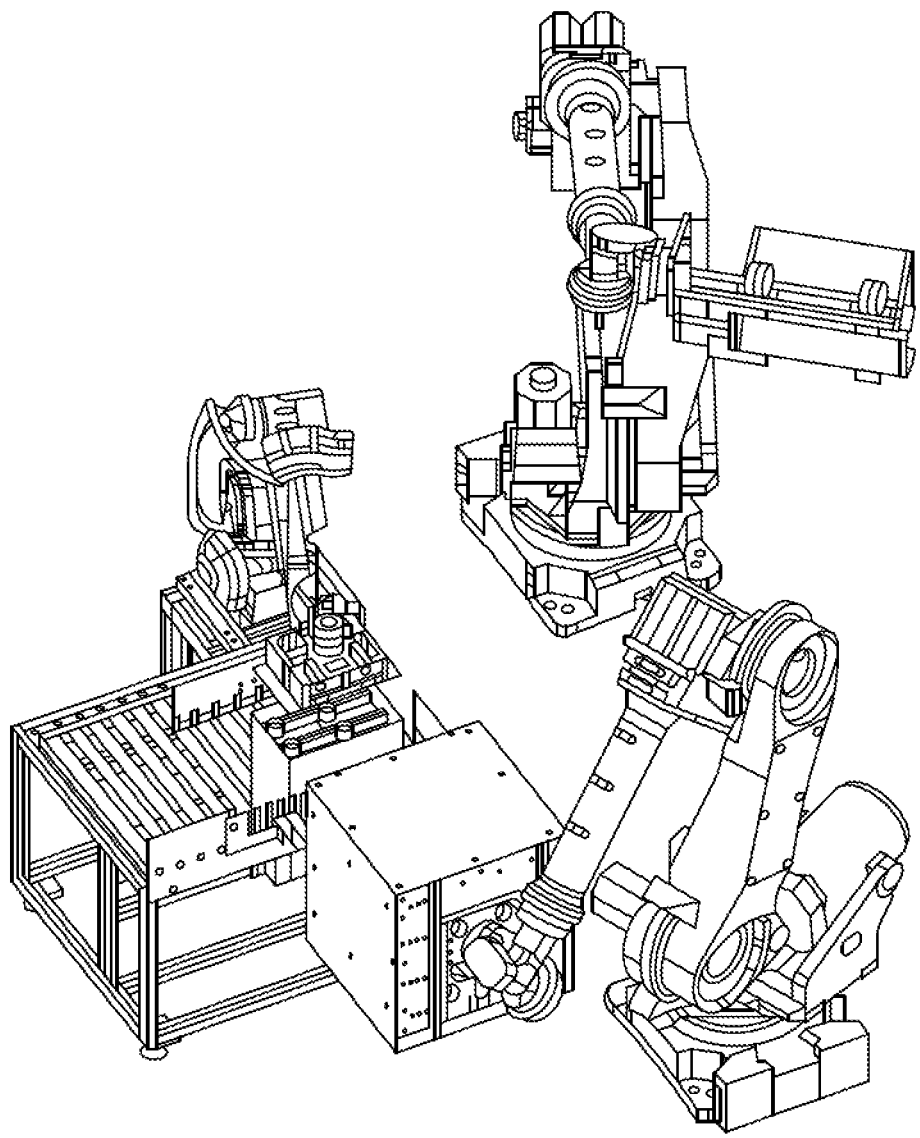
FIG. 27C1

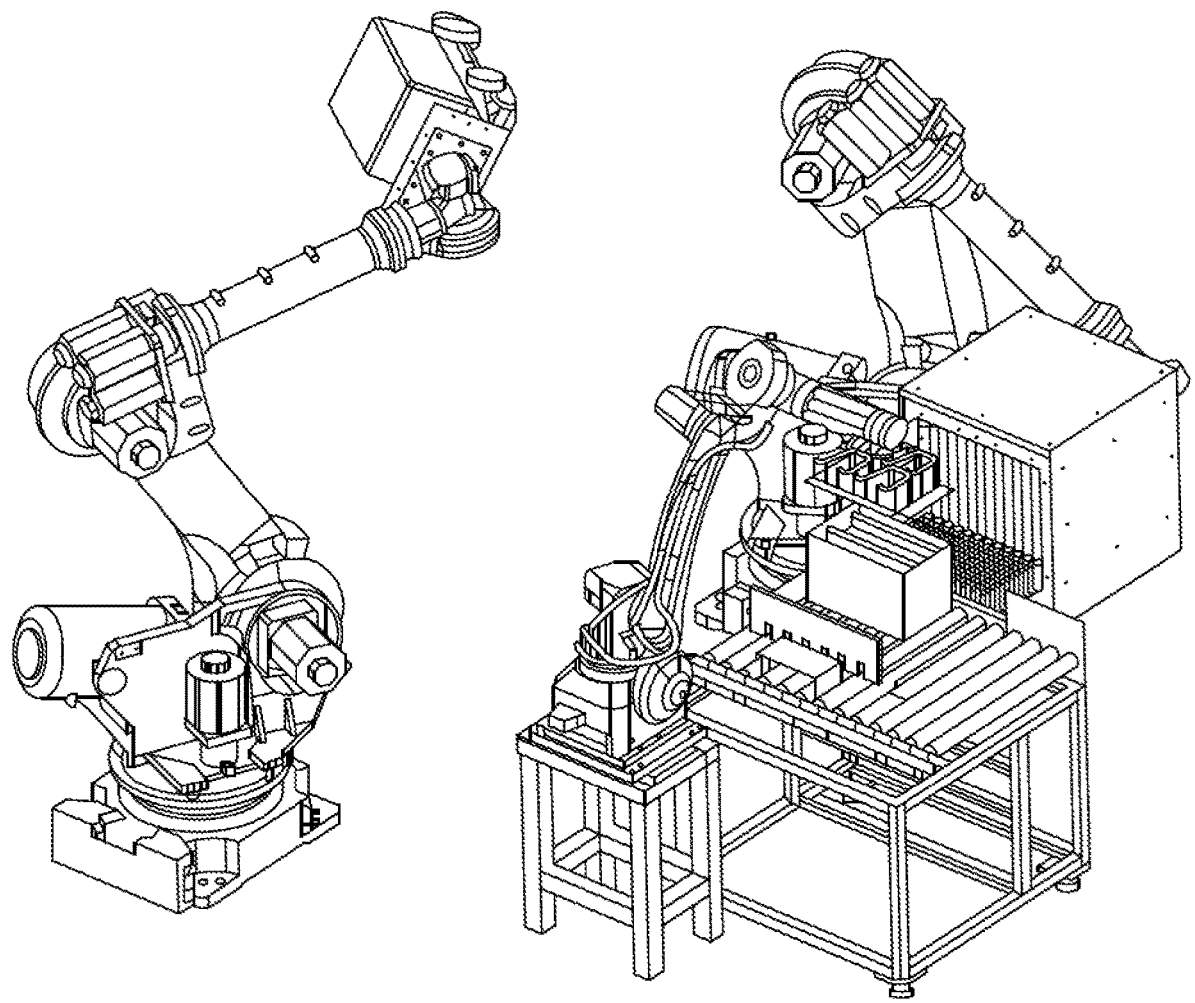
FIG. 27C2

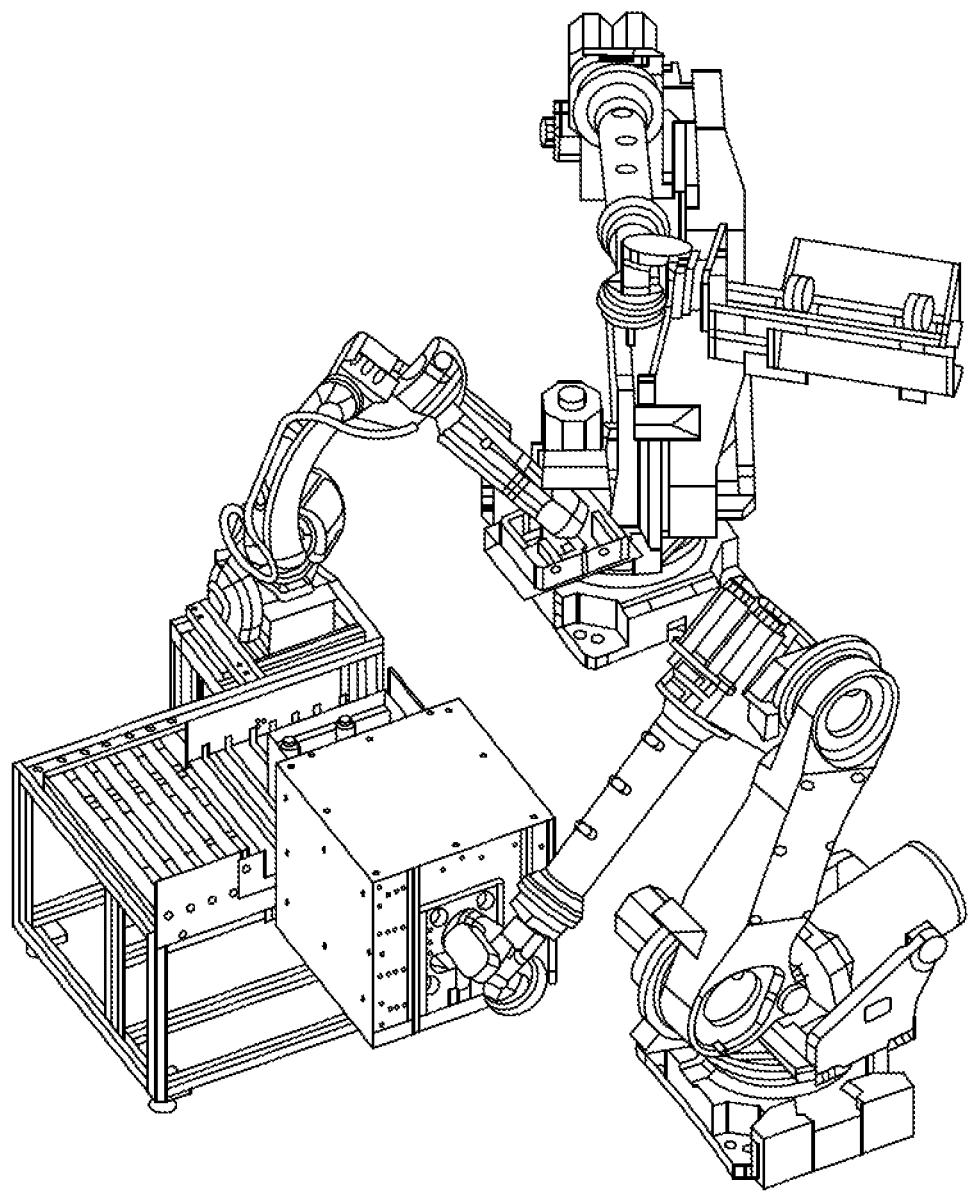
FIG. 27D1

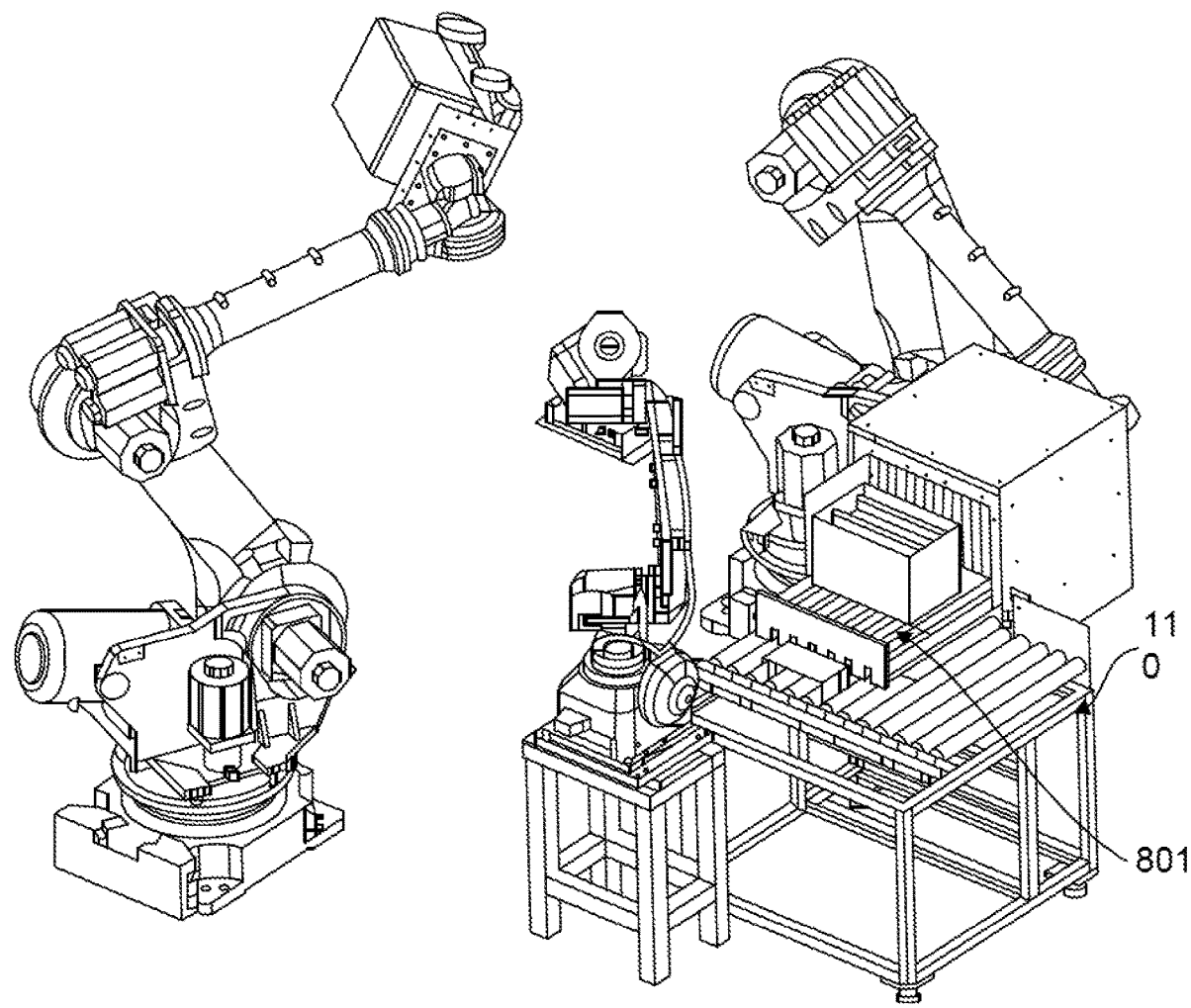
FIG. 27D2

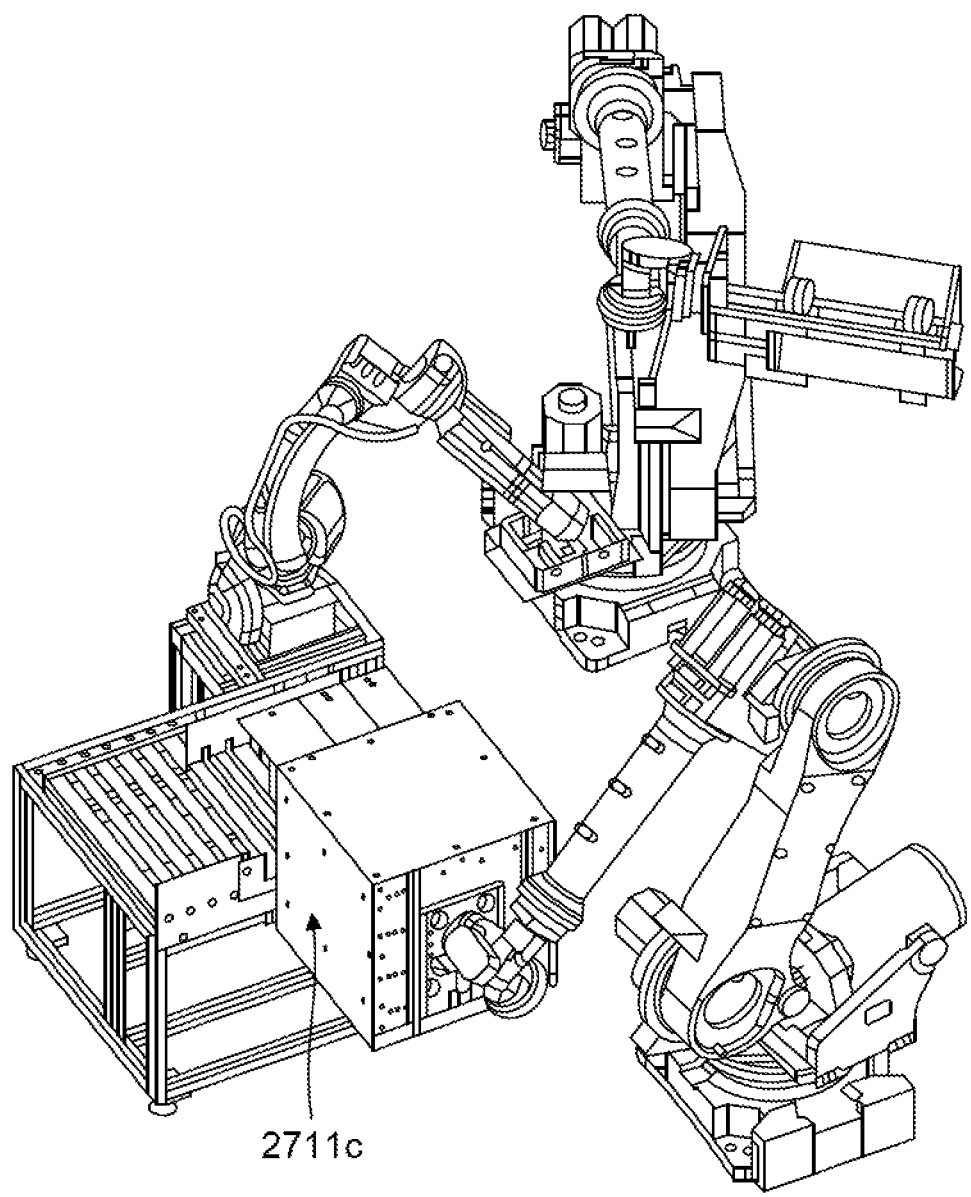
FIG. 27E1

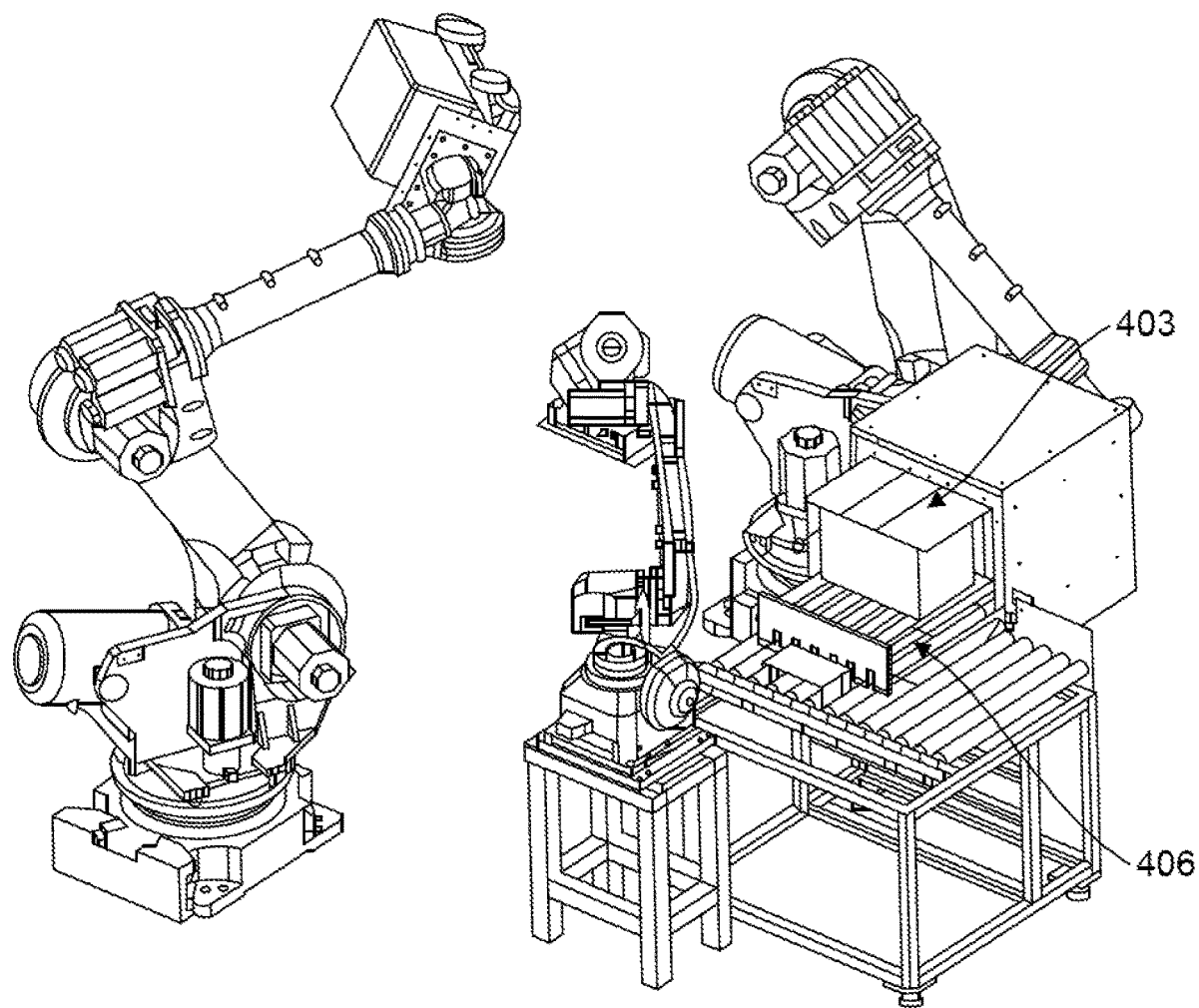
FIG. 27E2

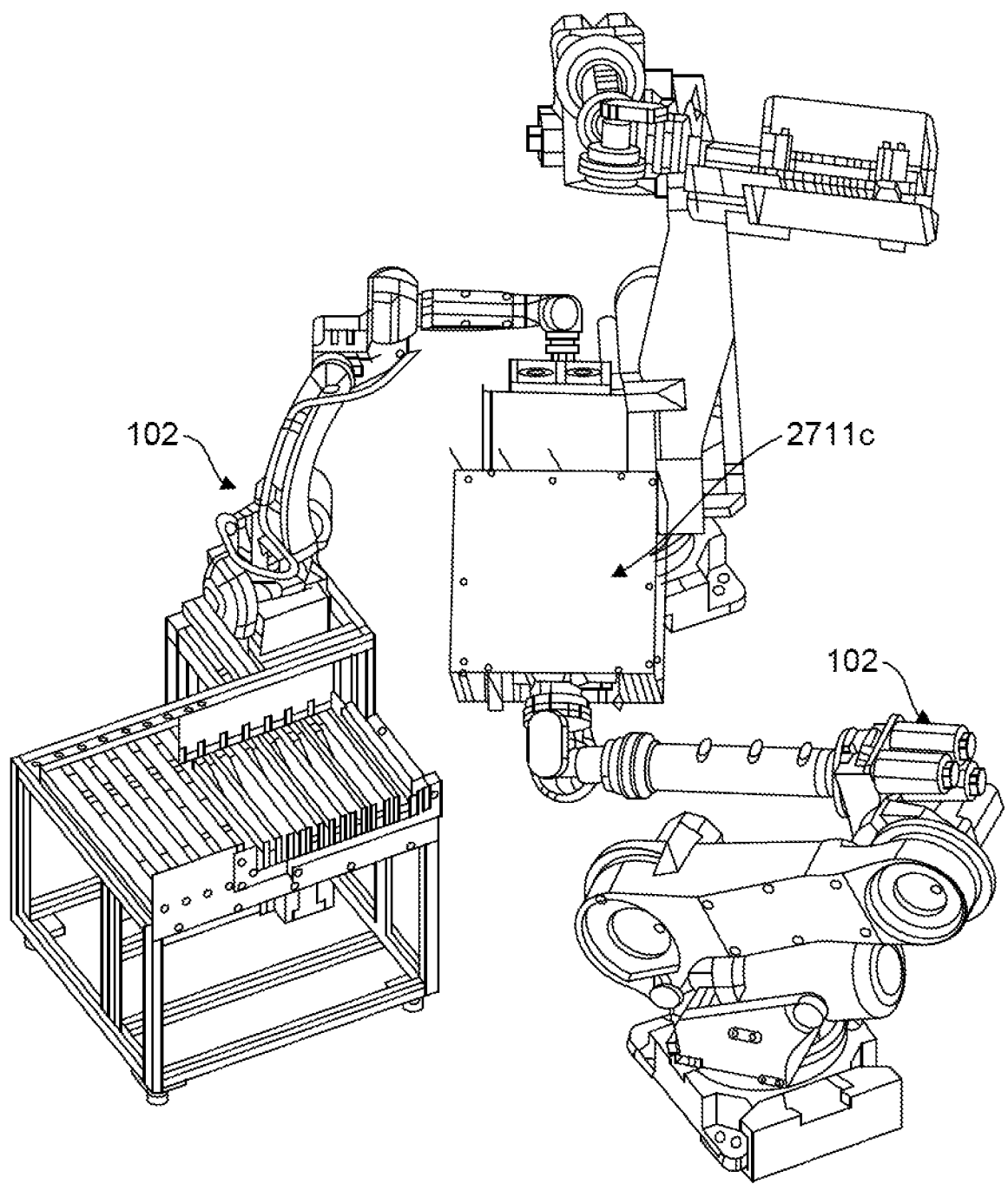
FIG. 27F1

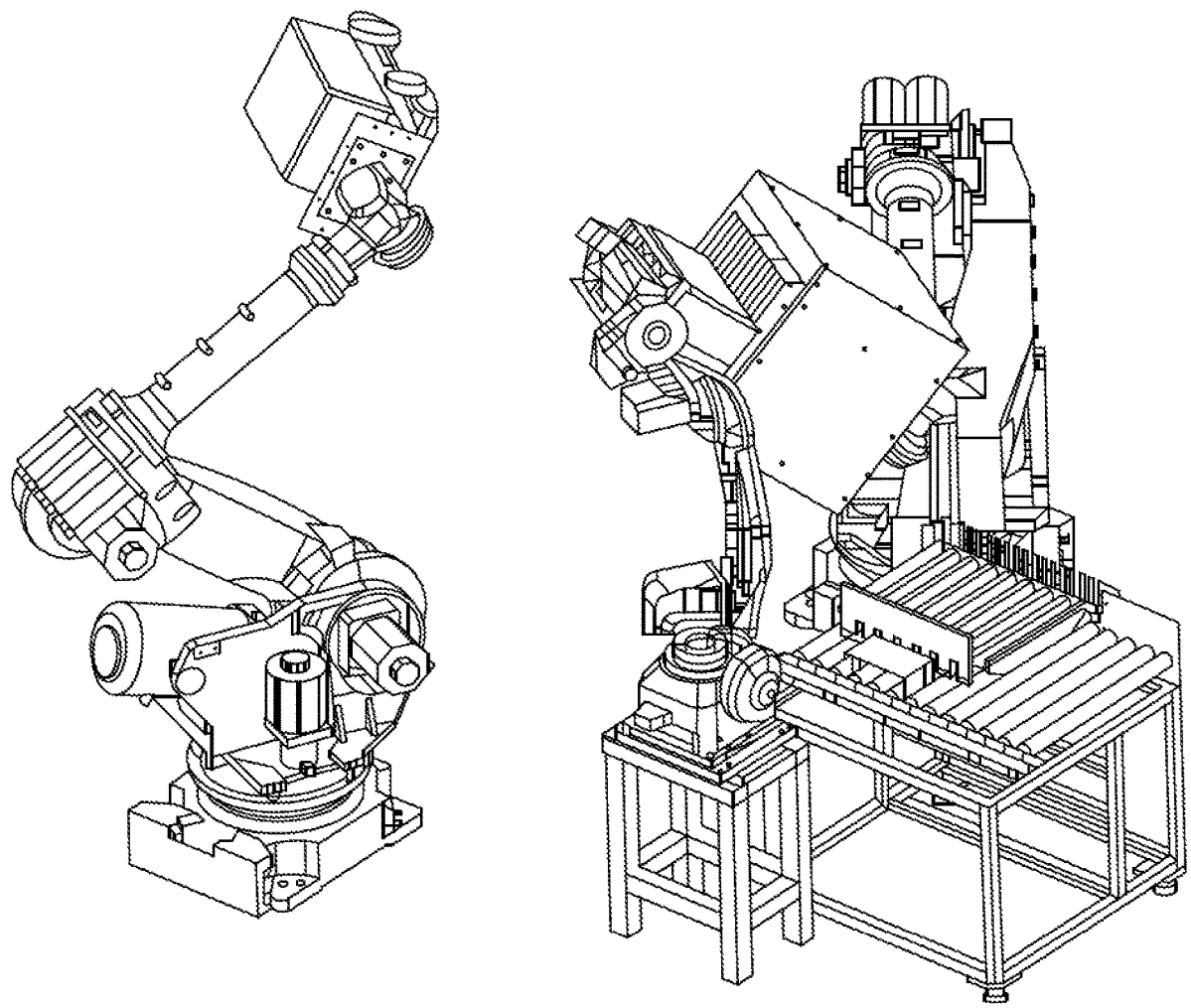
FIG. 27F2

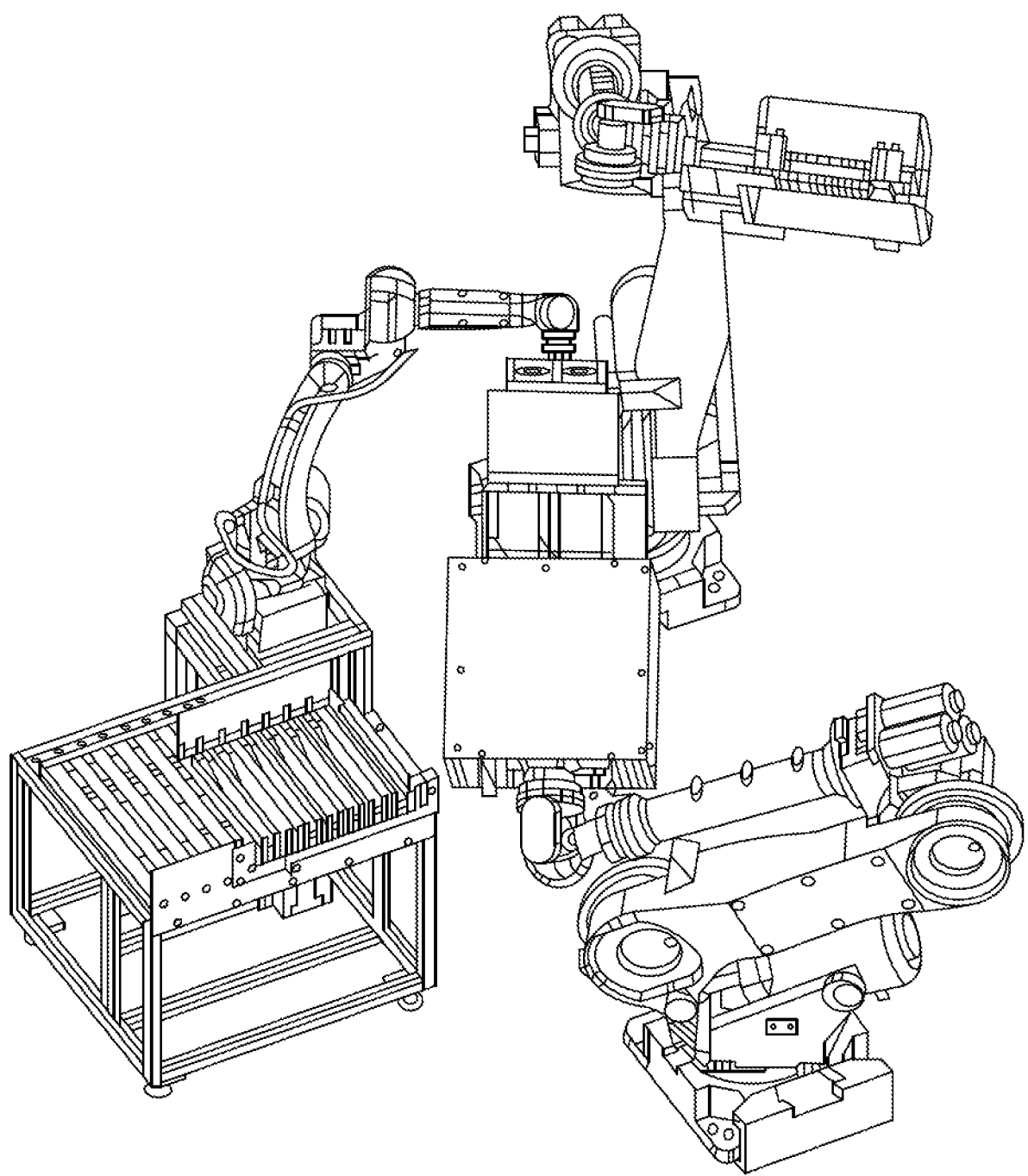
FIG. 27G1

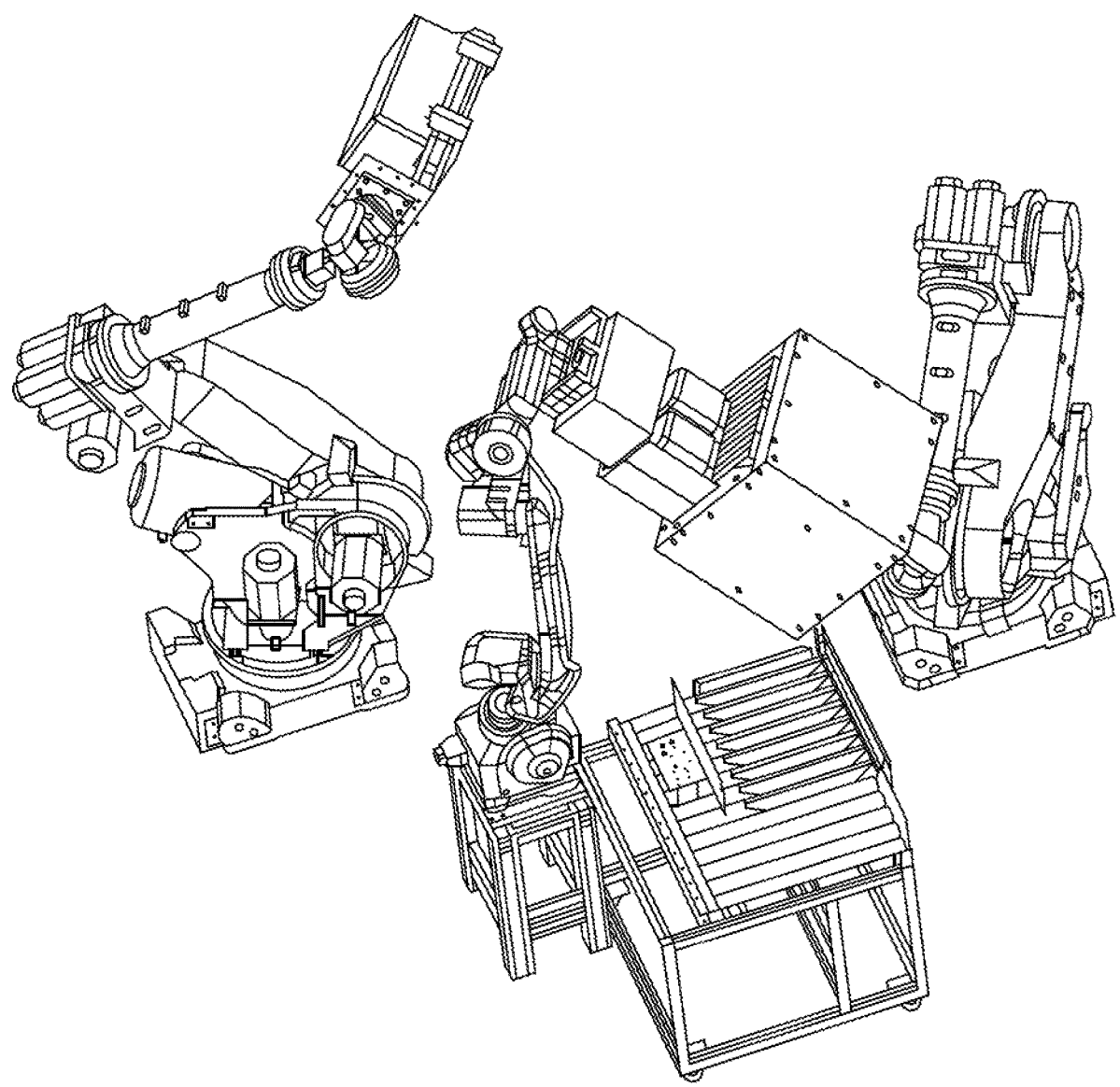
FIG. 27G2

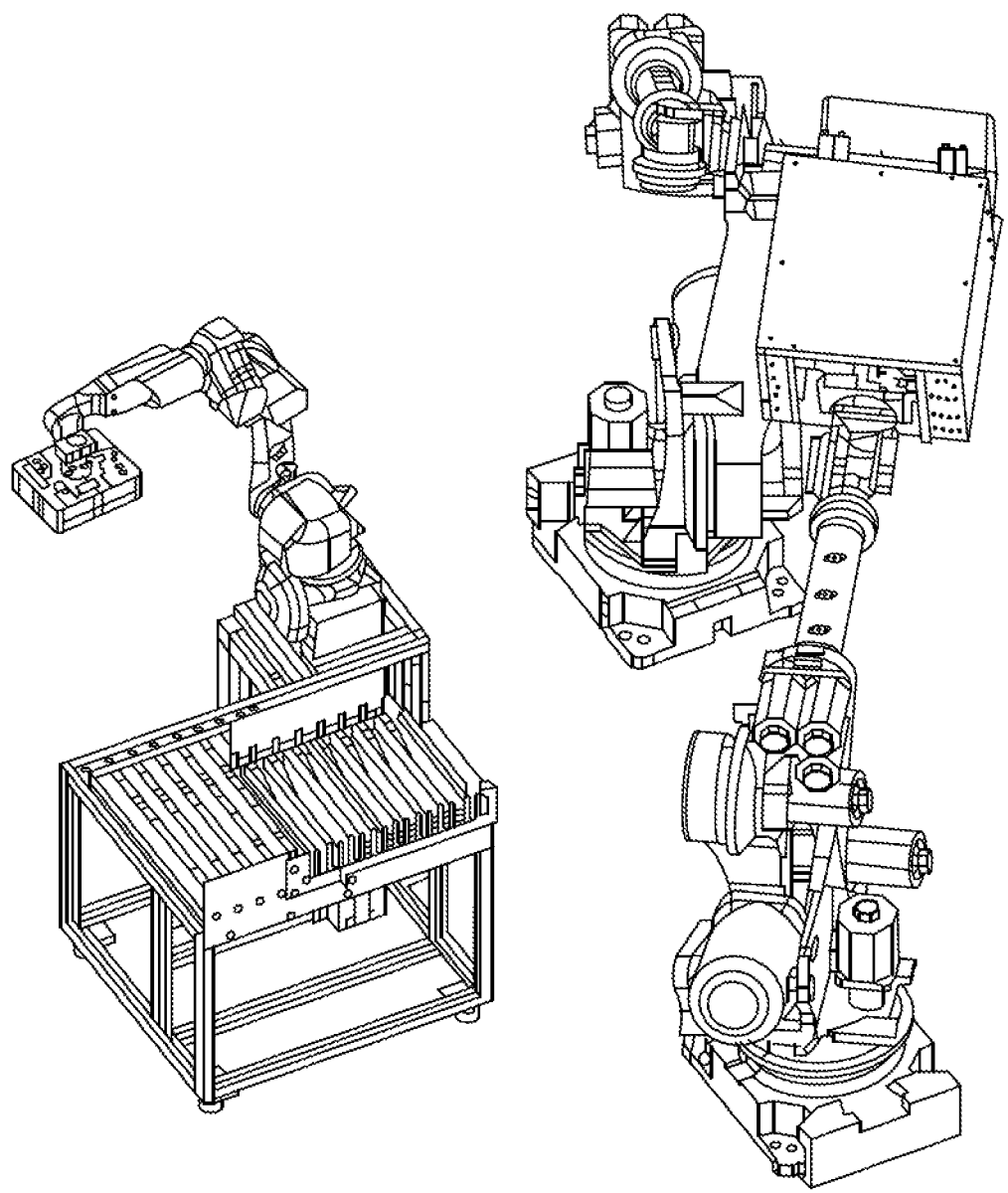
FIG. 27H1

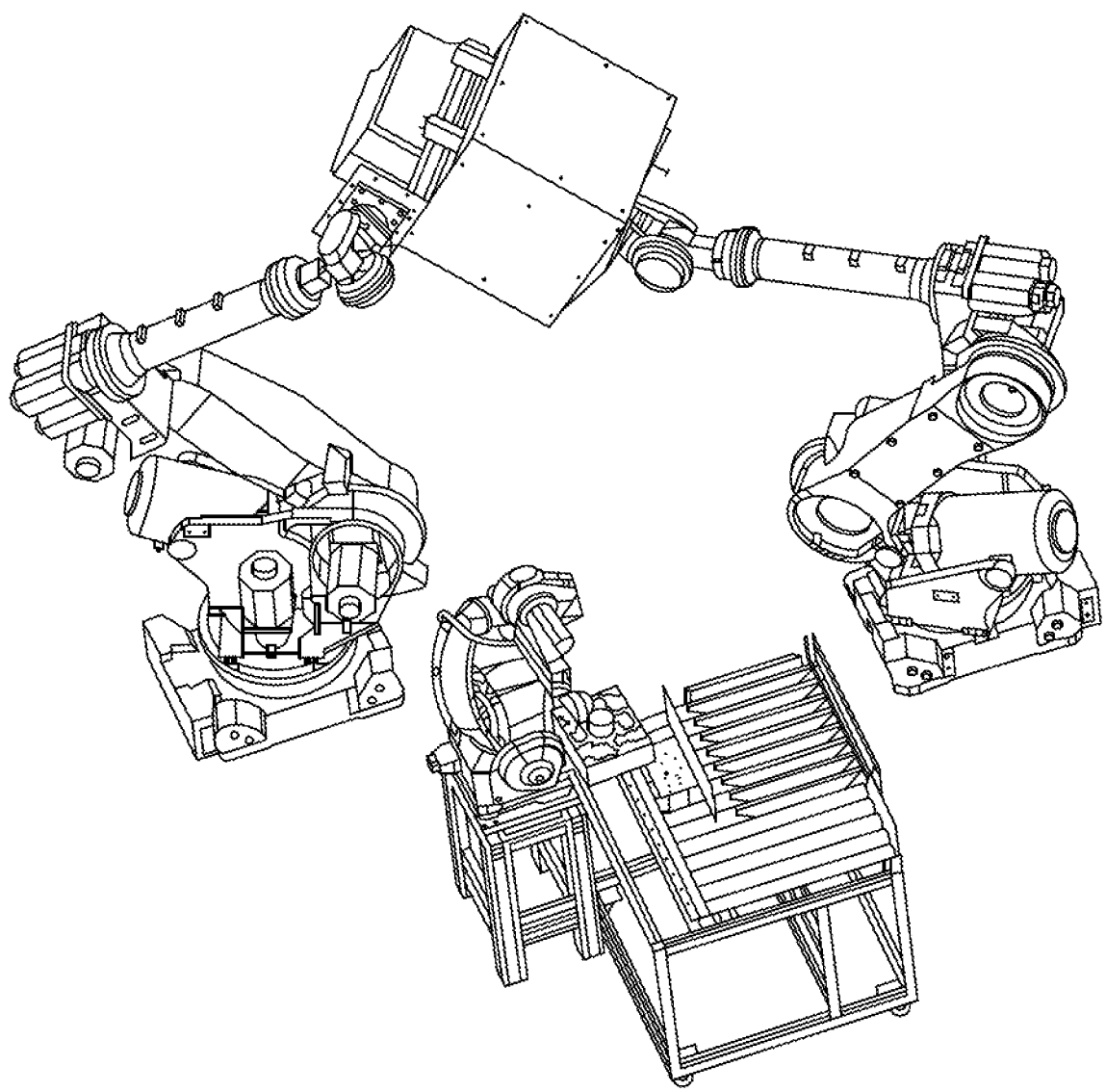
FIG. 27H2

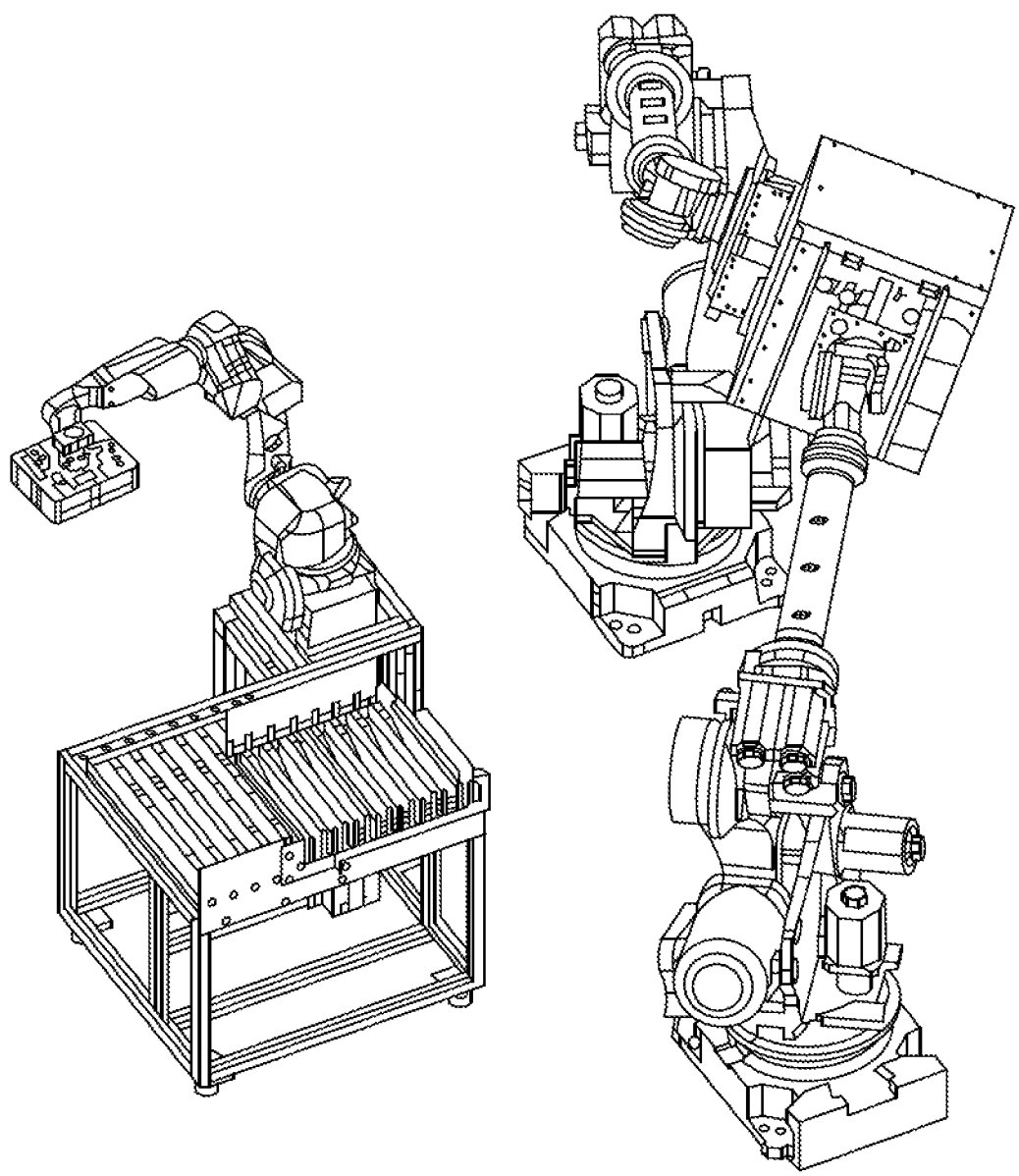
FIG. 27I1

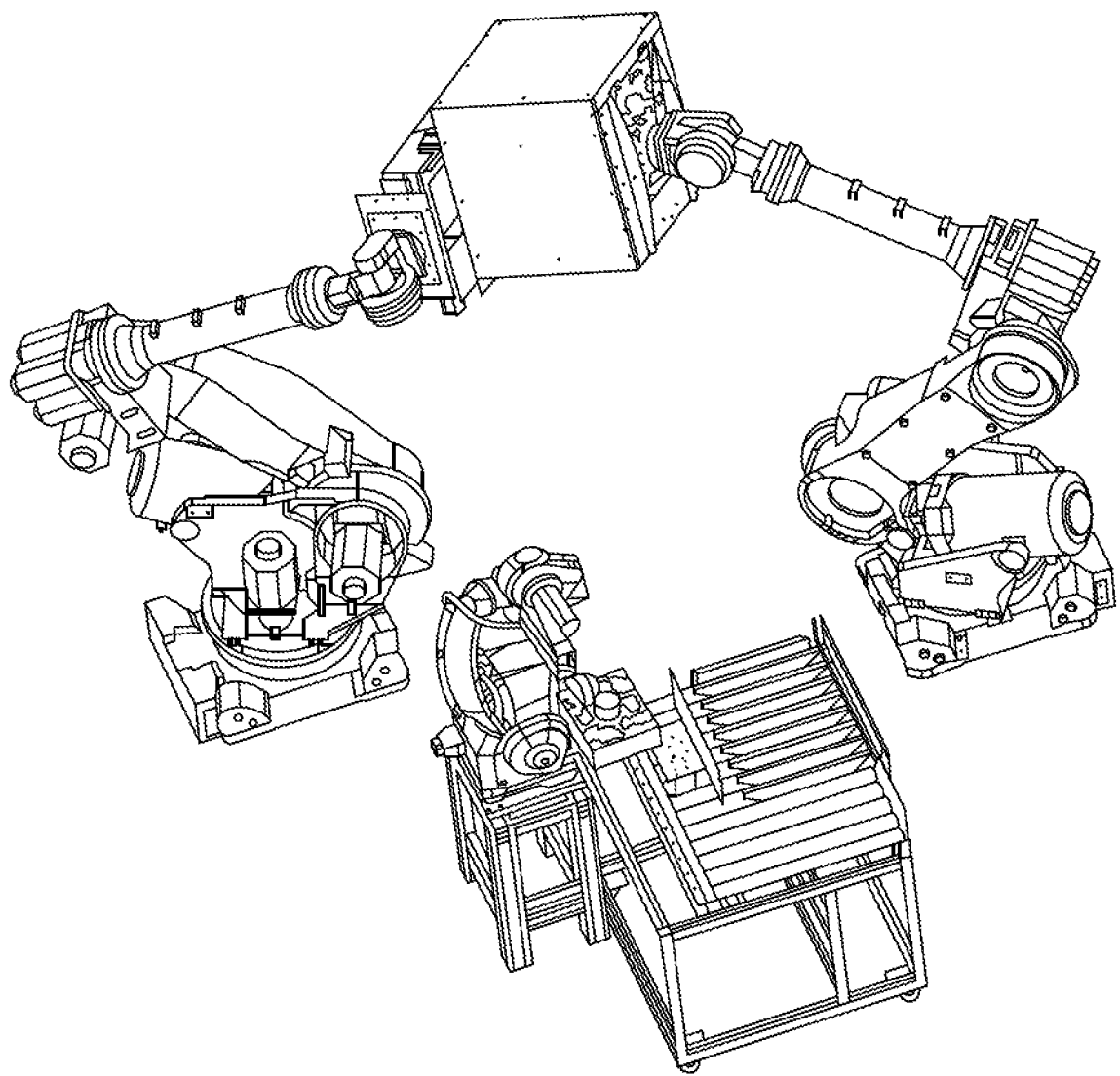
FIG. 2712

TOTE HANDLING SYSTEM WITH INTEGRATED HAND AND METHOD OF USING SAME

CROSS-REFERENCE TO RELATED APPLICATIONS

This application claims the benefit of U.S. Patent Application No. 63/138,773, filed on Jan. 8, 2021, the entire contents of which is hereby incorporated in its entirety herein to the extend not inconsistent with this disclosure. This application is also a continuation in part of U.S. patent application Ser. No. 17/151,567 filed on Jan. 18, 2021, which claim the benefit of U.S. Patent Application No. 63/034,105 filed on Jun. 3, 2020 and which also claims the benefit of U.S. Patent Application No. 62/962,721 filed on Jan. 17, 2020, the entire contents of which is hereby incorporated in its entirety herein to the extend not inconsistent with this disclosure. This application is also a continuation in part of U.S. patent application Ser. No. 17/151,633 filed on Jan. 18, 2021, which claim the benefit of U.S. Patent Application No. 63/034,105 filed on Jun. 3, 2020 and which also claims the benefit of U.S. Patent Application No. 62/962,721 filed on Jan. 17, 2020, the entire contents of which is hereby incorporated in its entirety herein to the extend not inconsistent with this disclosure. The applications in this paragraph are collectively referred to herein as the "Handling Applications".

BACKGROUND

The present disclosure relates generally to material handling equipment. More specifically, the present disclosure relates to equipment, such as conveyors, robots, and containers for sorting, transporting, and storing various materials.

Material handling systems are used by distributors to assemble and package items for shipment. The material handling systems may include conveyors for transporting the items from one location to another. Examples of material handling techniques that may be used are provided in U.S. Pat. Nos. 5,971,132; 4,200,178; 9,334,111; 5,984,078; 6,227,377; and 10,336,542, the entire contents of which are hereby incorporated by reference herein to the extent not inconsistent with this disclosure. Other examples of material handling devices are provided in U.S. patent application Ser. Nos. 14/550,826; 62/210,348; 15/248,967; 14/775,551; 15/273,370; 14/859,295; and U.S. Pat. No. 9,926,094 commonly owned by Applicant, the entire contents of which are hereby incorporated by reference herein to the extent not inconsistent with this disclosure.

Despite advances in material handling technology, there remains a need for devices capable of efficiently manipulating items as they are processed for packaging, storage, and/or delivery, and for addressing explosive growth in ecommerce and retail business to consumer shipments which use automated solutions for processing and packing items. There also remains a need for techniques for efficiently moving items between shipping containers and totes without dropping or damaging merchandise. The present disclosure seeks to fill such needs.

SUMMARY

In at least one aspect, the disclosure relates to an integrated hand for manipulating items received in a shipping container. The integrated hand comprises a base, fingers, and flat plates. The base is carried by a tote handler and movable thereby, the base having a slotted plate. The fingers are extendable from the base through the slotted plate, the fingers slidably movable along slots in the slotted plate. The flat plates are extendable from the base. The flat plates comprise horizontal plates and vertical plates. The horizontal plates extend horizontally along a bottom of the base opposite from the fingers. The vertical plates extend vertically along a side of the base perpendicularly between the horizontal plates and the fingers. The fingers and the flat plates are selectively extendable about the base to define a grip space shaped to receivingly grip the items whereby the items are secured in position during movement of the base.

In another aspect, the disclosure relates to a handling system for manipulating items received in a shipping container. The handling system comprises a tote handler and the integrated hand.

In yet another aspect, the disclosure relates to a method of handling items in a shipping container. The method comprises receiving items in an original orientation from the shipping container by: selectively extending fingers and plates of an integrated hand to define an item space shaped to support the items and grippingly receiving the items between the fingers and the plates; and inserting the items into a tote while maintaining the items in the original orientation by selectively rotating the integrated hand and inserting the integrated hand into the tote.

The present disclosure also relates to a method of automatically decanting from a shipping container to a storage tote or tote with sub-chambers (i.e., tote with divided compartments). The present disclosure also relates to a method and design of tooling to control and maintain original stacks of items as packed into the shipping container.

The present disclosure also relates to manipulated tooling (integrated hand) with the ability to change shape by controlling movement of at least one set of independently controlled opposing fingers and/or plates combined with at least one extendable side plate or wall, all independently controlled and moved together or in combinations for matching sides of the shipping container for the purpose of containing and capturing the items within the shipping container coupled with gravity vectors in one or more axes to have controlling force to control stack of units on all sides. The tooling may be moved by a robot (or manipulator or handler) with programmable combinations of fingers that extend to match the dimensions (e.g., length of a side) of a capture table and/or the tote (or sub-chambers of the tote) along one or more sides.

The present disclosure also relates to matching system configurations (e.g., tooling) to voids (or space) detected in the contents of the tote or sub-chambers in the tote.

The present disclosure also relates to methods of merging tote surfaces to contents of the shipping containers such that drops or falls into the tote are eliminated.

The present disclosure also relates to manipulation of mechanical tooling of the automated handling system by robotics or other mechanical means with the ability to mechanically capture opened shipping containers and contain the items in those shipping containers with fingers or plates of tool hands in various orientations in space to utilize gravity vector(s) to hold and capture the items in the shipping container when the shipping container is extracted from the items.

The present disclosure also relates to an end of tool that contains and captures loose items stacked in a shipping container and maintaining the original stack form of the items in the shipping container while allowing the shipping container to be removed.

The summary is not intended to be limiting on the disclosure or the claims provided herein, and is to be considered in light of the drawings and description provided herein.

BRIEF DESCRIPTION OF THE DRAWINGS

So that the above recited features and advantages of the present disclosure can be understood in detail, a more particular description of the invention, briefly summarized above, may be had by reference to the embodiments thereof that are illustrated in the appended drawings. The appended drawings illustrate example embodiments and are, therefore, not to be considered limiting of its scope. The figures are not necessarily to scale and certain features, and certain views of the figures may be shown exaggerated in scale or in schematic in the interest of clarity and conciseness.

FIGS. 27A1-27I2 are schematic diagrams depicting a handling operation using the tote handlers with various grippers.

DETAILED DESCRIPTION

Figure 1:
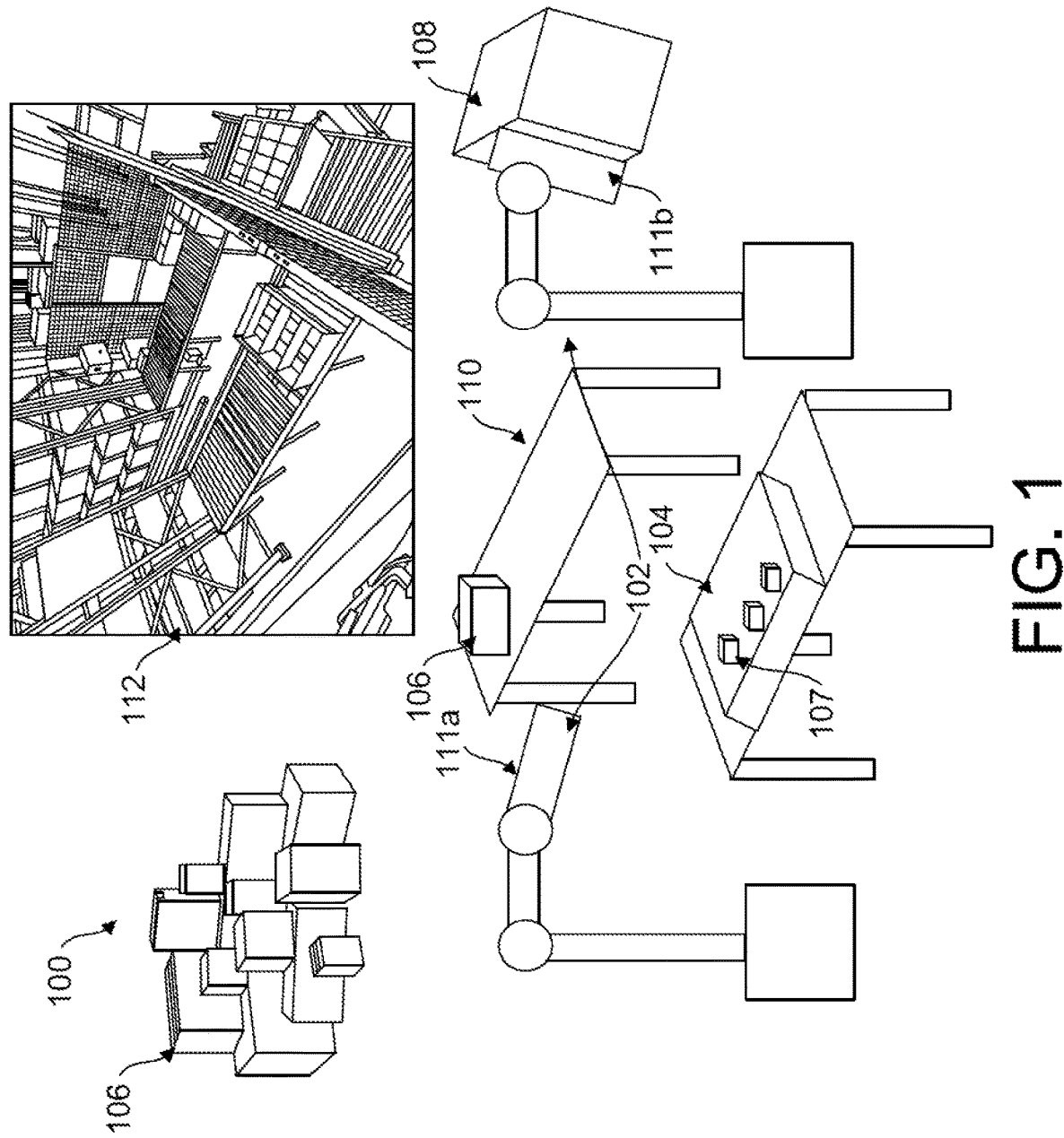
FIG. 1 is a schematic diagram depicting a tote handling system including tote handlers, a tote conveyor, and a capture table.

The description that follows includes exemplary apparatus, methods, techniques, and/or instruction sequences that embody techniques of the present subject matter. However, it is understood that the described embodiments may be practiced without these specific details.

The present disclosure relates to an automated handling system for manipulating items for receipt, storage, packaging, and/or shipment. This tote handling system may be part of the tote handling systems described in the Handling Applications (previously incorporated by reference herein), or separate therefrom, and includes features and capabilities thereof. The handling system of the present disclosure may include a tote conveyor, a tote handler, an integrated hand, and totes. The tote handler may include an integrated hand for selectively engaging the items and/or the tote. The integrated hand may be an adjustable grip hand capable of selectively extending selective portions (or all) of the fingers for engaging the items, or a merger grip hand capable of gripping the tote and the items in the tote for inversion and removal. In this version, the integrated hand is usable to facilitate transfer of the items between containers and totes. For example, the integrated hand may include features of a gripper hand and a capture table integrated to facilitate the receiving the items from the shipping containers, to maintain the packing configuration of the items, and to position the items for transfer by the grip hand.

The handling system may be used to address increasing needs for automation in eCommerce that may require methods and innovation for the handling (decant) process. "Decanting" as used herein refers to the manipulating (e.g., engaging, handling, lifting, merging, rotating, inverting, and separating, transferring and/or moving) of items in a handling system. Such decanting may be used when removing items from packaging, such as a shipping container. Such decanting may include, for example, merging of contents (e.g., one or more items) in shipping containers and totes, and/or transferring such contents between the shipping containers and the totes. In an example, "decanting" may refer to the process of removing (unloading) the items from the shipping container and transferring (loading) into the tote. "Item" may refer to a unit of use goods containing consumer merchandise in individual packaging. One or more individual pieces may be contained within the unit and within the individual packaging. The items may be, for example, units of use goods in individual packaging for the consumer. A "shipping container" may refer to a shipping container, such as a carton, box, case, or other package, that houses the items received from a supplier. "Tote" refers to a container (storage or carrier) capable of carrying one or more items received from the shipping container along the tote handling system.

Decanting can be manually intensive and difficult to get the items into the totes without dropping the items which may potentially cause damage to the merchandise. This can become more difficult with compartmentalized totes (totes with chambers) or sub-totes. The present disclosure seeks to safely automate handling (decanting) the item from shipping container into various sizes of totes, sub-totes, or sub-chambers in the totes without dropping the items.

The tote handling system is intended to provide one or more of the following capabilities, among others: to consolidate and combine existing handling systems to improve processing rates, reduce the cost of the system hardware and handle an extended range of items, handle more items faster with less cost, the ability to automatically change processing and tooling configurations provides the flexibility to handle the diversity of shipping containers and items, adaptability and use with existing automated shipping container cutting technology (e.g., US Patent Application Nos. 20160031580 an 20160016684, the entire contents of which is hereby incorporated in its entirety herein to the extent not inconsistent with this disclosure), unique control schemes to simplify handling of thousands of shipping containers of various shapes, sizes and products, ability to measure and evaluate incoming shipping containers and automatically reprogram downstream processes to decant that shipping container and the items in a suitable and/or optimal method, ability to define the optimal item orientation for fit, storage and picking, ability to automatically select optimum storage compartment for volumetric efficiency, ability to reprogram cut patterns most suitable for that shipping container, digital control over key processes to allow adjustments to be made for the purposes of optimizing the decant function, ability to adjustment manually or by various level of artificial intelligence or machine learning, ability to scan the shipping containers and the items to collect data on decant results allowing AI (artificial intelligence) to make adjustments specific to the package SKU (stock keeping unit) or simply the cube classification, ability to use data base driven or automation to meet handling needs according to specific instructions (e.g., specifications, client requirements, etc.) on how to open and decant, adaptability to changes in vendor products and packaging, ability to automatically maintain data bases with large numbers of the items in constantly changing product packaging, simplified control schemes capable of handling a large numbers of the items and SKUs without need of a data base or DB (database) management, adaptability to constantly changing packaging and product packing without affecting performance, item handling (e.g., decant)) with fewer chances of drops and breakage, completely digital and programmable systems, high handling (decanting) rates, flexibility to accommodate various arrangements of totes and sub-chambers in the totes, etc.

FIG. 1 is a schematic diagram depicting a tote handling system 100 including tote handlers (robots) 102, a tote conveyor 110, and a capture table 104. The tote handling system 100 may be used for handling items 107 received in shipping containers 106, and placing the items 107 into totes 108 for transport and/or storage. The tote handling system 100 may be used, for example, to automate the process of transferring the items 107 from the original shipping container 106 into the totes 108. The tote handlers 102 may also be positioned about conveyors 110 and/or other equipment, such as an Automated Storage and Retrieval System (ASRS) 112 for use with the items 107, the totes 108, and/or the shipping containers 106. The tote handling system 100 may also be used with or include features of the tote handling systems described in the Handling Applications, previously incorporated by reference herein.

In the example shown in FIG. 1, the tote handling system includes a pair of tote handlers 102 positioned about a tote conveyor 110. The tote handlers 102 may receive totes 108 and/or items 107 from the shipping containers 106. The tote handling system 100 may also be used to decant (unload) the shipping containers 106 of items 107 into the totes 108. The tote handlers 102 may be have grippers used to manipulate the shipping containers 106, the items 107, and/or the totes 108. For example, the tote handler 102 may have a gripper in the form of a tote hand 111a for decanting (unloading) the shipping containers 106 of items 107 into the totes 108. The capture table 104 may be positioned to receive and position the items 107 for transfer into the totes 108 and onto the tote conveyor 110. The other tote handler 102 may have a gripper in the form of a tote hand 111b used to manipulate the totes 108 for receiving the items 107 and/or moving the totes 108 use about the capture table 104, the tote conveyor 110, and the ASRS 112. As described further herein, features of the capture table 104 may be integrated into the tote hand 111a to facilitate handling of the items 107 as is described further herein.

Figure 2A:
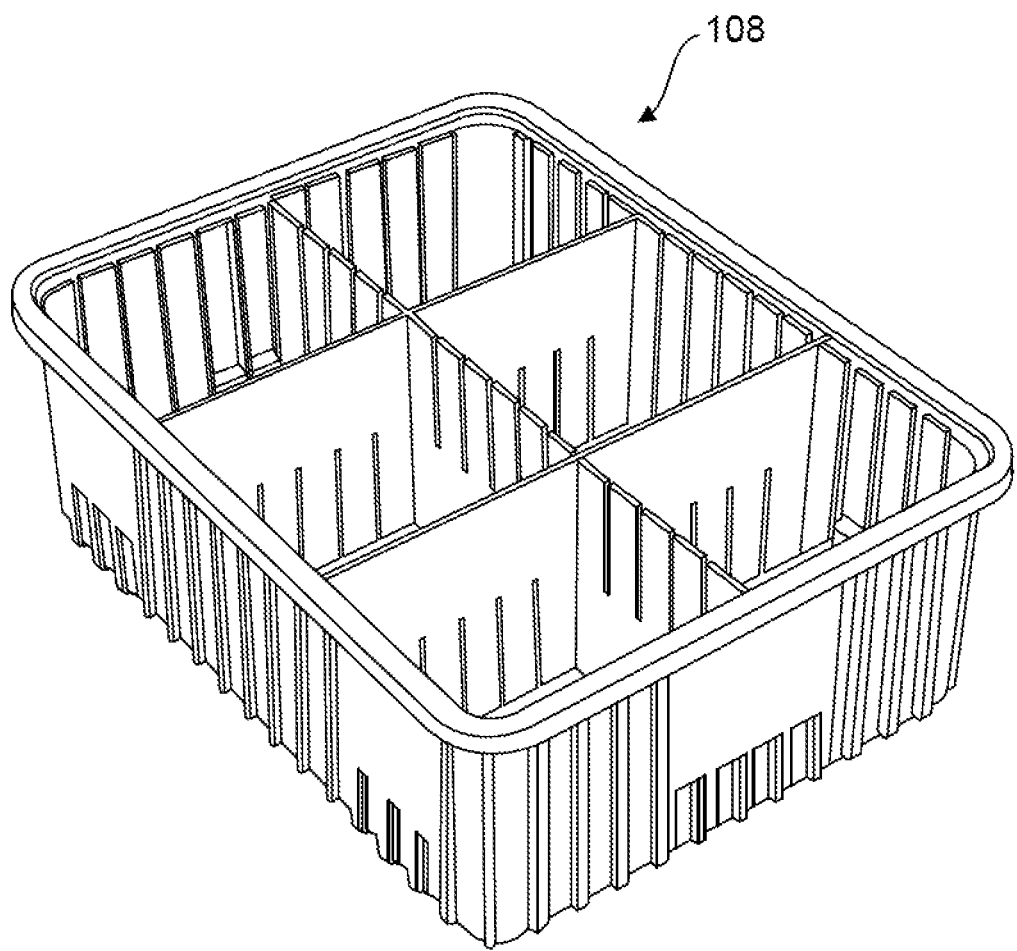
FIGS. 2A and 2B are schematic diagrams depicting example totes with sub-chambers.
Figure 2B:
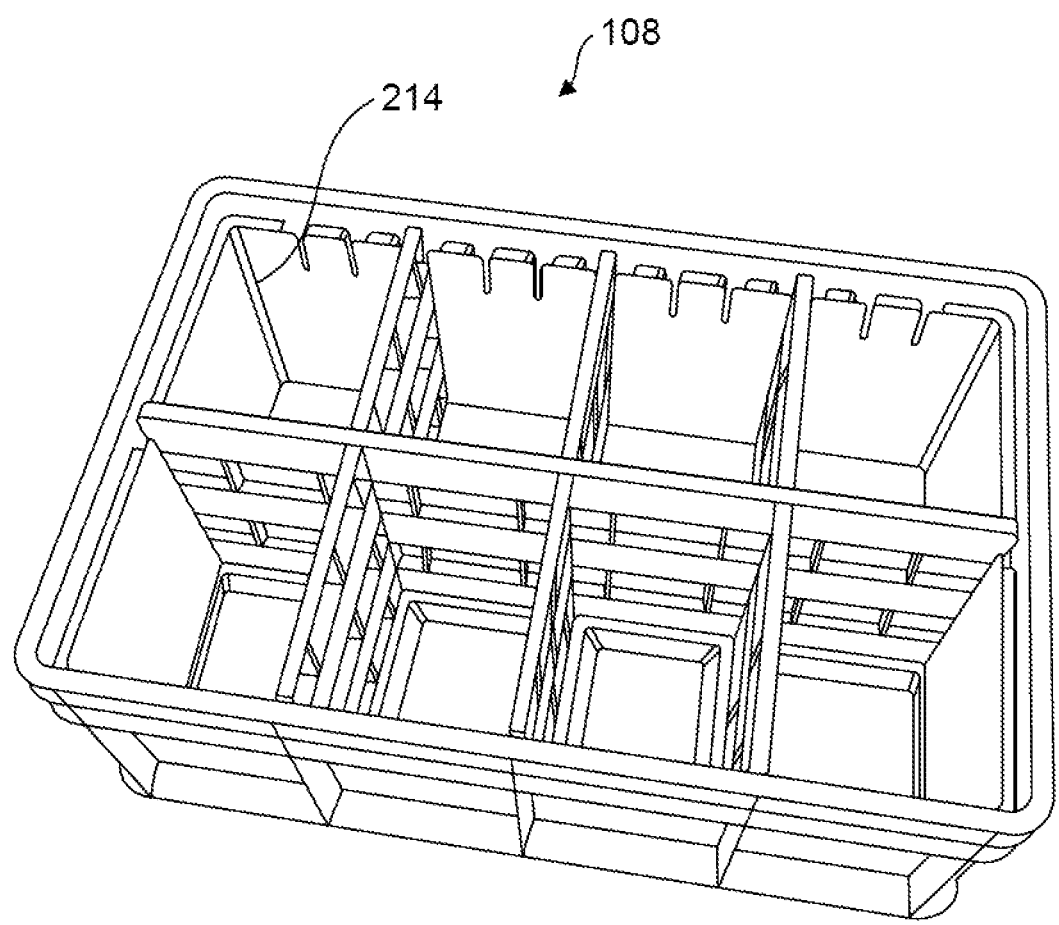

FIGS. 2A and 2B are schematic diagrams depicting example totes 108 with sub-chambers 214. The totes 108 may be, for example, uniform containers used in the ASRS 112 (FIG. 1), goods to person, and/or goods to robot. The ASRS 112 (FIG. 1) may be used to store the totes 108 and/or units of use items 107 until orders placed online need to be filled.

The totes 108 may be provided with chambers for storing items in a specific arrangement. As shown in FIGS. 2A and 2B, the totes may be divided into the sub-chambers (compartments) 214 within the totes 108 for receiving the items 107. As demonstrated by these figures, the use of sub-totes or sub-chambers within the totes 108 may be used to increase storage density and/or to allow more item part numbers to be stored in a smaller volume or space. Examples of other totes that may be used are described in the Handling Applications previously incorporated herein.

Figure 3:
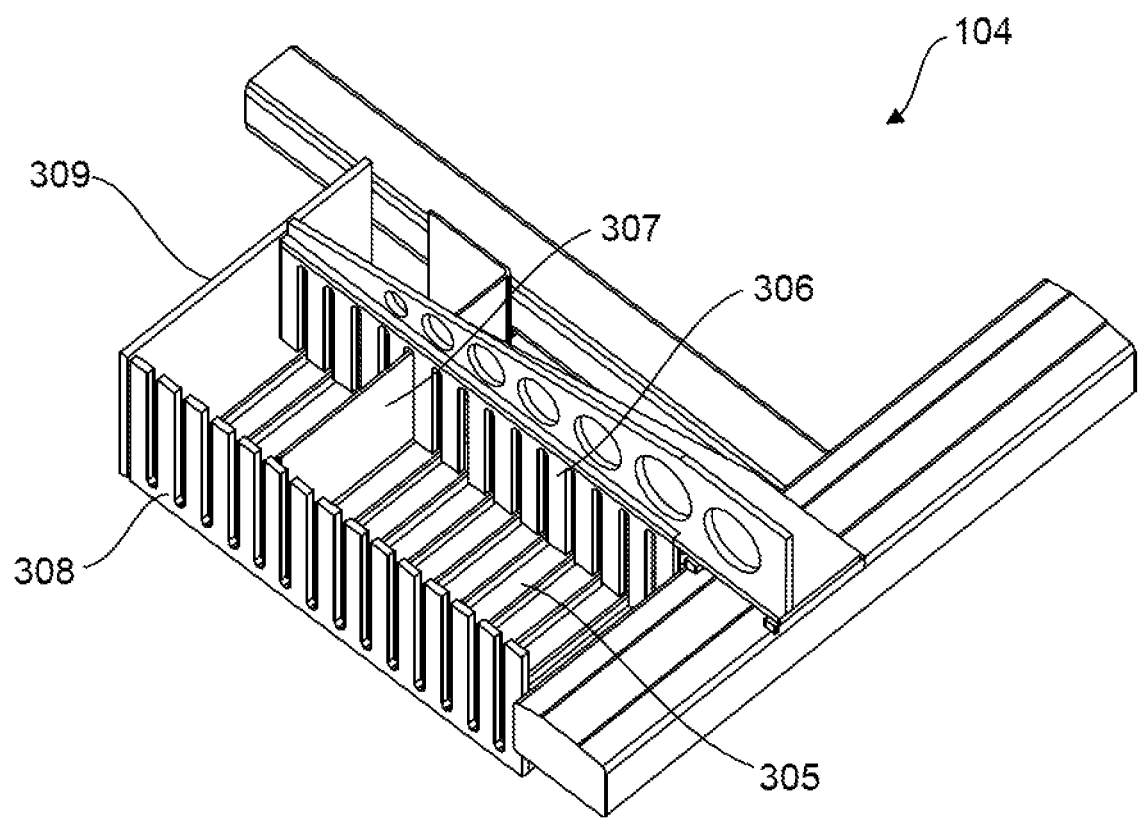
FIG. 3 is a schematic diagram depicting a capture table with programmable dimension adjustments.

FIG. 3 is a schematic diagram depicting the capture table 104 with programmable dimension adjustments. The capture table 104 may be positioned on the tote conveyor 110 for use with the tote handlers 102 (FIG. 1). The tote handlers 102 may use the tote hand 111a to selectively manipulate the items 107 into/out of the capture table 104. The capture table 104 may be configured to the size of the shipping container 106, the tote 108, or a container or sub-compartment within the totes 108 or the shipping container 106 (FIG. 1). The capture table 104 may have programmable dimensions (e.g., length and width adjustments) that are incorporated into the tote handler 102 (FIG. 1). In an example, operation, the items 107 received from the shipping containers 106 may be stored and positioned in the capture table 104, and transferred by the tote hander 102 for placement into the totes 108.

As shown in this example, the capture table 104 includes base 305, stationary plates 308 and 309, and movable plates 306, 307. The stationary plates 308, 309 in the capture table 104 may be configured for use with the shipping container 106 and the stack of items 107. The capture table 104 of the tote handling system 100 may also include features of the capture tables described in the Handling Applications, previously incorporated by reference herein.

Figure 4:
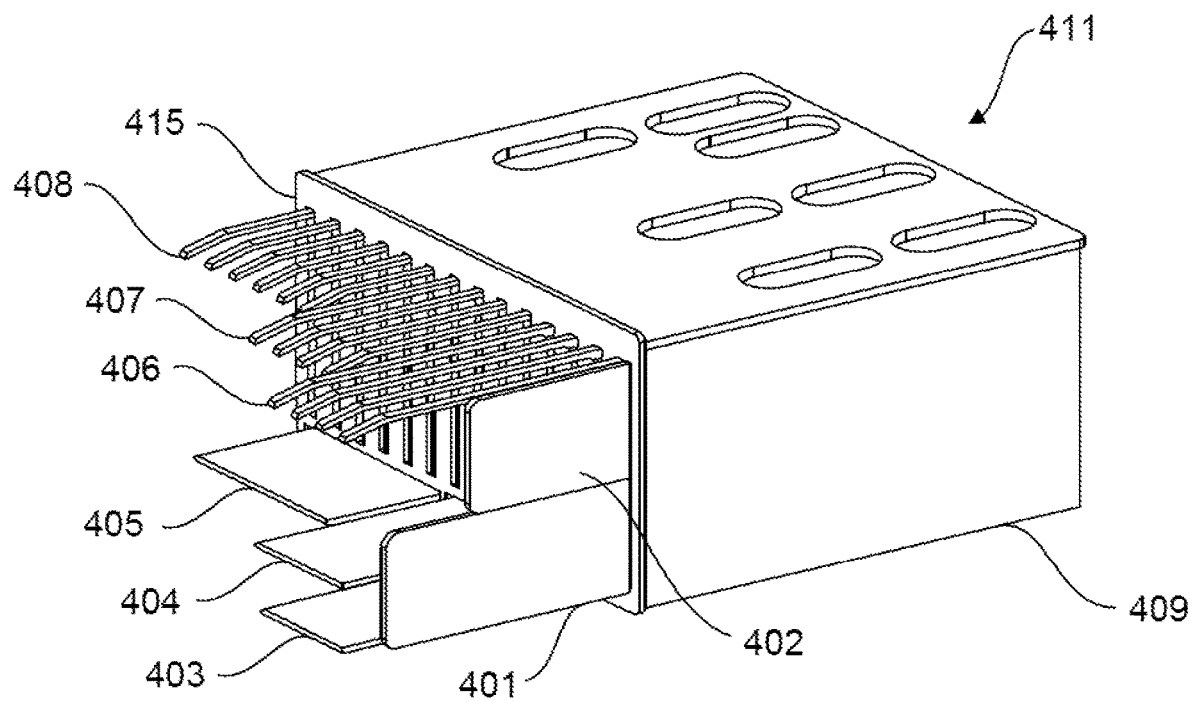
FIGS. 4-5 are schematic diagrams depicting various views of an integrated hand usable with the tote handler.
Figure 5:
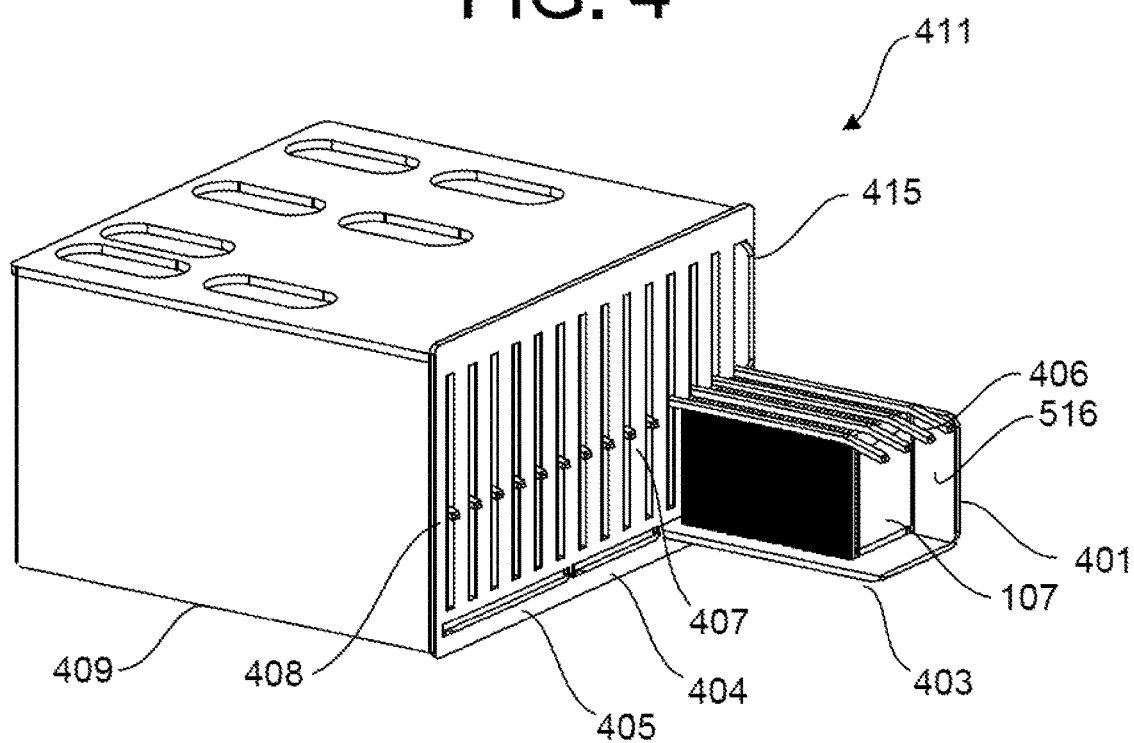

FIGS. 4-5 are schematic diagrams showing various views of an integrated hand 411 usable with the tote handler 102. The figures show the integrated hand 411 including features of the tote hand 111a (FIG. 1) integrated with features from the capture table 104 (FIG. 3). FIG. 4 shows the integrated hand 411 with programmable surfaces, such as fingers 406-408 and plates 401-405. FIG. 5 shows the integrated hand 411 with item(s) 107 supported by the fingers 406 and the plates 401, 403.

The integrated hand 411 may be used as the tote hand 111a of the tote handler 102 of FIG. 1. The integrated hand 411 may also include features of the tote hand described in the Handling Applications, previously incorporated herein for gripping and manipulating the items 107, the shipping containers 106, and/or the totes 108. With the integrated hand 411, the automatic handling system 100 may be used for automating pack out operations for ecommerce order fulfillment. For automated handling (decant), the integrated hand 411 may be used to streamline the handling operations and to eliminate the configurable capture table 104.

As shown in FIG. 4, the integrated hand 411 includes a base 409 with slotted wall 415, the extendable fingers 406-408, and the plates 401-405. The base 409 may be carried by the tote handler and is movable thereby. The base 409 is shown as a cuboid structure with the slotted wall 415 at one end thereof. The fingers 406-408 may be extended from an end of the base 409 and through the slotted wall 415 for insertion into the shipping container 106. The fingers 406-408 may also slide along slots in the slotted wall 415 for gripping the items 107 in the shipping container 106. The fingers 406-408 may also be used to define a finger surface for urging the items 107 against one or more of the plates 401-405.

The plates 401-405 may include side plates 401, 402 and bottom plates 403-405. The plates 401-405 may be flat surfaces extendable from an end of the base 409 and through the slotted wall 415 for insertion into the shipping container 106. The plates 401-405 may include vertical plates 401, 402 and horizontal plates 403-405. The horizontal plates 403-405 are aligned parallel to the fingers 406-408 and may define a horizontal plate surface opposite the finger surface for supporting the items 107 thereagainst. The vertical plates 401, 402 are aligned perpendicular to the fingers 406-408 and the horizontal plates 403-405 to define a vertical plate surface between the finger surface and the horizontal plate surface for supporting the items 107 thereagainst. A corner may be divided between the vertical plates 401, 402 and the horizontal plates 403-405 for supporting the items.

The fingers 406-408 and the plates 401-405 may be selectively movable about the base 409 for gripping and positioning the items 107. The fingers 406-408 and the plates 401-405 may be selectively extended by an actuator and motor within the base (not shown). The fingers 406-408 and the plates 401-405 may be positioned to conform to known measurements of the shipping container 106, the items 107, and/or the totes 108. The movement and/or positions of the fingers 406-408 and the plates 401-405 may be pre-programmed based on the known measurements. For example, the plates 401-405 may be stationary plates with the fingers 406-408 adjustably positioned about the plates 401-405 for gripping the items 107.

In this version, the integrated hand 411 may incorporate the functions of the capture table 104. The function of the capture table 104 is combined into the integrated hand 411 to configure to the size of the shipping container 106, tote 108, or the sub-chamber 214 of the tote 108. The capture functions of the capture table 104 may be combined into the design of the integrated hand 411. These functions may be replaced by the backing plate 401 and movable side plates 401 and 402 in the integrated hand 411. The movable plates 306 and 307 (FIG. 3) of the capture table 104 may also be eliminated through programmable orientation use of gravity vector forces. The stationary flat plate 305 (FIG. 3) may be replaced with one or more movable flat plates 401-405 in the integrated tote hand 411 without tooling voids. Tooling voids on the bottom plate(s) are no-longer needed as the transfer of the items 107 from the capture table 104 to the tote 108 is eliminated. The capture of the items 107 and the removal of the shipping container 106 occur in the integrated tote hand 411. The integrated hand 411 may also include features to handle a range of items 107.

The flat plates 403-405 may also be used on one side of the integrated tote hand 411 to act as the base (bottom surface) 305 of the capture table 104 (FIG. 3). The flat plates 403-405 may be used to enable the capture of thin items 107 that may fall between the tooling fingers 406-408 and fall into tooling recesses defined therebetween to further expand the range of the items 107 handled. While features of the capture table 104 may be eliminated, the integrated hand 411 may be provided with other features of the capture table as described in the Handling Applications previously incorporated herein.

FIG. 5 shows another view of the integrated hand 411 with the fingers 406 and plate 403 selectively activated to grip the item 107. As shown by this view, the grippers of the tool hands used with some tool handlers (see, e.g., tool handers of the Handling Applications, previously incorporated by reference herein) may be replaced with the plates 401, 403. This version of the integrated hand 411 replaces a group of the fingers of the previous gripper in the Handling Applications with the solid plates 401, 403.

The multi-stage set of extendable tooling may remain to accommodate various sizes of containers and or sub-chambers 214 in the totes 108 (FIGS. 2A and 2B). Group(s) of opposing fingers from the gripper in the Handling Applications are replaced with at least one flat plate(s) (403,404, 405). The fingers 406 and plates 401, 403 are extended to define an item space 516 shaped to grippingly receive the item 107 therein. The item space 516 may be defined along a corner between the vertical plate 401 and the horizontal plate 403. The item space 516 may be adjusted to allow receipt of the items 107, and then to allow gripping and/or securing of the items 107 in the item space 516. A space between the fingers 406-408 may be closed to increases the items 107 handled. The thinner space may no longer allow the items 107 to fall between the fingers 406-408.

The fingers 406-408 on the opposing side may allow interaction with tool reliefs and gaps in conveyor. The integrated hand 411 may extend different sets of the fingers 406-408 and plates 401-405 to accommodate various shipping containers 106 and/or sub-chamber sizes of the totes 108. Different groups of the fingers 406-408 and the plates 401-406 can be combined to achieve various tooling widths for one or many shipping container 106 and/or tote 108 sizes. The plates 401-405 and the fingers 406-408 may extend to match up with the shipping container 106 measurements as picked. The shipping container 106 measurements may be taken during a cutting process.

The fingers 406-408 may be retained on one side of the integrated hand 411. The pitch of the fingers 406-408 may be fine like in previous tooling designs to capture and hold the items 107 from the shipping container 106. The fingers 406-408 may be used to grip the shipping containers 406 from the bottom. The added flat plate(s) 401-405 may grip the open side of the shipping container 106 coming into direct contact with the items 107 when flipped or rotated.

Figure 6:
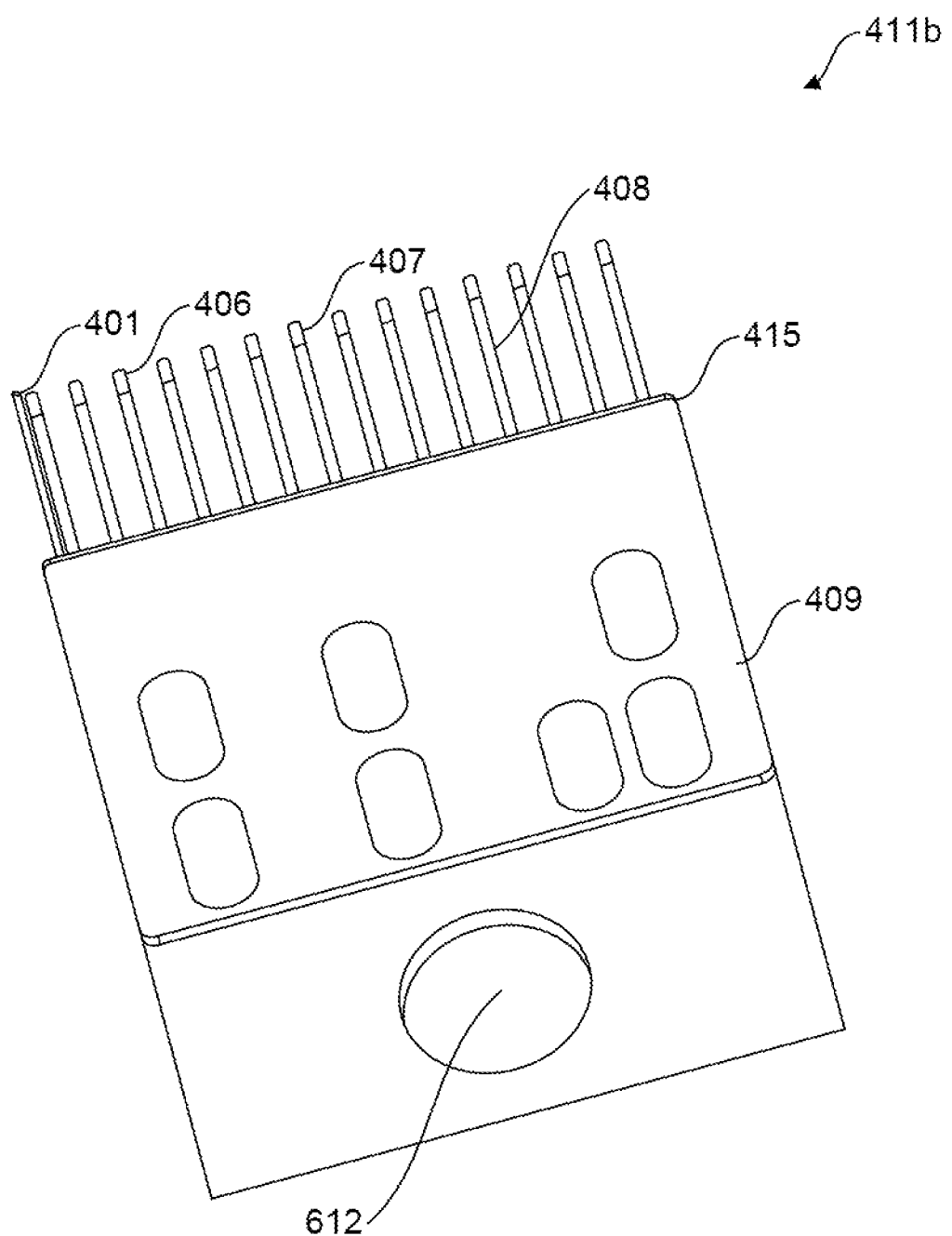
FIGS. 6-7 are schematic diagrams depicting various views depicting attachment of the integrated hand with the tote handler.
Figure 7:
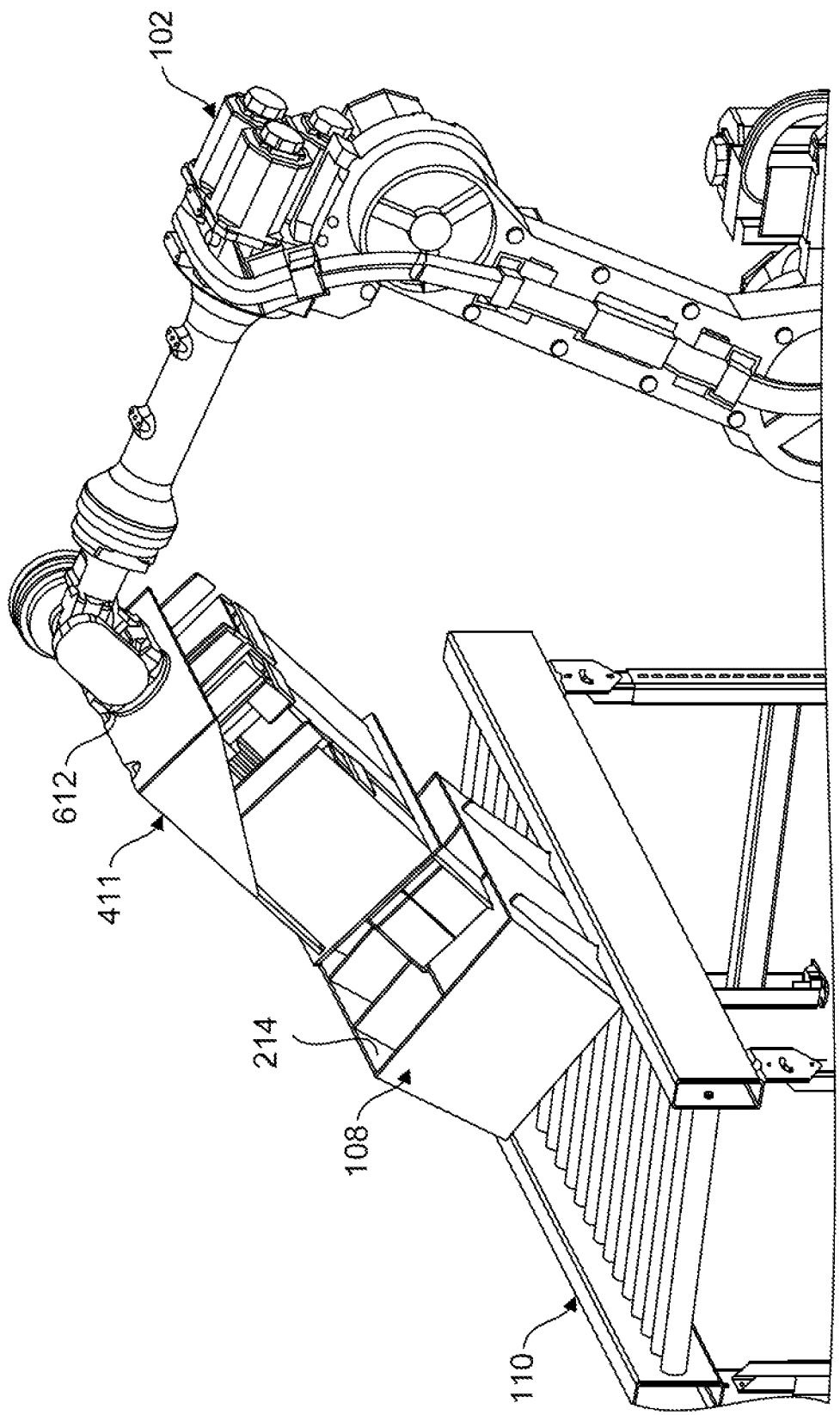

FIGS. 6-7 are schematic diagrams showing various views depicting attachment of the integrated hand 411 with the tote handler 102. FIG. 6 shows an attachment point 612 of the integrated hand 411. FIG. 7 shows the integrated hand 411 attached to the tote handler 102 by the attachment point 612. FIG. 7 also shows use of the integrated hand 411 of the tote handler 102 to insert items 107 from the shipping container 106 into the sub-chambers 214 of the tote 108 positioned on the tote conveyor 110. As shown in these figures, the integrated hand 411 may be connected to the tote handler 102 for added flexibility and increased articulation.

By moving attachment point 612 of the tote handler 102 to the rear center of the integrated hand 411 (opposite the slotted wall 415), flipping the integrated hand 411 around the center longitudinal axis of the integrated hand 411 may be facilitated. The modified attachment point 612 may also allow great flexibility in the orientations of the integrated hand 411 for other capture operations now combined into a single tool. Placing the attachment point 612 at a rear center of the integrated hand 411 may be used to enable increased articulation of the tooling. The attachment point 612 may be near or on center with a tooling axis to allow for inversion of the integrated hand 411 at most any angle in space. The attachment point 612 may also increase a range of tool orientation and allow gravity to become a useful tool in the capture of the items 107. Orientation of the integrated hand 411 can be such that a capture bed orientation allows gravity vectors to force the shipping containers 106 and the items 107 against the side plates 401, 402 and bottom plates 403, 404, 405.

The bottom and top of the integrated hand 411 may be interchanged for different functions by rotating the integrated hand 411 about its longitudinal axis. As shown in FIG. 7, the integrated hand 411 may be moved by the tote handler 102 to pick the opened shipping container 106 from the top or sides depending on required item orientation. The integrated hand 411 may be rotated before picking so as to load the items 107 into the tote 108 horizontally or in the upright position. This rotation allows the integrated hand 411 to move over the shipping container 106 from the top gripping the shipping container 106 from the sides. The integrated hand 411 can then rotate to move to the shipping container 106 from the side gripping the top and bottom of the shipping container 106. After the shipping container 106 is removed from the integrated hand 411 leaving the items 107 in their original cube stack for placement horizontally or upright. It is at this orientation in respect to the gravity vectors that the shipping container 106 is extracted followed by clamping the loose items 107 in a tight array or stack.

The automated handling system may eliminate the requirement for intermediate robotic tooling. The integrated hand 411 may directly grip the opened shipping container 106 with the top removed. The intermediate transfer process is now combined into one robot station with the changes in the integrated hand 411. The fingers 406-408 remain on one side of the integrated hand 411 to fit the voids created on the conveyor 110 by roller size and pitch or lifting grid. The pitch of the fingers 406-408 may be relatively fine to capture and hold small shipping containers 106 and to control the items 107.

Figure 8:
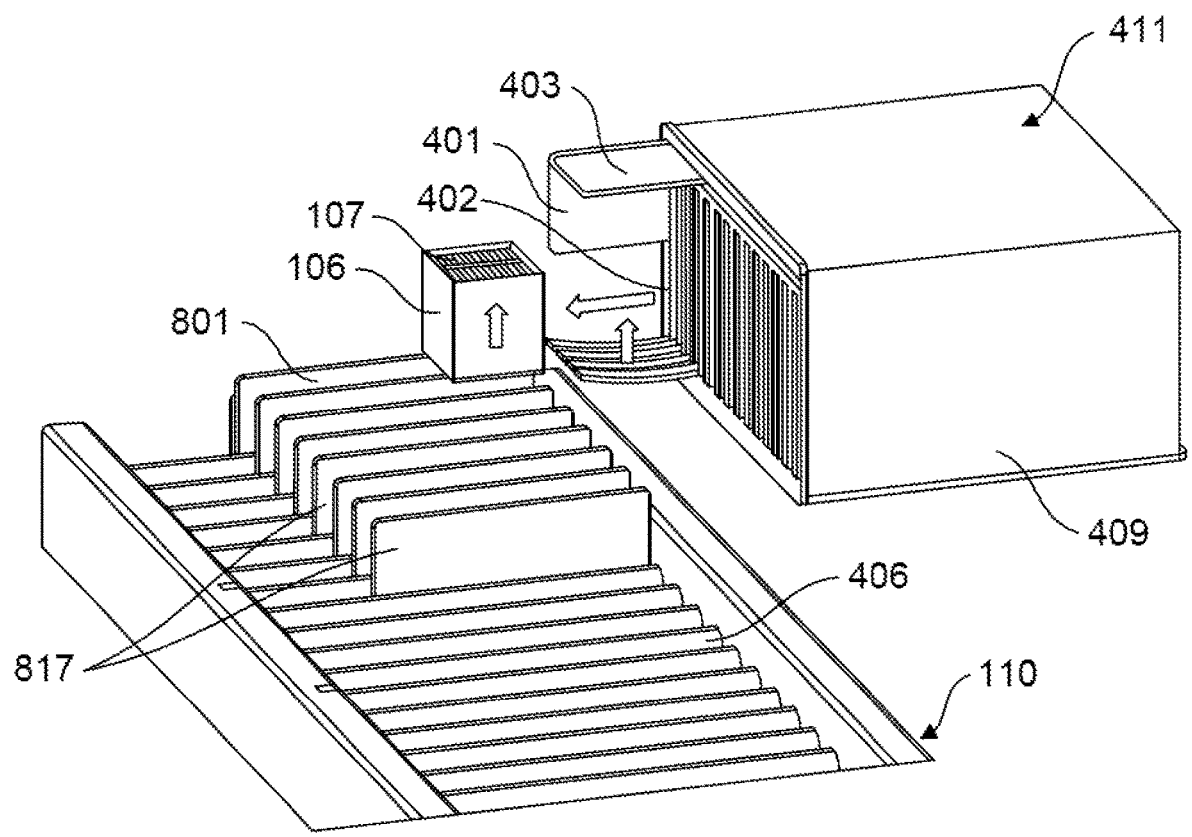
FIGS. 8-10 are schematic diagrams depicting adjustment of the integrated hand to the items from the shipping container.
Figure 9:
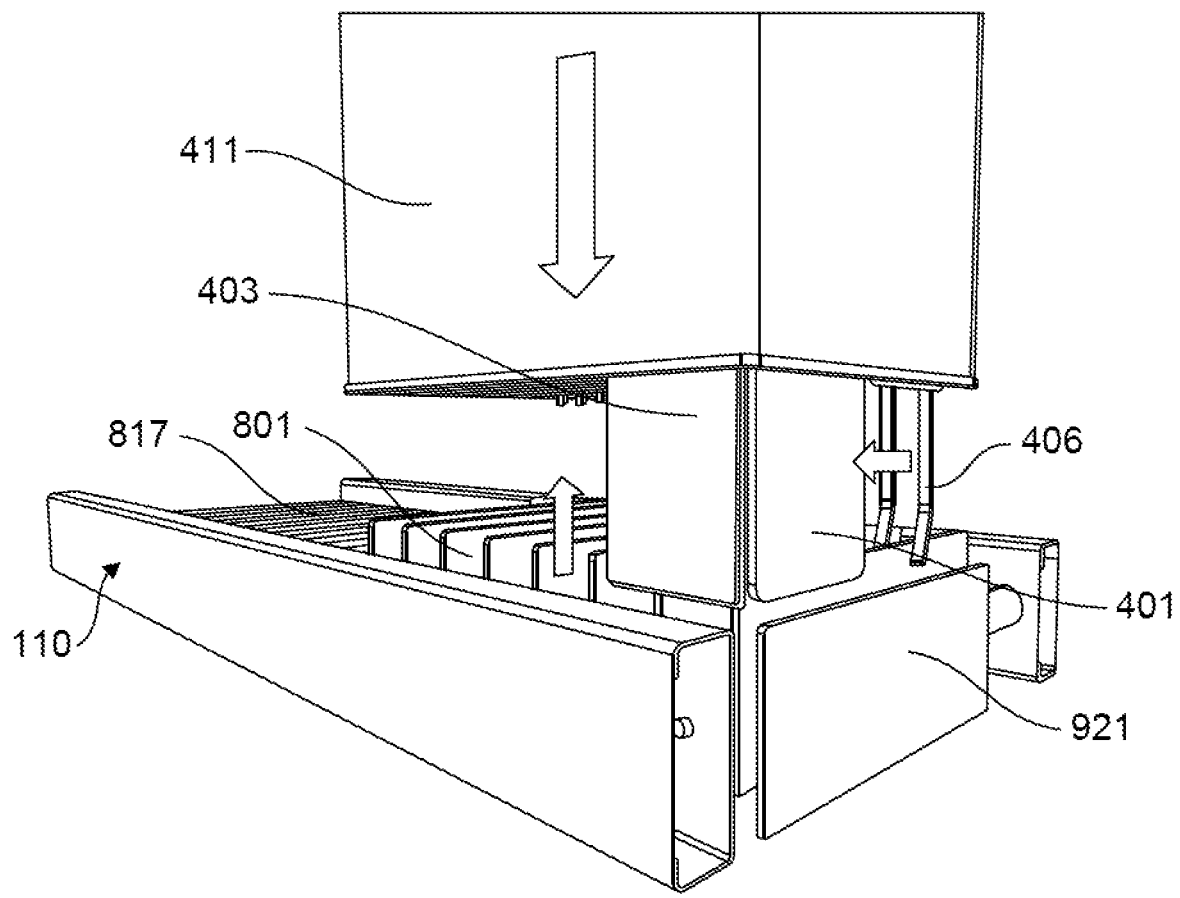
Figure 10:
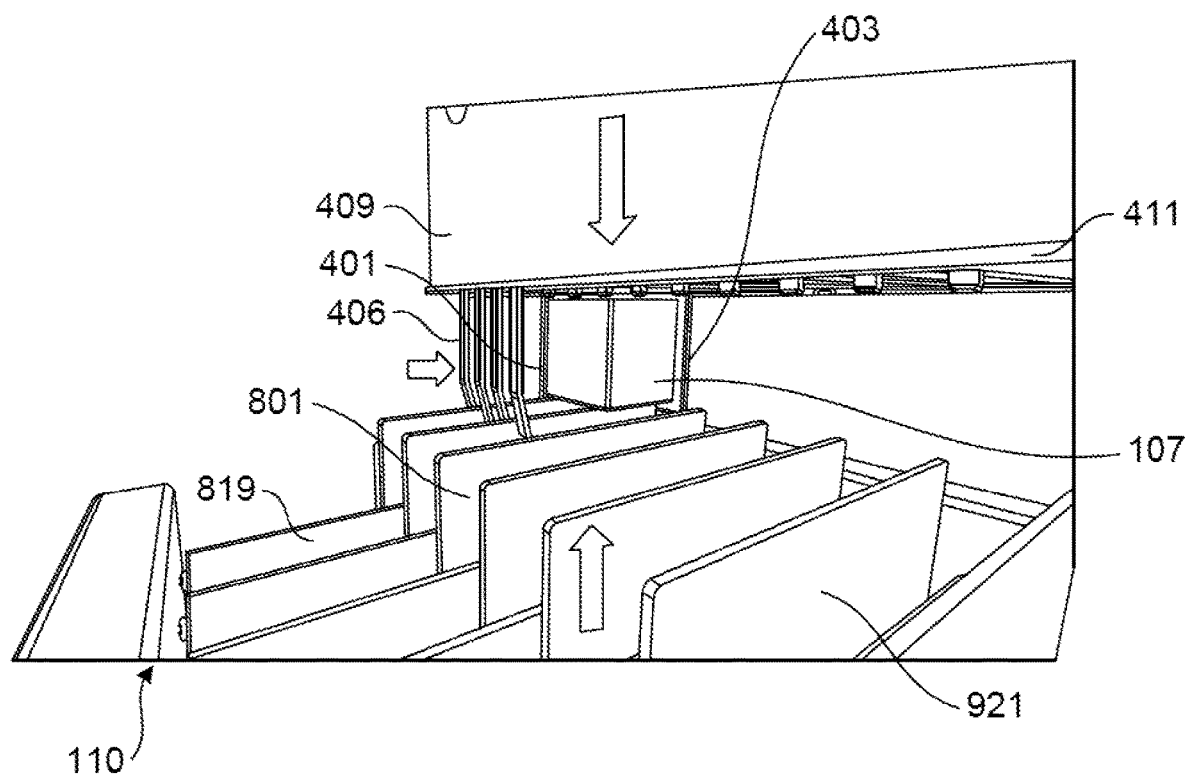

FIGS. 8-10 are schematic diagrams depicting adjustment of the integrated hand 411 to the items 107 from the shipping container 106. These figures depict picking of the items 107 from the shipping container 106 using the integrated hand 411. FIG. 8 shows the fingers 406 on one side of the integrated hand 411 meshed with the voids in the conveyor rollers 819. FIG. 9 shows a picking cut of the shipping container 106 from overhead. FIG. 10 shows another view of the picking cut of the shipping container 106 from overhead.

As shown in FIG. 8, the tote conveyor 110 may be provided with a lifting grid (mechanism) 801 in the form of a set of lift plates 817 perpendicular to the direction of the conveyor 110 travel that fit in spaces between rollers 819 of the conveyor 110. The lift plates 817 are attached to the lifting grid 801 that raise and lower the lift plates 817 together. The lift plates 817 may be lowered below the conveyor rollers 819 to allow the shipping container 106 to convey in place over the lift plates 817, and then lifted to raise the shipping container 106 over the rollers 819. The lifting grid 801 may be lifted to raise the shipping container 106 above the conveyor 110, thereby allowing the fingers 406 to pass between the lift plates 817 under the shipping container 106 to grip and lift the shipping container 106.

As shown in FIG. 8, before the opened shipping container 106 is picked, the flat plates 401, 403 and the fingers 406 may move to define a shape similar in size to the outside of the shipping container 106. The size of the shipping container 106 may be known from measurements taken upstream in other processes, such as automated opening of the shipping containers. During this process, the fingers 406 may move as indicated by arrow 1, the integrated hand 411 may advance towards the conveyor 110 as indicated by the arrow 1, and the shipping container 106 may be lifted by the lift plates 817 as indicated by the arrow 3.

FIG. 9 depicts picking the opened shipping container 106 from the side. After the shipping container 106 is lifted above the rollers 819 by the lifting grid 801, the integrated hand 411 moves to pick the opened shipping container 106 (at 1). One or more sets of the fingers 406 positioned between the lifting grid 801 may now close to grip the shipping container 106 against one or more of the plates 403 (at 2). At 3, the opened shipping container 106 is lifted from by the lifting grid 801.

FIG. 9 also shows the shipping container 106 being cut open from overhead. To load the tote 108 with the items 107 in the original upright orientation as in the shipping container 106, the opened shipping container 106 may be picked by the integrated hand 411 from overhead. The shipping container 106 is conveyed to an end stop 921 and also located to a side of the conveyor 110. This or similar means located the shipping container 106 to a corner point. The integrated hand 411 extends the correct sets of the fingers 406 and the plates 401,403 matching with the known dimensions of the open shipping container 106.

FIG. 10 shows another view of the shipping container 106 being cut from overhead. As shown in FIG. 10, the integrated hand 411 is moved over the shipping container 106 aligning the corner point formed by the inside intersection of the plates 401 and 403. When the shipping container 106 is in place (located to one corner), the lifting grid 801 raises the shipping container 106 above the rollers 819 at 1. The integrated hand 411 then lowers down over the shipping container 106 at 2. The side plate(s) 401 and bottom plate(s) 403 may not interfere with the lifting grid 801. Likewise, the fingers 406 are in the spaces between the lift plates 817 in the lifting grid 801. At 3, the fingers 406 close to capture the shipping container from overhead.

Figure 11:
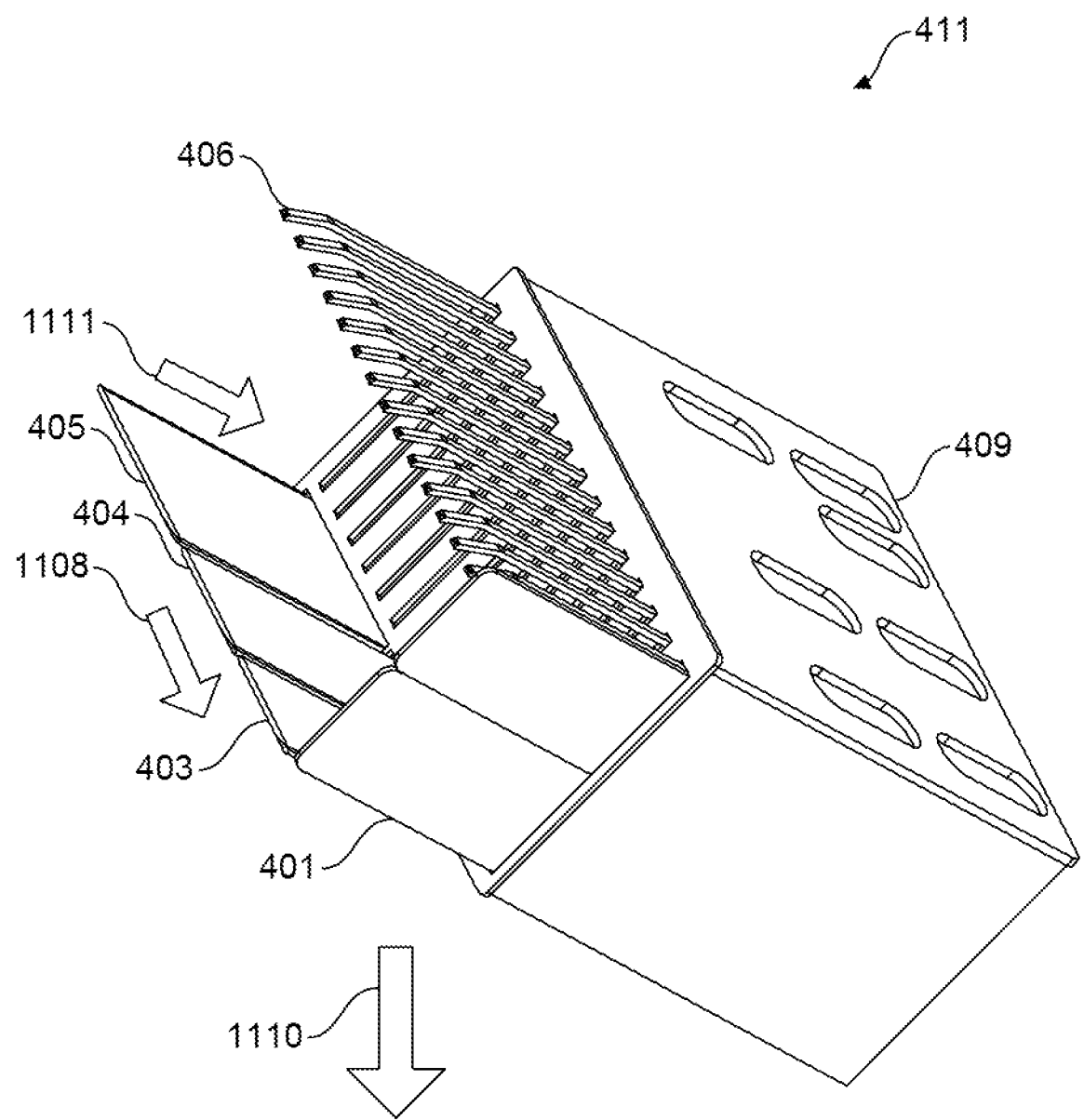
FIGS. 11-14 are schematic diagrams depicting positioning of the items using the integrated hand.
Figure 12:
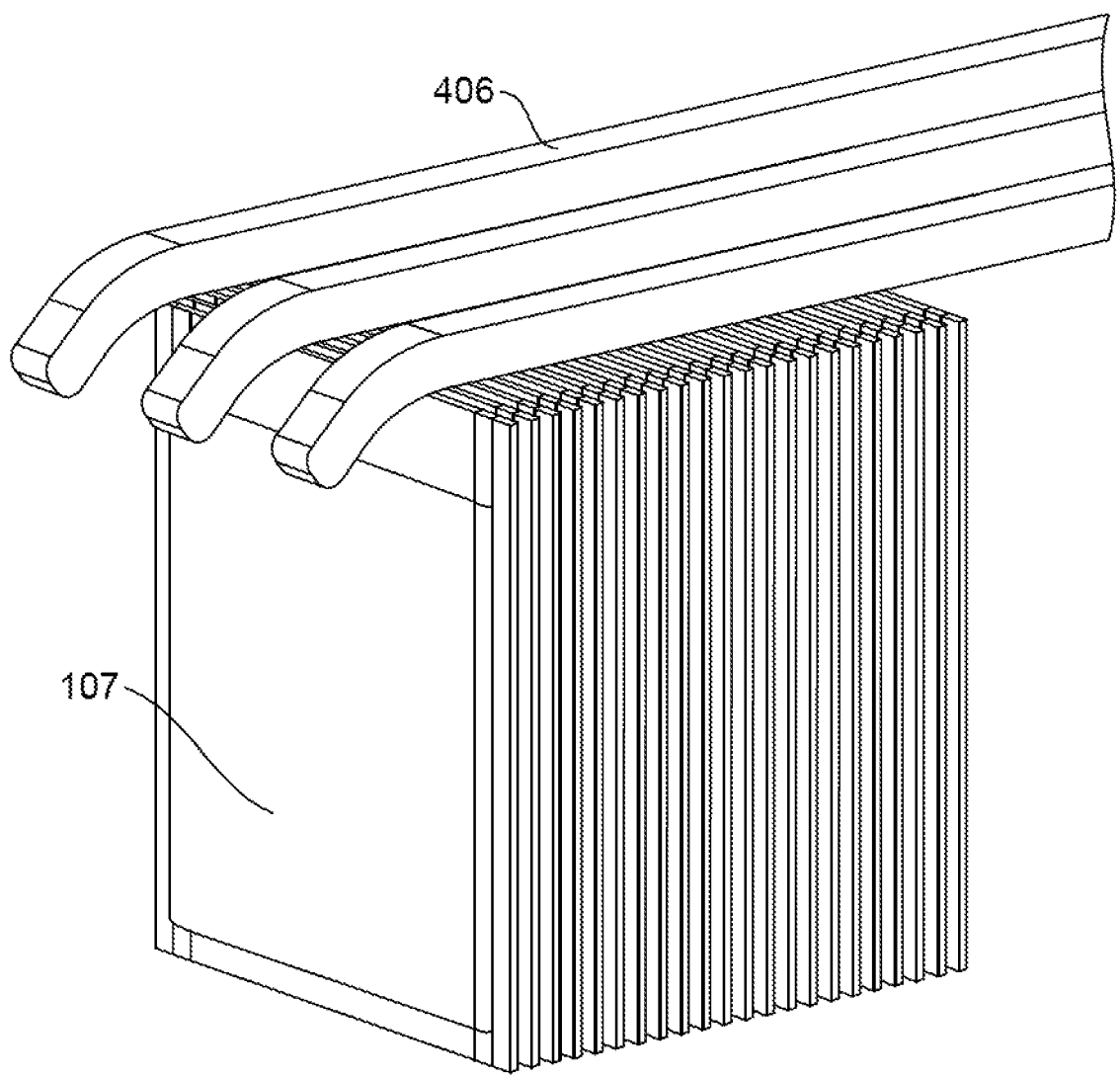
Figure 13:
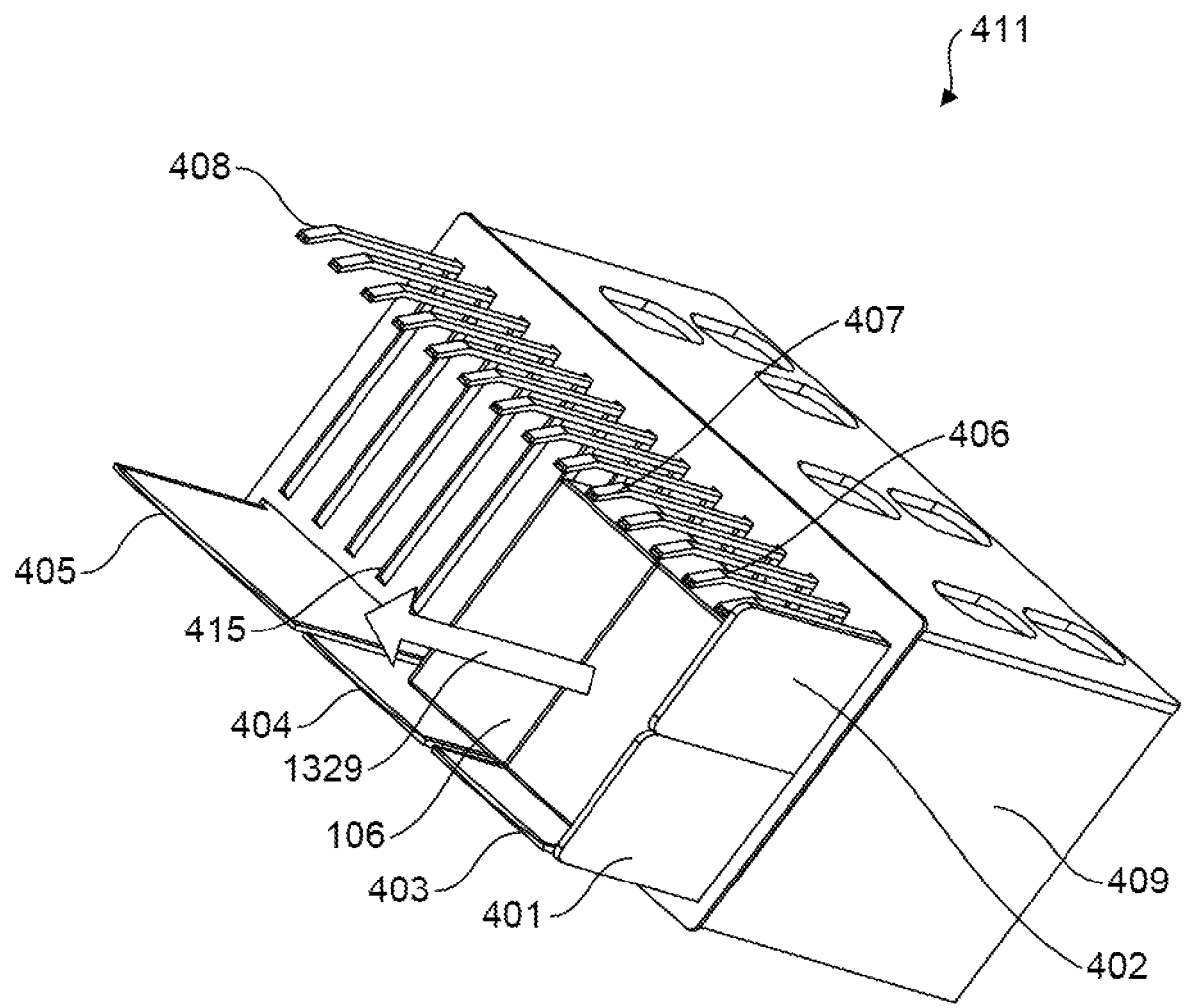
Figure 14:
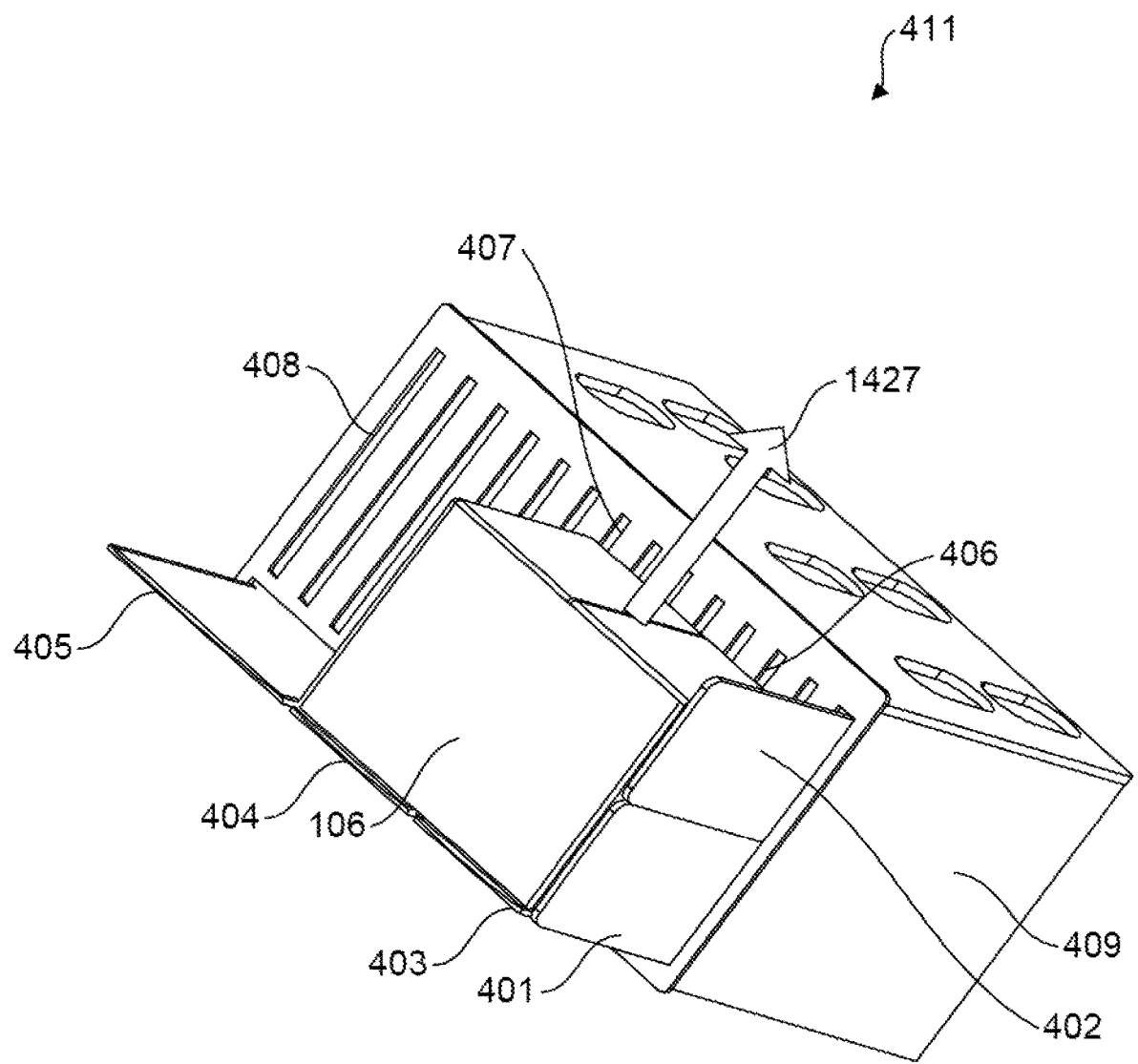

FIGS. 11-14 are schematic diagrams depicting positioning of the items 107 using the integrated hand 411. FIG. 11 shows vectors applied to the integrated hand 411. FIG. 12 shows the fingers positioned about the item 107. FIG. 13 shows the fingers 406-408 and the plates 401-405 positioned about the item 107. FIG. 14 shows the fingers 406-408 retracted to allow the items 107 to move from the integrated hand 411.

Referring first to FIG. 11, this figure shows gravity vectors 1108, 1110, 1111, such as gravity, for controlling (e.g., biasing, registering, etc.) the items 107. After the opened shipping container 106 is picked from the conveyor 110, the integrated hand 411 tilts and rotates using gravity to bias the shipping container 106 and its contents to stay firmly within the confines of the integrated hand 411. The rotation occurs for the shipping containers 106 picked from the side to invert the shipping causing the items 107 to rest onto the flat plates 403,404,405.

The manipulation of the items using the integrated hand 411 may vary depending on the situation. In the case of picking the shipping container 106 from the top, inverting the shipping container 106 may not be required. In some cases, some of the items 107 may not have sufficient rigidity to impart force or enact the required amount of friction to hold the items 107 against the full force of gravity. The integrated hand 411 may also be manipulated to address various configurations, for example, by registering the items 107 by aligning the stack, group or matrix of the items 107 into a tight formation in a known (e.g., registered) position in the integrated hand 411. Orienting the integrated hand 411 in space at specific orientations may control the gravity vectors enacting force on each of the individual items 107, as opposed to clamping where a greater force needed to hold or move the group of the items 107 is transmitted through all of the individual items 107.

Clamping, holding, or moving the items 107 without the aid of gravity (e.g., vectors 1108, 1110, 1111) may be used to raise the requirement for structural integrity or rigidity of the individual units of the items 107 to withstand the force to hold or move multiple of the items 107. This required rigidity can reduce the range of the items 107 that can be handled (e.g., typical in grocery applications). Various articulations in space of the shipping container 106, the tote 108 and the integrated hand 411 enable the use of gravity to assist the control of the items 107 when transferring to totes 108 and the tote sub-chambers 214 (FIG. 2).

FIG. 12 shows features of the fingers 406 used to aid in holding items 107 by the integrated hand 411. The fingers 406 may have slight bends, radii, or bumps at ends of the fingers 406 to provide addition holding when picking the shipping containers 106 and/or unloading the items 107 into the totes 108. These features may be designed to hold the shipping containers 106 or the items 107 in an orientation that gravity pulls the contents from between the fingers 406. These features hold the items 107 until the fingers 406 open to allow the items 107 to clear the shipping container 106 (or sub-containers within the shipping container 106 that hold the items 107 therein). Using such features may allow secured gripping without employing a damaging gripping force.

FIGS. 13 and 14 show removal of the items 107 from the shipping container 106 by automatic case extraction (ACE). FIG. 13 shows the shipping container 106 or case extraction when the shipping container 106 is gripped on its sides. FIG. 14 shows the shipping container 106 or case extraction when the shipping container 106 is gripped top and bottom.

Prior to the ACE process, the shipping container 106 may be cut and opened using a cutting device. For example, a box cutter (e.g., an automated box cutter (ABOT)) may be used to remove a lid of the shipping container 106. Examples of techniques for cutting boxes is described in U.S. Pat. Nos. 11,186,399 and 9,926,094, the entire contents of which are hereby incorporated by reference herein. The lid may be removed, for example, using a lifting arm with suction cups to engage and remove the lid from the shipping container 106.

Once the lid of the shipping container 106 is removed, as shown in FIG. 13, the shipping container 106 may be gripped on the sides during the ACE as applied directly from the integrated hand 411. After the opened shipping container 106 is picked from the conveyor 110 and oriented for gravity bias, the remaining parts of the shipping container 106 may be extracted from the items 107. The opened shipping container 106 may be removed by an ACE tool (or robot or fixed tooling) for gripping the shipping container as described for example in the Handling Applications. For example, the ACE process may be carried out by another tote handler 102 (or robot or manipulator) as shown in FIG. 1 that may grips the shipping container 106 and pull the shipping container 106 from the integrated hand 411 leaving the items 107 behind. The shipping container 106 may either be lifted or pulled out the front of the integrated hand 411 leaving the contents (e.g., the items 107) within the confines of the integrated hand plates 401-405 acting in place of the capture table 104. During this process, the original space efficient stacking of the items 107 may be maintained as the items 107 are packed into the shipping container 106. This process allows use of the space efficient unit stacking into the sub-chambers 214 of the totes 108. The items 107 may be moved as a complete group to save time and increase throughput.

Shipping container extraction (ACE) may vary depending on how the shipping container 106 is gripped and picked from the conveyor 110. In either case the shipping container 106 may be gripped on the shipping container 106 side opposite from the opened side and pulled in the longitudinal or axel line connecting the open side and bottom of the shipping container 106 as indicated by the arrow 1329.

When the shipping container 106 is picked from the top and gripped on the sides, the shipping container 106 is extracted in the direction on an axis with the integrated hand 411. Prior to the removal of the shipping container 106, the tooling fingers 407 may relax the grip on the shipping container 106 and provide space for the shipping container 106 to be removed while gravity holds the shipping container 106 and its contents in place.

The removal may be completed using various techniques. For example, the ACE may be performed by actively pulling the shipping container 106 from the integrated hand 411. In another example, the integrated hand 411 may move to a stationary extraction tool and move away from the integrated hand 411 after gripping to pull the shipping container 106 from the fingers 407. In either example, the attitude or orientation of the integrated hand 411 may be maintained to preserve the gravity vectors holding the items 107 in place.

FIG. 14 shows another example of the shipping container 106 gripped on the top and bottom during a top pick operation (e.g., ACE or shipping container removal). For extracting the shipping container 106 when gripped from the sides (top pick), the tooling fingers 407 may withdraw completely to allow clearance for the shipping container 106 to move perpendicular to the axis of the integrated hand 411 as indicated by the arrow 1427.

FIGS. 15-22 are schematic diagrams depicting techniques for manipulation of the items 107 for insertion into the totes 108. These techniques may be, for example, used to avoid drops and falls or to arrange the items 107 in specific configurations. The items 107 can be fragile (e.g., made of glass of brittle material) where small drops from the top to the bottom of the shipping container 106 may cause damage. These techniques seek to provide additional protection measures for preventing such damage.

Figure 15:
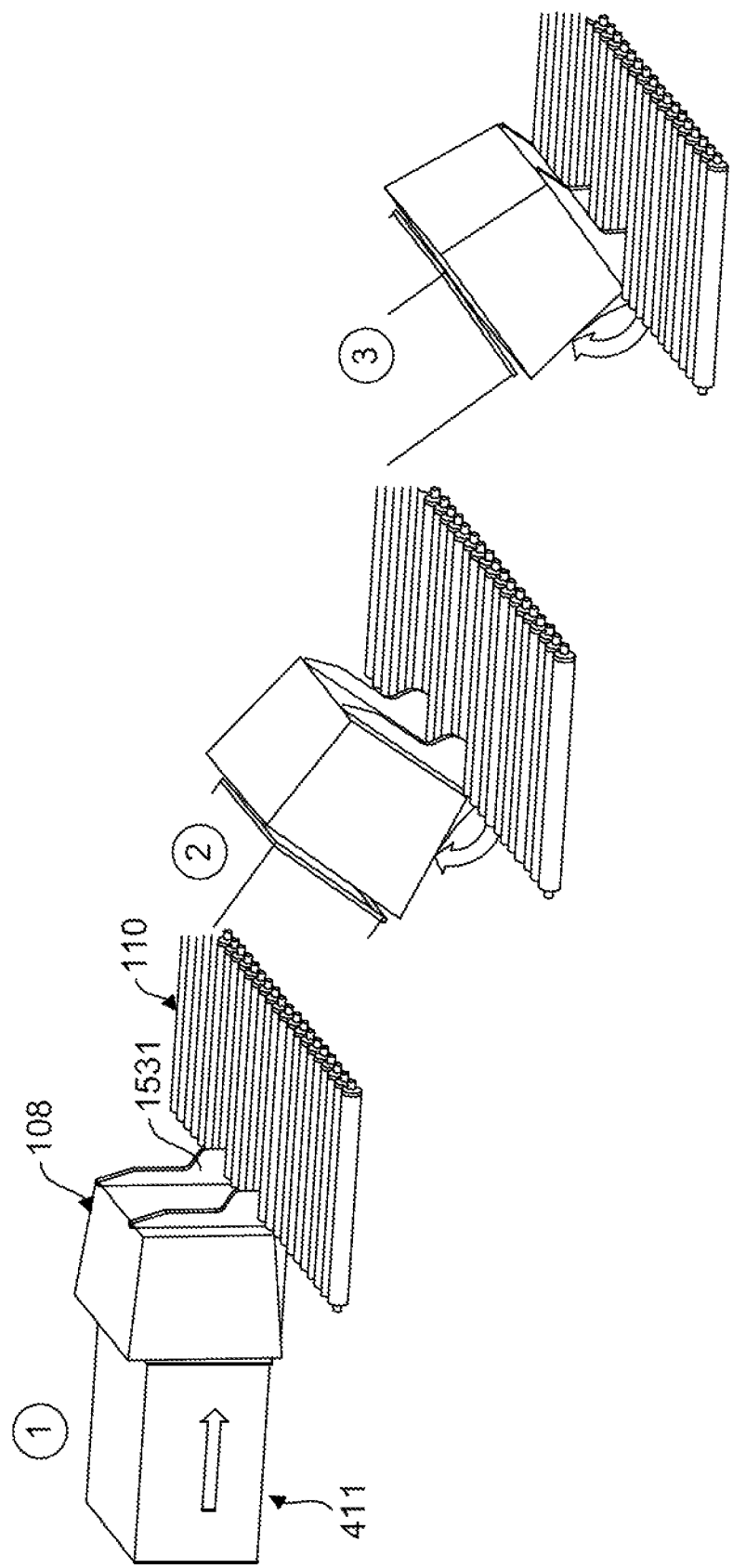
FIGS. 15-22 are schematic diagrams depicting techniques for manipulation of the items 107 for insertion into the totes 108.

FIG. 15 is a schematic diagram depicting a process for insertion of the items 10 into the tote 108. As shown in FIG. 15, the item 107 may be brought by the integrated hand 411 to the tote 108 and tilted over the tote 108 before release. Enhancements in integrated hand range of motion of the integrated hand 411 (see, e.g., FIGS. 6 and 7) allow multiple biasing options when loading the totes 108. In FIG. 15, the item 107 is brought to tote 108 and tilted over the tote 108 before release therein. This safe loading may be accomplished by capturing and rotating the tote 108 so that the integrated hand 411 can load horizontally. The integrated hand 411 and the tote 108 may move together to an upright position for conveying.

The tote 108 may be positioned on the tote conveyor 110. The tote 108 may be rotationally supported about the tote conveyor 110 by a tote capture track (device) 1531. The tote capture track 1531 may be pivotally connected to the tote conveyor 110. Once the tote 108 advances along the tote conveyor 110, the tote 108 may be captured by the tote capture track 1531. The integrated hand 411 may then engage the tote 108 and tilt the tote 108 by rotation of the tote capture track 1531. To achieve this movement, the tote handler 102, the tote conveyor 110, and/or the tote capture track 1531 may be moved using motors and drivers (not shown). This movement together may be enabled, for example, by modern controls allowing the servo motors controlling the tote capture track 1531 to rotate under control of a robot controller acting as an extension of the tote handler 102.

Figure 16:
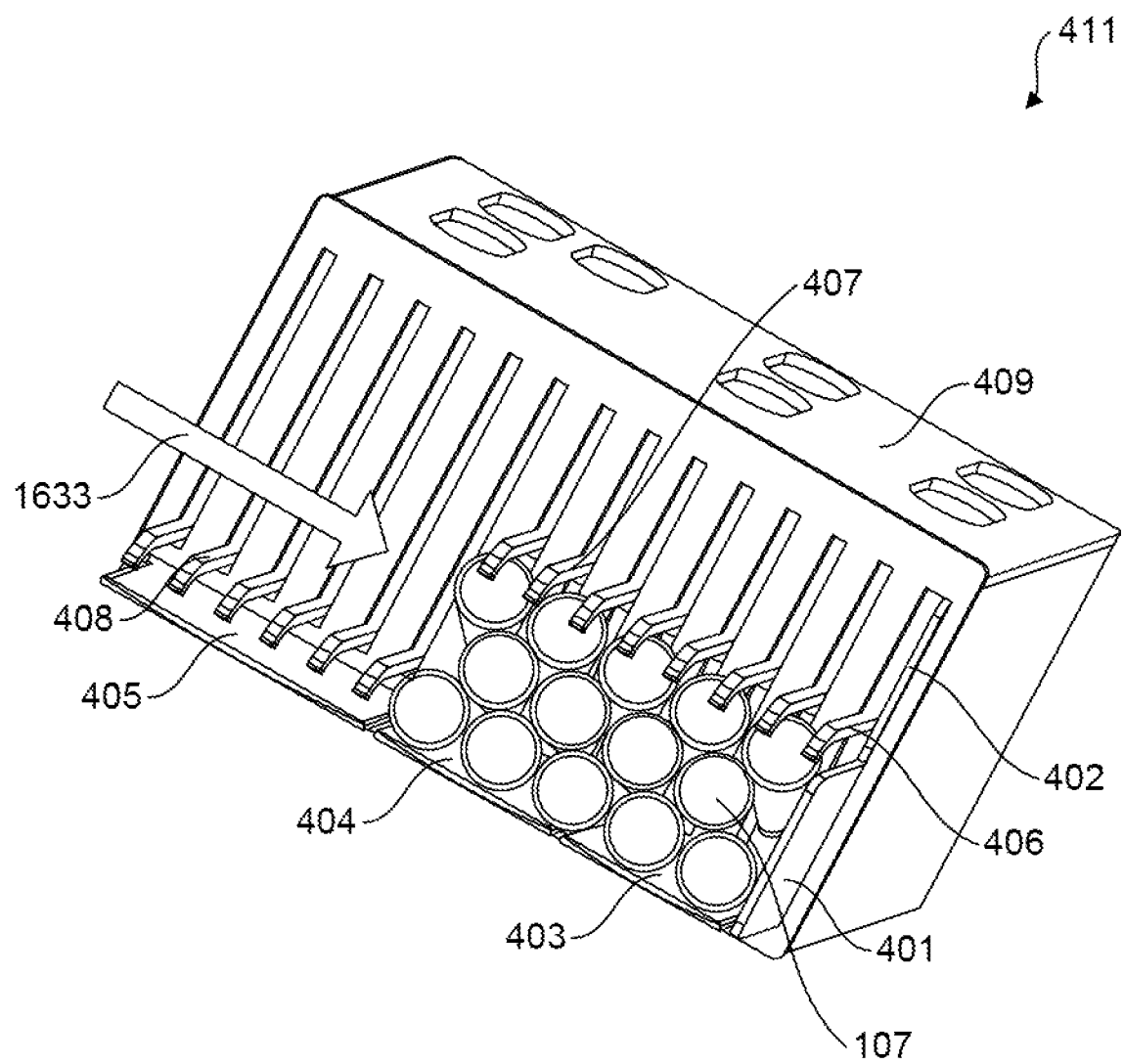
Figures 17A, 17B:
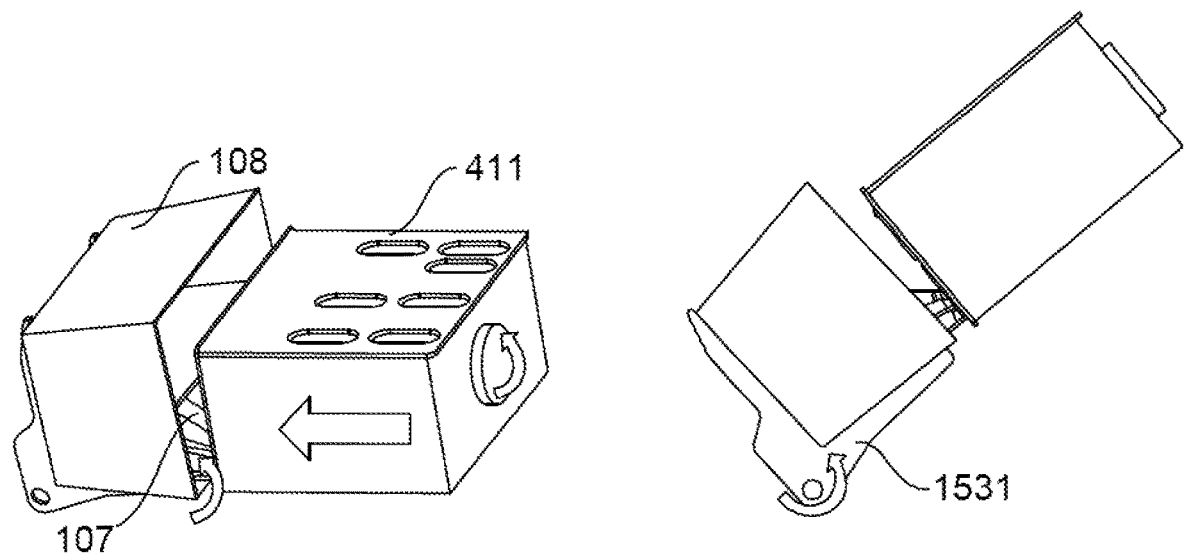

FIG. 16 is a schematic diagram depicting a compound integrated hand 411. This figure shows biasing of multiple items carried by the integrated hand 411 during rotation of the tote 108 in the tote capture track 1531. As shown in FIG. 16, the compound integrated hand 411 is used for rotation biasing of multiple of the items 107 to a corner. Some of the items 107 (e.g., round and conical shapes) as stacked in their shipping container 106 may not be stable when rotated to a horizontal position. The items 107 may be stabilized by adding the tote capture device (or track) 1531 with a compound tilt of the integrated hand 411 and the captured tote 108, and by biasing the stack of the items 107 to two of the plates (walls) 403, 404. At least one additional axis of control may be added to the integrated hand 411 for compound rotation.

As shown in FIG. 16, the compound integrated hand 411 may be used for rotation for biasing items 107 to a corner. This biasing may be used to position the items 107 for insertion into the shipping container 106 and/or the tote 108. This biasing may be used with the loading of FIG. 15 to utilize a gravity bias applied down onto the flat bottom plates 403-405 of the integrated hand 411. The tote 108 may be loaded without gravity to pull the items 107 from between the tooling fingers 406 and the plates 403, 404 until the item 107 is at or near the bottom of the tote 108. The integrated structure of the integrated hand 411 may allow this operation to be carry out with the integrated hand 411 to grip the items 107 in the horizontal attitude with complete support of the bottom plates 403,404. The tote 108 may be gripped and rotated to allow the items 107 to be transferred into the tote 108 or sub-chambers in a horizontal orientation. The item 107 may rest firmly on the bottom plates 403-404 with gravity pulling in a perpendicular vector 1633 to the plates 403,404 eliminating virtually all forces trying the pull the items 107 from the fingers 406,407 of the integrated hand 411.

A servo system may be used to control the rotation of the tote 108, and may be electronically coupled with the multi-axis controls of the tote handler 102 for full motion coordinate in the tote 108 related coordinate system. In other words, the integrated hand 411 can rotate with the tote 108 rotation as one as if they were mechanically connected. This coordinated motion may provide a gentle slide from the fingers 406,407 into the tote 108 as the gravity becomes just enough to help pull the items 107 from the plates 401-405 for the last few millimeters to a floor of the tote 108.

The item 107 may be held in the fingers 406,407 until aligned with the tote 108 and moved into the bottom or floor of the tote 108. At this point, the fingers 406,407 may open releasing the items 107 into the compartment. The open position of the fingers 406,407 clears the walls of the compartment to allow the fingers 406,407 to be withdrawn leaving the items 107 in the compartment. The fingers 406,407 can open in a horizontal position then moving the tooling to the bottom of the tote 108 for safe handling of the items 107 at various positions on the plate (i.e., protruding).

FIGS. 17-22 show examples of loading previously loaded totes 108 and/or sub-chambers 214 in the totes 108. FIGS. 17A and 17B show the integrated hand 411 and the tote 108 moving together in a multiple axis (as indicated by the arrows) to complete a smooth unloading. FIGS. 17A and 17B shows the tote 108 replenished by movement to a compound angle. As shown in these figures, the motion of the integrated hand 411 with the tote capture track 1531 allows the side walls of the tote 108 (or sub-tote) to replace the constraints of the fingers 406,407 and the plates 401-405 of the integrated hand 411. This smooth transition prevents drops of the fragile units and maintains stack patterns of the units of the items 107.

Figure 18:
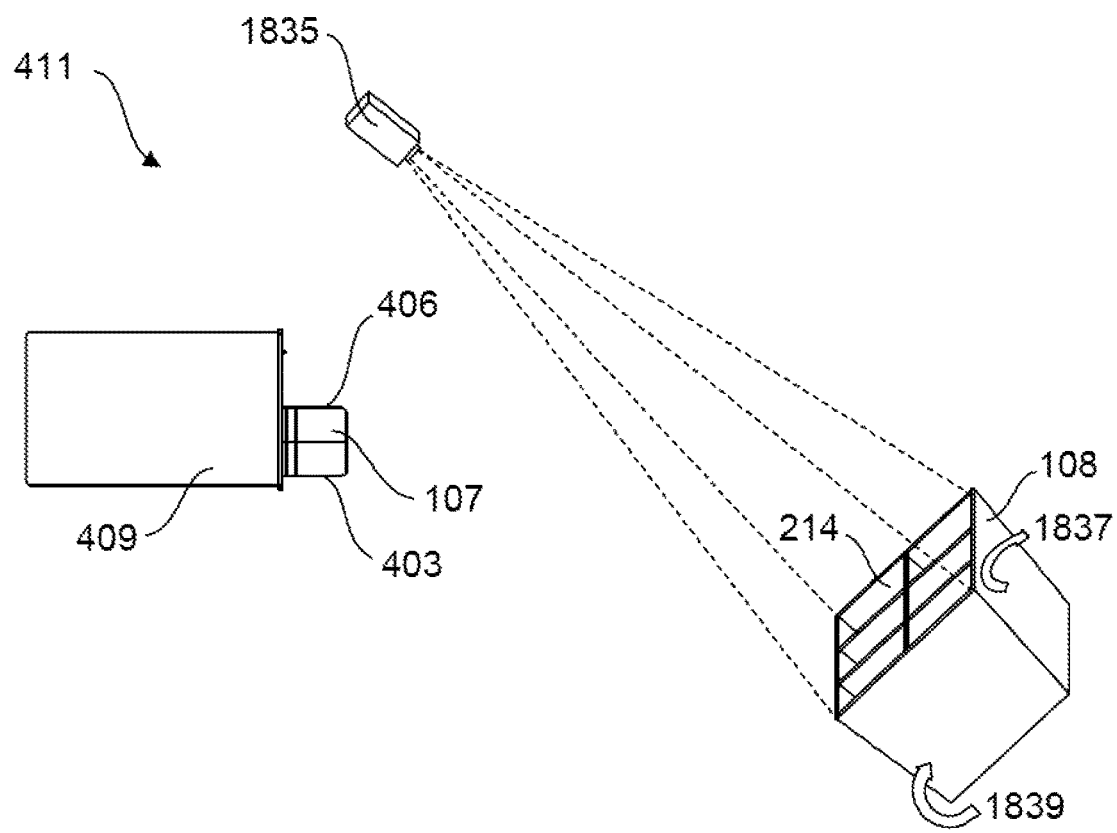
Figure 19:
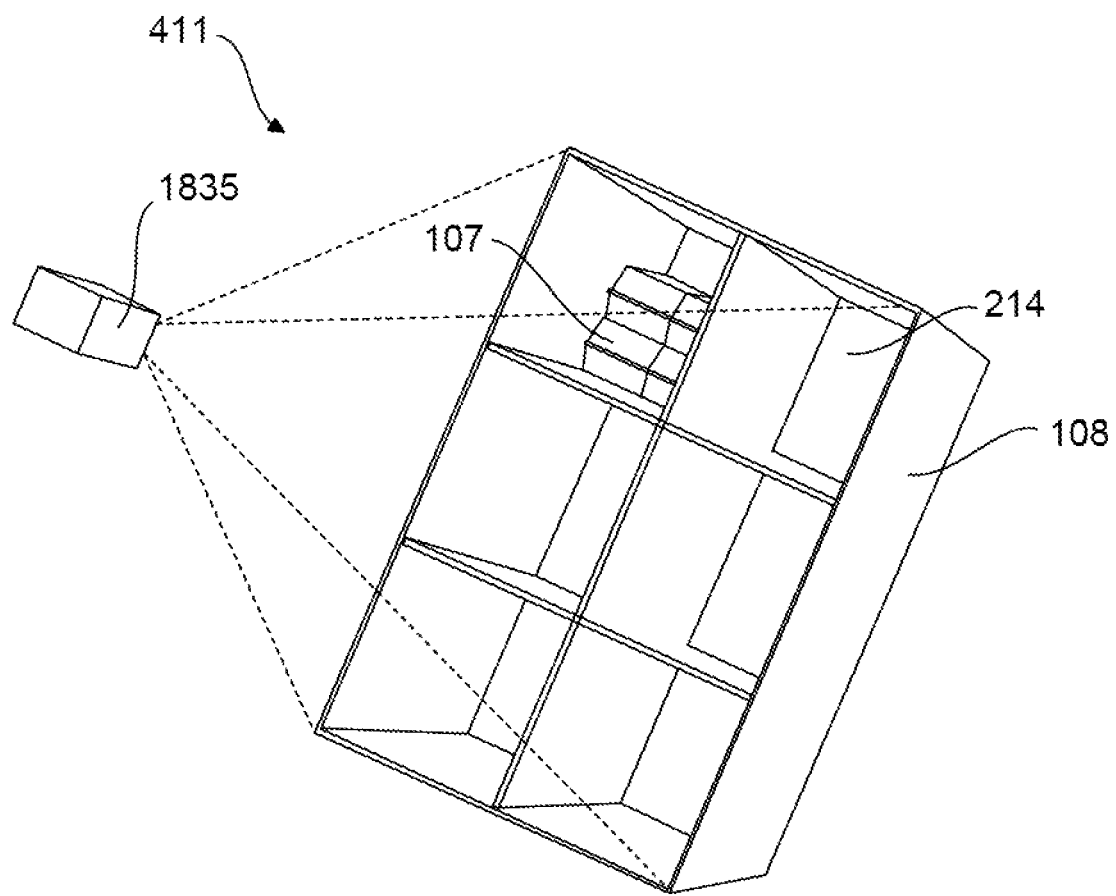

As shown in FIGS. 18 and 19, a vision system 1835 may be provided to verify content level and location in the master tote 108 or sub-chamber 214 to verify level and drop position. The vision system 1835 may include a camera for detecting the items 107 in the tote 108, and for determining placement of new items 107 into specific sub-chambers 214 in the tote 108. The vision system 1835 may be used to facilitate placement of the items 107 into the tote 108 and sub-chambers 214 using the integrated hand 411. The tote 108 may be used to place the items 107 by moving to a compound angle to bias the items 107 under gravity vectors 1837, 1839. Based on determined placement and measurements of the tote 108, the vision system 1835 may determine the proper vectors 1837, 1839 to position the tote 108 and the integrated hand 411 and/or to facilitate placement.

Figure 20:
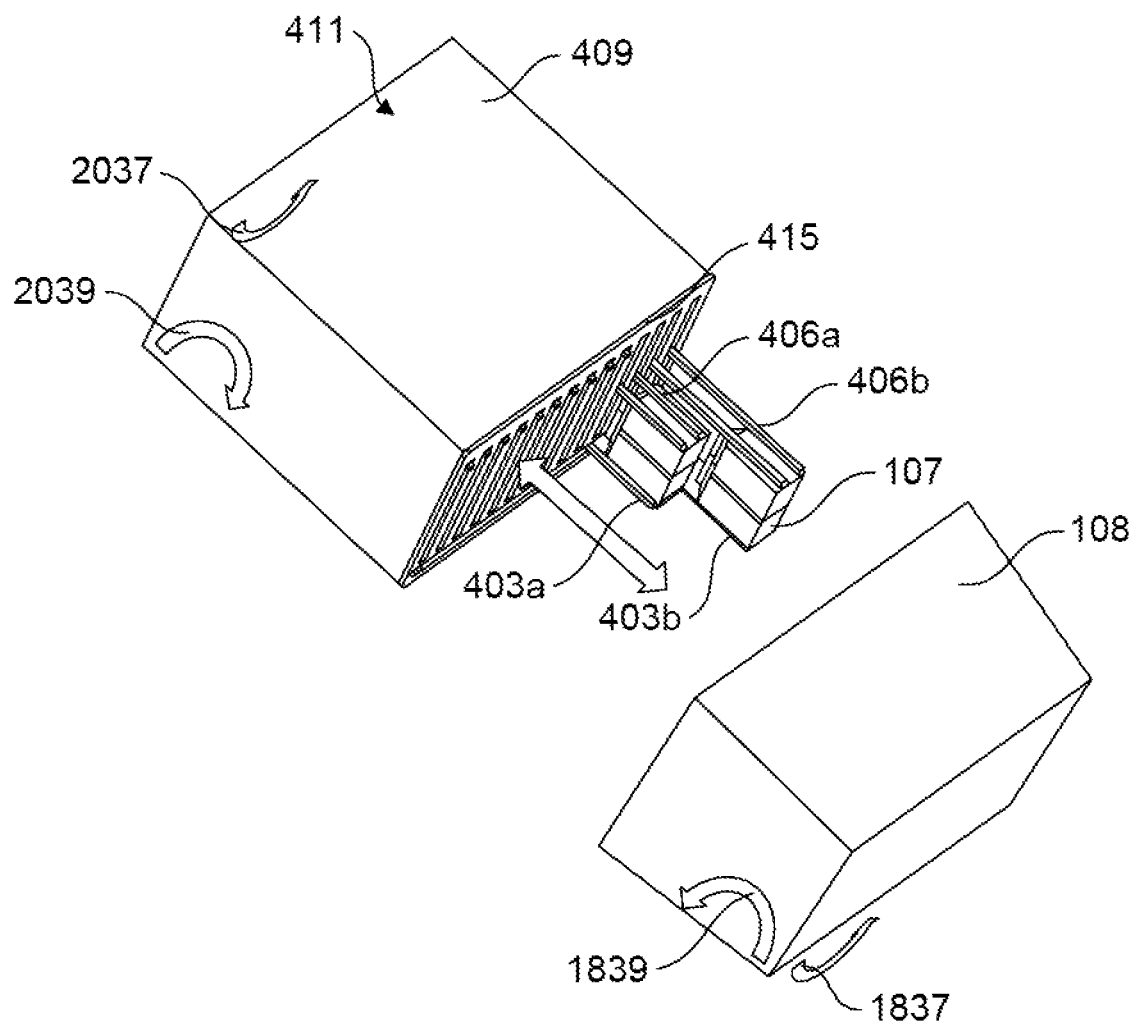

FIG. 20 shows the integrated hand 411 with the fingers 406a,b and the plates 403a,c extended to different positions. FIG. 20 shows configurations for flipping of the tote 108 using the integrated hand 411. As demonstrated in these figures, the gravity vectors may be used to control, bias and register loose the items 107 previously loaded into the tote 108. The tote 108 for loading may be presented in a compound angle to bias the items 107 to two sides.

As shown in FIG. 20, the fingers 406 and/or the plates 403 of the integrated hand 411 may be extended at different lengths to fill the sub-chambers 214 in the tote 108. With contents bias, the vision system 1835 may determine and verify placement space for the items 107 in the tote 108. A cube of the decanted items 107 (and corresponding measurements) may be known from the shipping container 106 cutting process. The vision system 1835 can determine space for the cube by stacking or by side by side placement. The tote 108 may be moved according to the vectors 1837, 1839 and the integrated hand 411 may also be moved according to corresponding vectors 2037, 2039.

The original stacking of the items 107 in the same cube as the items 107 were contained in the shipping container 106 is maintained in the tooling when the shipping container 106 is removed. Maintaining the cube is a function that may be used to keep the item data and control scheme manageable. The process of matching the items 107 with the sub-chamber sizes is simplified. The shipping containers 106 may be measured for automatic cutting. The dimensional data for the shipping container 106 is matched with the size of the sub-chamber 214. The integrated hand 411 keeps the items 107 in the same form as they were in the shipping container 106. The items 107 can be transferred to the tote 108 in a single pick and place move. The sub-chamber 214 sizes and the shipping container 106 sizes may be known from previous processes of automated shipping container 106 opening and/or sensor measurements.

Figure 21:
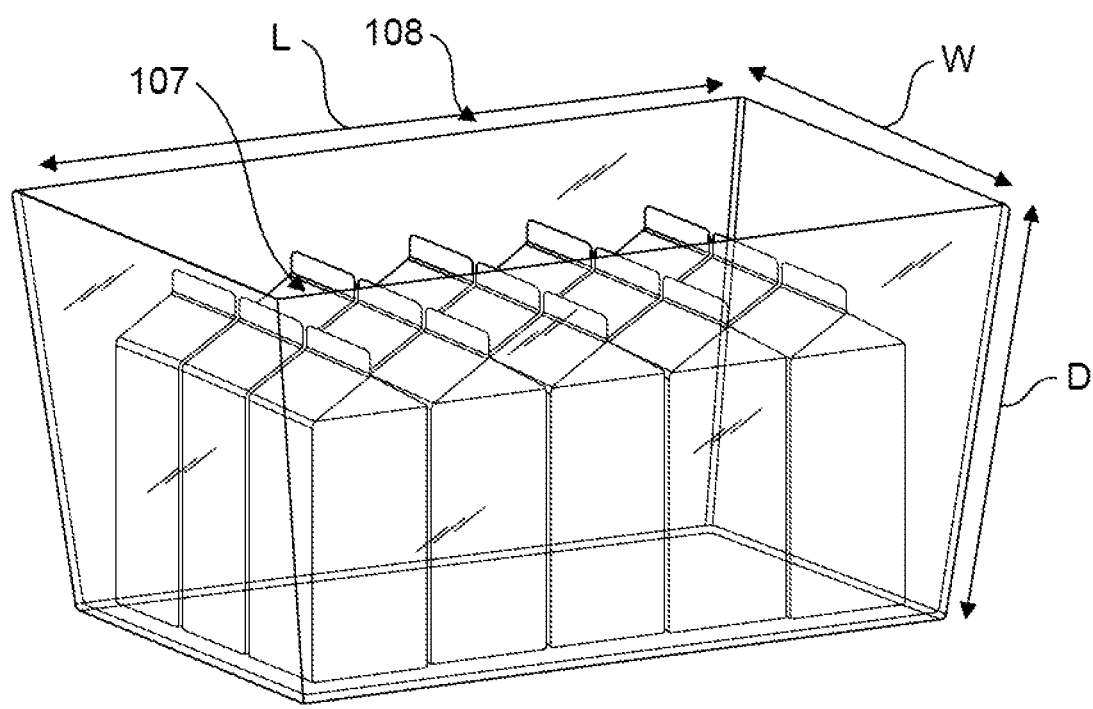
Figure 22:
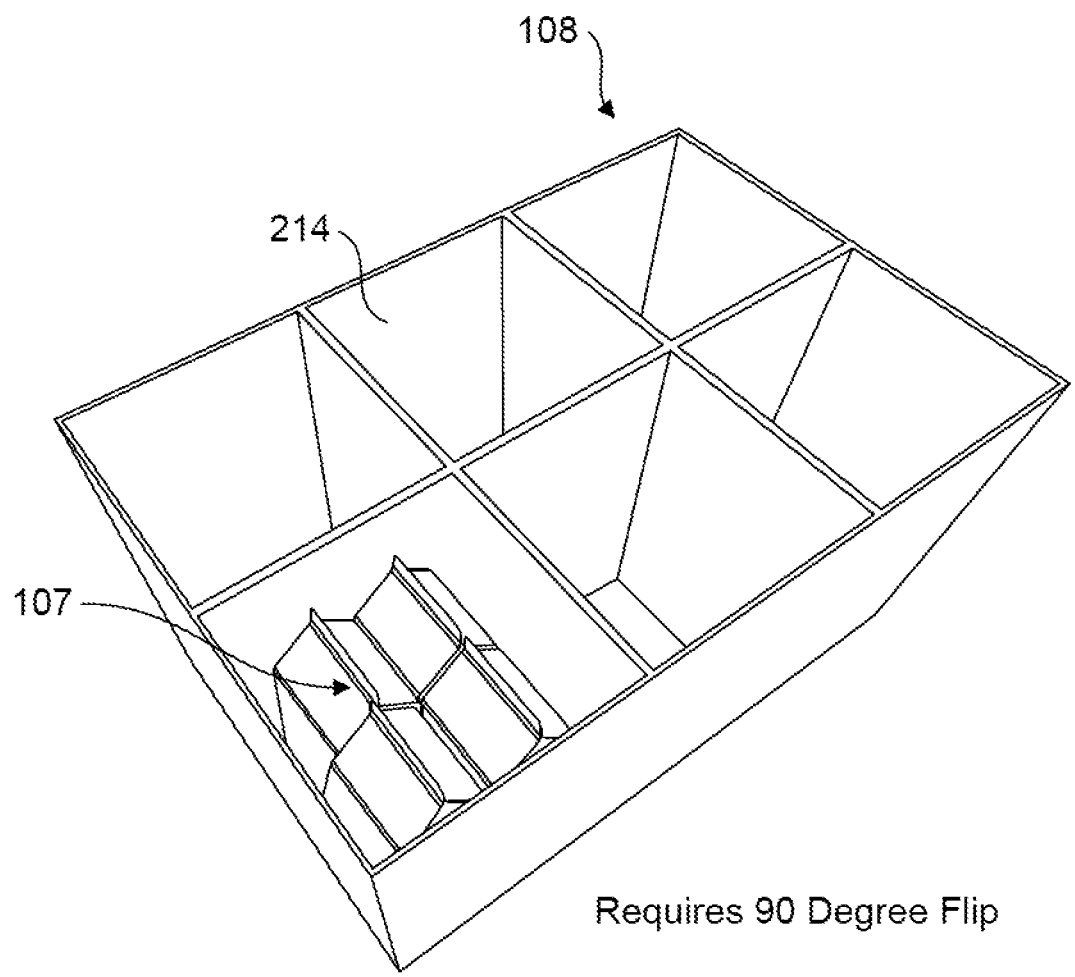

FIGS. 21 and 22 show programmable orientation for manipulating the items 107 for use in various tote 108 configurations using the integrated hand 411. As shown in these figures, various configurations may be used for flipping of the tote 108 using the integrated hand 411, and the items 107 may be packed into the shipping containers 106 with various orientations. The cube of the items 107 may fit more suitably into the tote 108 when oriented in a specific way. Controlling the orientation of the cube of the items 107 may be used to provide higher decant success. Controlling this orientation may allow a better fit of the items 107 into the tote 108 and its sub-chambers 214.

The items 107 and orientation of the shipping container 106 may fit into the mouth or opening of the sub-chamber 214 dimensions length L×width W×depth D. The depth D may be adjusted to match the shipping container 106 size to prevent scattering of the contents. The orientation of the integrated hand 411 in space may be adjusted using gravity to prevent scattering of the items 107.

The integrated hand 411 may be used to allow the items 107 to be oriented into the totes 108 without the requirement of flipping the shipping containers 106 on the induct prior to cutting. Orientation may be controlled by presetting how the shipping container 106 is picked from the conveyor 110. The contents of the shipping container 106 can be packed into the tote 108 as oriented in its shipping container 106 (e.g., top up) or turned on its side. This may eliminate flipping the integrated hand 411 on the induct to reduce cost and floor space, and to enable all of the shipping containers 106 to be cut the same way on the top to simplify the process.

Figure 23:
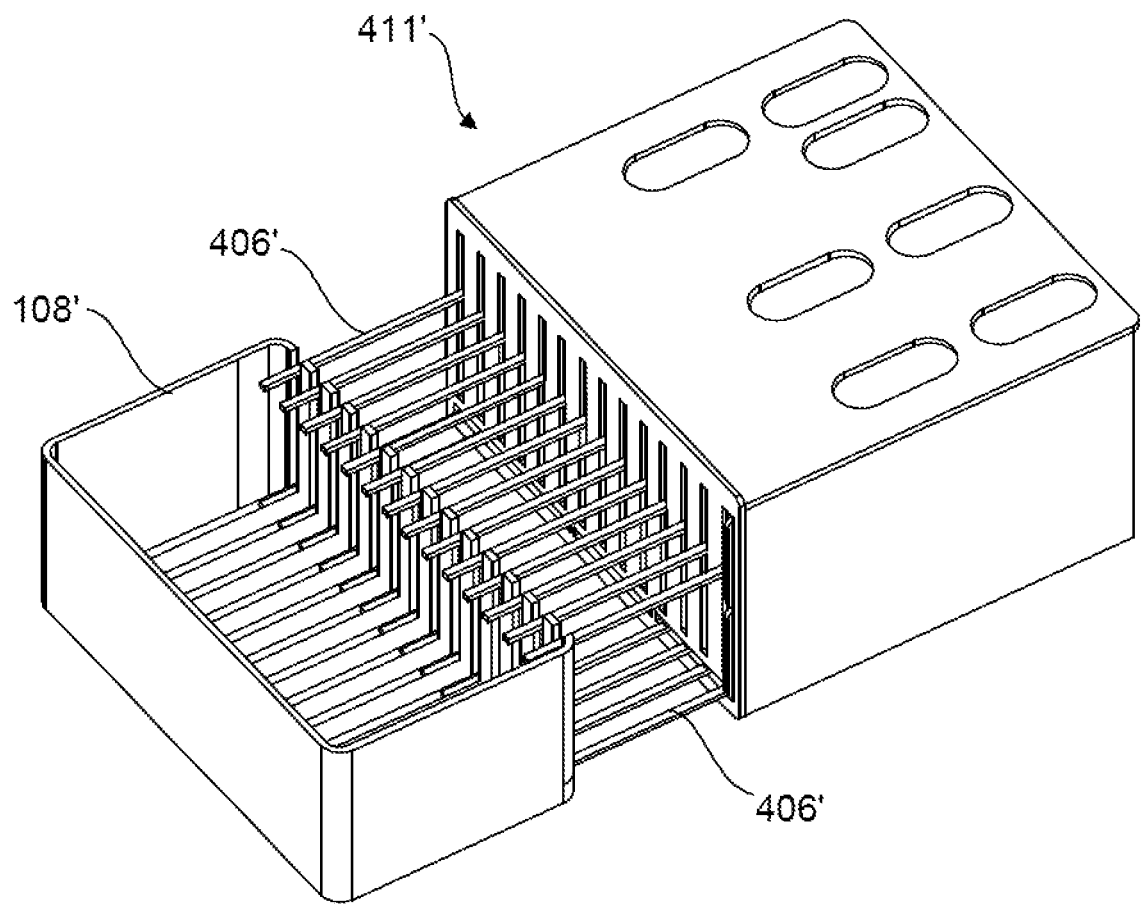
FIG. 23 is a schematic diagram depicting a tote hand usable with the tote handler for gripping items in a slotted tote.

FIG. 23 is a schematic diagram of a tote hand 411' usable with the tote handler 102 for gripping the items 107 in a slotted tote 108'. This tote hand 411' and the slotted tote 108' may be similar to the tote hand and totes described in the Handling Applications previously incorporated by reference herein. FIG. 23 shows use of the tote hand 411' in place of the integrated hand 411. In this version, the fingers 406' of the tote hand 411' act as bottom plates for use with the slotted totes 108'. This figure shows how the fingers 406' may be interchangeable with the plates 403-405 of the integrated hand 411. These replaceable fingers 406' may be used, for example, in pack-out operations in place of the plates 401-405 for gripping the items 107. The flat plates 401-405 can be changed out to the replaceable fingers 406' to work with the tooling reliefs and voids for gripping the items 107 from the totes 108 and the put walls for pack out. Various fingers and other gripping devices that may be used are described in the Handling Applications previously incorporated herein.

Figure 24:
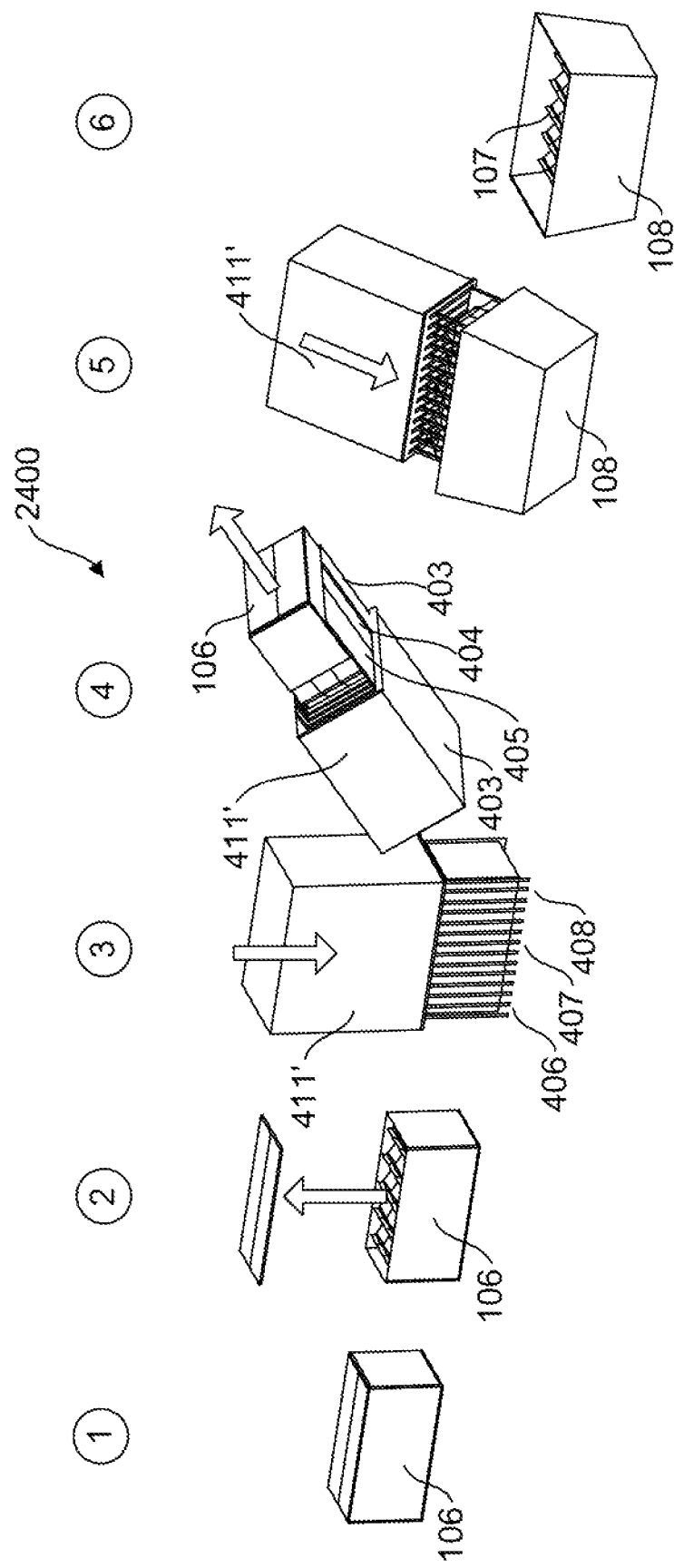
FIG. 24 is a schematic diagram depicting decanting of the shipping container by the integrated hand.

FIG. 24 is a schematic diagram depicting decanting of the shipping container 106 by the integrated hand 411. This figure shows an example handling operation 2400 that may be used for decanting the items 107 from the shipping container 106. This process also shows an example handling operation that maintains the cube of the items 107. This process may be used to reduce steps of the operation and/or to increase production rates. Combining the item 107 capture into one integrated hand 411, the process of loading and unloading a separate capture table 104 (FIG. 1) is eliminated. In the example of FIG. 24, the decant process has been reduced to six major operations (1-6).

At 1, the shipping container 106 is loaded to the decant operation in the same orientation (top up). Eliminated are the requirements for pre-scanning and changing the orientation of the shipping container 106 prior to cutting. At 2, the cutting process removes the top of the shipping container 106. This operation may be enhanced as packaging may allow for some space at the top for safe cutting. At 3, the integrated hand 411 picks up the cut shipping container 106 from the top. At 4, the integrated hand is oriented for gravity vector capture and shipping container 106 extraction. At 5, the items 107 are placed into the tote 108 or sub-chamber 214 of the tote 108. At 6, the tote 108 is packed with the items 107.

Figure 25:
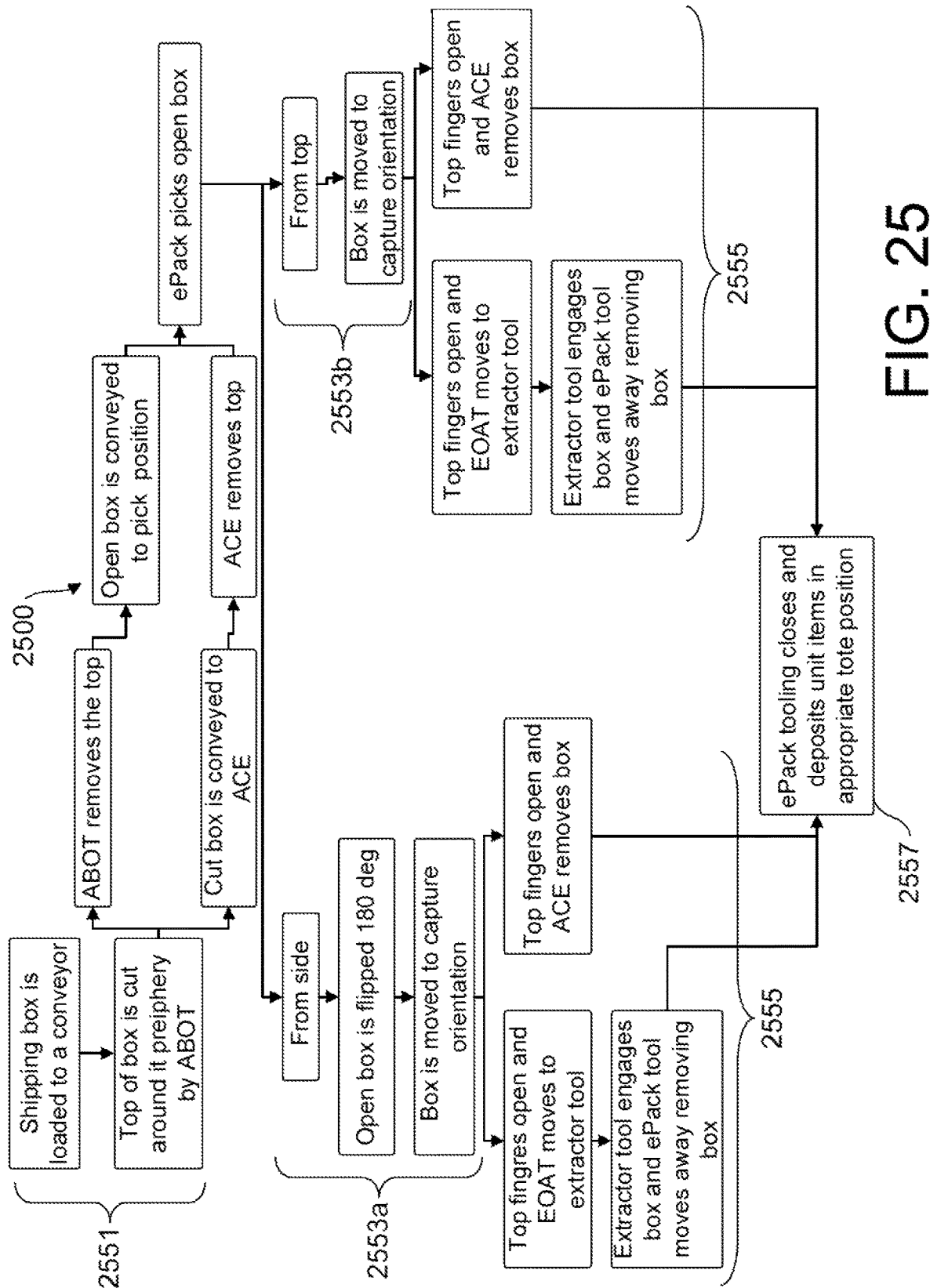
FIG. 25 is a flow diagram depicting a handling operation in a decant configuration.
Figure 26:
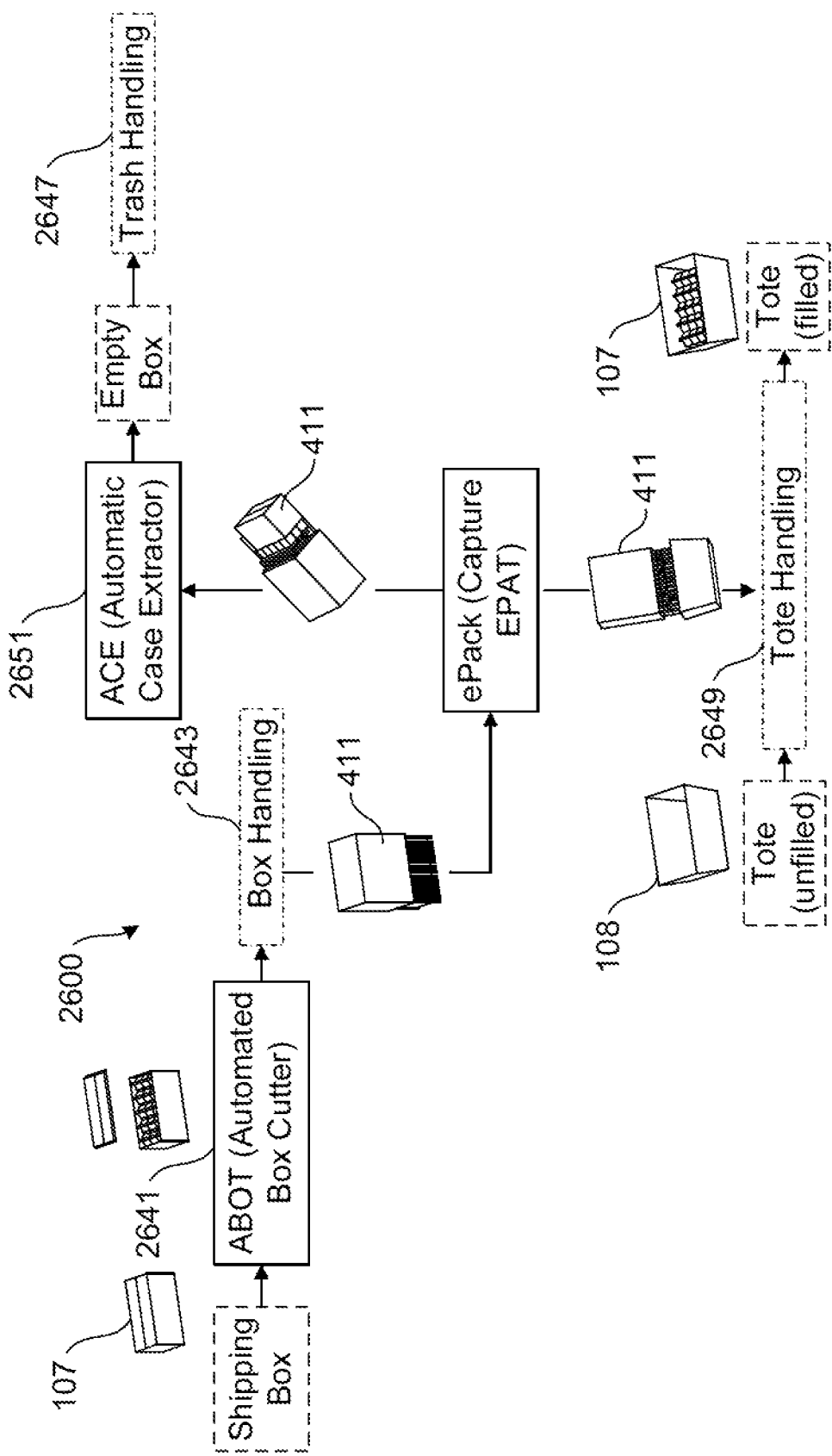
FIG. 26 is a schematic diagram depicting example components of the handling system.

FIGS. 25 and 26 show techniques for performing handling operations. FIG. 25 is a flow chart showing a handling operation 2500 in a decant configuration. The handling operation 2500 as shown may include a decant process with optional branches. This flow chart shows an example of handling using the handling systems described herein (and/or in the Handling Applications previously incorporated herein). The handling operation 2500 may be used for performing a decant operation.

The handling operation 2500 involves 2551 processing the shipping container 106. The 2551 processing includes loading the shipping container 106 onto the conveyor 110, cutting the shipping container 106 (e.g., with the box cutter or ABOT), and removing the top of the cut shipping container 106 (e.g., with the ACE and/or an ePack). Next, the handling operation 2500 involves 2553a,b positioning the shipping container 106 using either a side positioning 2553a or a top/bottom positioning 2553b. The positioning 2553a may involve moving the shipping container 106 from the side, flipping the shipping container 106 by 180 degrees, and moving the shipping container 106 to a capture orientation. The handling operation 2500 may also involve 2553b positioning the shipping container from the top by moving the shipping container to the capture orientation.

The handling operation 2500 continues from positioning 2553a or the positioning 2553b with 2555 engaging the shipping container with the integrated hand 411. This engaging 2555 may involve removing the shipping container 106 by opening the top fingers of the integrated hand 411 and using a cutting device (e.g., either the ACE or an extractor tool) to remove the shipping container 106 and leave the items 107. The handling operation 2500 completes with decanting 2557 involving depositing the items 107 into the tote 108 by the integrated hand 411. This may be performed using, for example, the ePack tool.

The handling operation 2500 may be used to achieve one or more of the following: elimination of shipping container flipping and/or orientation devices, ability to orient items after opening (allows recognition of items orientation after opening), eliminating steps and improving motions and cycle time, right side up orientation with fewer steps and equipment, reduced damage to contents, shipping containers opened on top to protect the items therein. Gravity may hold the items 107 towards the bottom and bottom cutting may be dangerous to contents.

FIG. 26 is a schematic diagram depicting example components of the handling system 2600. The handling system 2600 may include the tote handler 102 and the tote conveyor 104 as described in the Handling Application (previously incorporated herein) for operating the integrated hand 411 described herein for use with handling the items 107 between the shipping containers 106 and the totes 108. As shown in FIG. 26, the handling system may also include other handling equipment, such as a box cutter (e.g., ABOT) 2641, box handler 2643, integrated hand 411 (or capture (EOAT)), trash handler 2647, tote handler 2649, ACE case extractor 2651, etc.

The handling system 2600 may use one or more of the tote handlers 102 for supporting and operating the integrated hand 411, the tote handler 2649, the ACE 2651, or other devices. In this example, the ABOT 2641 is used to cut open the shipping containers 106. The ABOT 2641 may optionally be equipped with an option (e.g., suction cup arm) or a separate box handler 2643 may be used to remove cut tops from the shipping containers 106.

Once opened, the items 107 may be removed from the shipping container 106 using the integrated hand 411. The integrated hand 411 may be supported by one of the tote handlers 102 for transferring the items from the shipping container 106 to the tote 108. This transfer process may be referred to as decanting or capture using an EOAT (end of arm tooling), such as the integrated hand 411 supported by the tote handler 102.

The case extractor 2651 (e.g., ACE) may be used to remove the empty shipping container 106 once the integrated hand 411 removes the items 107. The box handler 2643 may be used in combination with a stationary shipping container extractor tool 2651 for removal of the lid and/or the empty shipping container 106. The function of the box handler 2643 and the case extractor 2651 may be combined using a single tote handler 102 with an appropriate gripping hand to grip the shipping container 106, thereby (allowing robot to do the motion) providing a two robot solution which may further reduce the footprint and costs. A separate trash handler 2647 may be used to receive the empty shipping container 106.

FIGS. 27A1-27I2 are schematic diagrams depicting a handling operation using the tote handlers 102a-c with various grippers 2711a-c. Each of these figures show front and rear views of three of the tote handlers 102a,b,c positioned about the tote conveyor 110 for moving the items 107 about the shipping container 106 and the tote 108 using the grippers 2711a-c. The tote handlers 102a-c may have various grippers for gripping. In these examples, the tote handler 102a includes a tote gripper 2711a, such as a clamp, capable of gripping and moving the tote 108. The tote handler 102b includes an box gripper 2711b, such as a pneumatic suction device and/or cutting device, capable of gripping and moving the shipping container 105 and/or the items 107. The tote handler 102b may also optionally be provided with box cutting capabilities for removing the lid from the shipping container 106. The tote handler 102c includes an item gripper 2711c, such as the integrated hand 411, capable of decanting the items 107 from the shipping container 106 and into the totes 108. Other gripping devices that may be used are described in the Handling Applications previously incorporated herein.

FIGS. 27A1 and 27A2 show the box gripper 2711b positioned above the shipping container 106 on the tote conveyor 110. FIGS. 27B1 and 27B2 show the box gripper 2711b engaging the shipping conveyor 106 on the tote conveyor 110. FIGS. 27C1 and 27C2 show the box gripper 2711b removing the lid from the shipping container 106. FIGS. 27D1 and 27D2 show the item gripper 2711c advancing towards and engaging the shipping container 106. FIGS. 27D1 and 27D2 also show a lift grid 801 extending above the tote conveyor 110 to engage the shipping container 106.

FIGS. 27E1 and 27E2 show the fingers 406 and the plates 403 of the item gripper 2711c engaging the shipping container 106. FIGS. 27F1 and 27F2 show the tote handler 102c lifting and rotating the item gripper 2711c into position for engagement by the tote handler 102b.

FIGS. 27G1 and 27G2 show the item gripper 2711c gripping the shipping container 106 on the former bottom side of the shipping container 106. The shipping container 106 is removed along an axis parallel with the sides of the shipping container 106 leaving the contents (e.g., items 107) behind in the item gripper 2711c. FIGS. 27H1 and 27H2 show the tote 108 positioned by the tote gripper 2711a into alignment with an axis of the contents of the shipping container 106 and placed over the item gripper 2711c containing the items 107. The contents of the shipping container bottom side now reside against the bottom of the tote 108. FIGS. 27I1 and 27I2 show the tote gripper 2711a with the tote 108 and the item gripper 2711c rotating together, thereby realigning the tote 108 to a upright position for placement to the tote conveyor 110.

While the embodiments are described with reference to various implementations and exploitations, it will be understood that these embodiments are illustrative and that the scope of the inventive subject matter is not limited to them. Many variations, modifications, additions and improvements are possible. For example, various combinations of one or more of the features and/or methods provided herein may be used.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter. For example, while certain tote handling systems comprising various tote conveyors, tote handlers, and totes are provided herein, it will be appreciated that various forms of one or more tote conveyors (or conveyor portions), one or more tote handlers with various tote hands, and one or more totes may be provided. Additionally, various combinations of one or more of the features of the components of the tote handling system may be used. While the figures herein depict a specific configuration or orientation, these may vary. First and second are not intended to limit the number or order.

Insofar as the description above and the accompanying drawings disclose any additional subject matter that is not within the scope of the claim(s) herein, the inventions are not dedicated to the public and the right to file one or more applications to claim such additional invention is reserved. Although a very narrow claim may be presented herein, it should be recognized the scope of this invention is much broader than presented by the claim(s). Broader claims may be submitted in an application that claims the benefit of priority from this application.

What is claimed is:

1. An integrated hand for manipulating items received in a shipping container, the integrated hand comprising:
 a base carried by a tote handler and movable thereby, the base having a slotted plate;
 fingers extendable from the base through the slotted plate, the fingers slidably movable along slots in the slotted plate; and
 flat plates extendable from the base, the flat plates comprising horizontal plates and vertical plates, the horizontal plates extending horizontally along a bottom of the base opposite from the fingers, the vertical plates extending vertically along a side of the base perpendicularly between the horizontal plates and the fingers, the fingers and the flat plates selectively extendable about the base to define a grip space shaped to receivingly grip the items whereby the items are secured in position during movement of the base.

2. The integrated hand of claim 1, wherein one or more of the fingers are extendable from the base.

3. The integrated hand of claim 1, wherein one or more of the fingers are extendable from the base by different distances.

4. The integrated hand of claim 1, wherein one or more of the flat plates are extendable from the base.

5. The integrated hand of claim 1, wherein one or more of the flat plates are extendable from the base by different distances.

6. The integrated hand of claim 1, wherein the vertical plates are positioned adjacent the horizontal plates to define a corner therebetween.

7. The integrated hand of claim 1, further comprising an attachment point connectable between the base and the tote handler.

8. The integrated hand of claim 1, further comprising replacement fingers interchangeable with the horizontal plates.

9. A handling system for manipulating items received in a shipping container, the handling system comprising:
   a tote handler; and
   the integrated hand of claim 1.

10. The handling system of claim 9, wherein the tote handler comprises a robot.

11. The handling system of claim 9, further comprising a tote conveyor, another tote handler, and a gripper, the another tote handler carrying the gripper, the gripper movably supporting a tote, the gripper movably supported about the tote conveyor by the tote handler.

12. The handling system of claim 11, further comprising a vision system comprising a camera to detect items in the tote.

13. The handling system of claim 11, further comprising a box cutter to cut open the shipping container.

14. The handling system of claim 11, further comprising a case extractor to remove the shipping container.

15. The handling system of claim 9, further comprising a tote to receive the items from the integrated hand.

16. The handling system of claim 15, further comprising a tote conveyor to movably support the tote.

17. The handling system of claim 16, wherein the tote conveyor further comprises a tote capture track shaped to engage the tote, the tote capture track pivotally connected to the tote conveyor.

18. The handling system of claim 16, wherein the tote conveyor further comprises a lift extendable above the tote conveyor, the lift shaped to liftingly support the tote thereon.

19. The handling system of claim 16, further comprising at least one additional tote handler and a gripper, the at least one additional tote handler positioned about the tote conveyor, the gripper carried by the at least one additional tote handler.

20. The handling system of claim 19, wherein the gripper comprises one or an item gripper, a box gripper, and a tote gripper.

21. The handling system of claim 19, further comprising a capture table to receive the items from the gripper.

22. A method of handling items in a shipping container, the method comprising:
   receiving items in an original orientation from the shipping container by:
      selectively extending fingers and plates of an integrated hand to define an item space shaped to support the items; and
      grippingly receiving the items between the fingers and the plates; and
   inserting the items into a tote while maintaining the items in the original orientation by
      selectively rotating the integrated hand and inserting the integrated hand into the tote.

23. The method of claim 22, further comprising defining the item space by measuring the shipping container.

24. The method of claim 22, further comprising defining placement of the items in the tote by measuring the tote and sub-chambers of the tote.

25. The method of claim 22, before receiving the items, lifting the shipping container above a tote conveyor.

26. The method of claim 22, further comprising tilting the tote during the inserting.

27. The method of claim 22, further comprising moving the integrated hand from the shipping container to the tote using gravity vectors.

28. The method of claim 22, further comprising cutting open the shipping container.

* * * * *